Dec. 11, 1951 W. A. EARLY 2,578,521

DOVETAILING MACHINE

Filed Dec. 30, 1946 53 Sheets-Sheet 1

WILLIAM A. EARLY,
Inventor.

By Rauf Eaton
Attorney

Dec. 11, 1951 W. A. EARLY 2,578,521

DOVETAILING MACHINE

Filed Dec. 30, 1946 53 Sheets-Sheet 2

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 3

WILLIAM A. EARLY,
Inventor

By [signature]
Attorney

Dec. 11, 1951 W. A. EARLY 2,578,521

DOVETAILING MACHINE

Filed Dec. 30, 1946 53 Sheets-Sheet 4

Inventor:
WILLIAM A. EARLY

By Paul Eaton
Attorney

Dec. 11, 1951 W. A. EARLY 2,578,521

DOVETAILING MACHINE

Filed Dec. 30, 1946 53 Sheets-Sheet 5

WILLIAM A. EARLY,
INVENTOR.

By Paul B. Eaton
Attorney

Dec. 11, 1951 W. A. EARLY 2,578,521

DOVETAILING MACHINE

Filed Dec. 30, 1946 53 Sheets-Sheet 6

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 7

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 8

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 9

INVENTOR:
WILLIAM A. EARLY

By Paul Eaton

Attorney

WILLIAM A. EARLY,
Inventor.

By [signature]
Attorney

Dec. 11, 1951 W. A. EARLY 2,578,521

DOVETAILING MACHINE

Filed Dec. 30, 1946 53 Sheets-Sheet 11

WILLIAM A. EARLY, Inventor.

By [signature] Attorney

Dec. 11, 1951 | W. A. EARLY | 2,578,521

DOVETAILING MACHINE

Filed Dec. 30, 1946 | 53 Sheets-Sheet 12

WILLIAM A. EARLY,
Inventor.

By [signature]
Attorney

Dec. 11, 1951 W. A. EARLY 2,578,521

DOVETAILING MACHINE

Filed Dec. 30, 1946 53 Sheets-Sheet 13

WILLIAM A. EARLY, Inventor.

By [signature] Attorney

Dec. 11, 1951 W. A. EARLY 2,578,521

DOVETAILING MACHINE

Filed Dec. 30, 1946 53 Sheets-Sheet 14

WILLIAM A. EARLY,
Inventor.

By Paul B. Eaton
Attorney

DOVETAILING MACHINE

Filed Dec. 30, 1946 53 Sheets-Sheet 15

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 16

Inventor:
WILLIAM A. EARLY

By Pauel Eaton
Attorney

Dec. 11, 1951  W. A. EARLY  2,578,521

DOVETAILING MACHINE

Filed Dec. 30, 1946  53 Sheets-Sheet 17

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 18

WILLIAM A. EARLY,
Inventor.

By [signature]
Attorney

Dec. 11, 1951 W. A. EARLY 2,578,521

DOVETAILING MACHINE

Filed Dec. 30, 1946 53 Sheets-Sheet 19

INVENTOR:
WILLIAM A. EARLY

By Russell Eaton
Attorney

WILLIAM A. EARLY,
INVENTOR.

BY Paul S. Eaton
ATTORNEY

DOVETAILING MACHINE
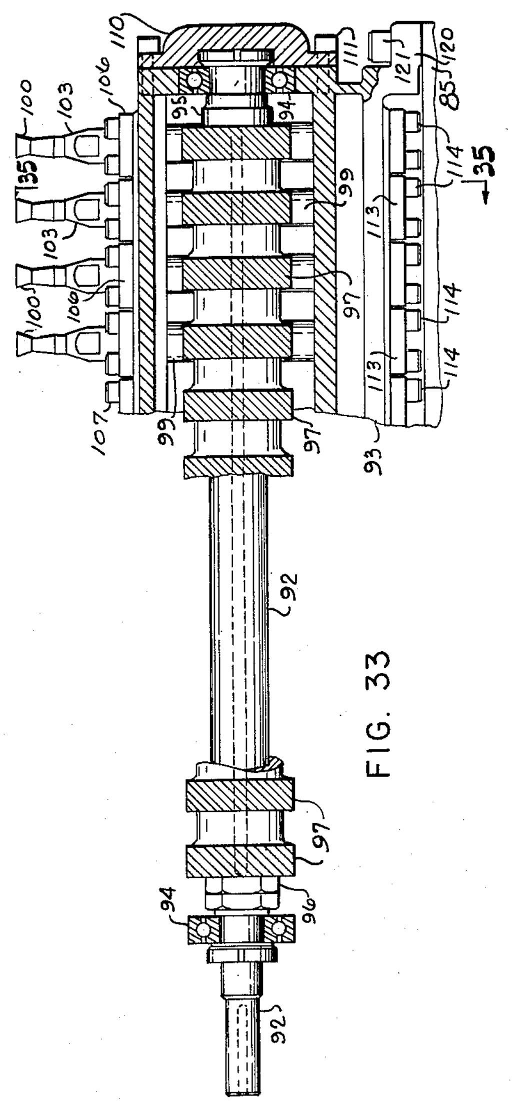
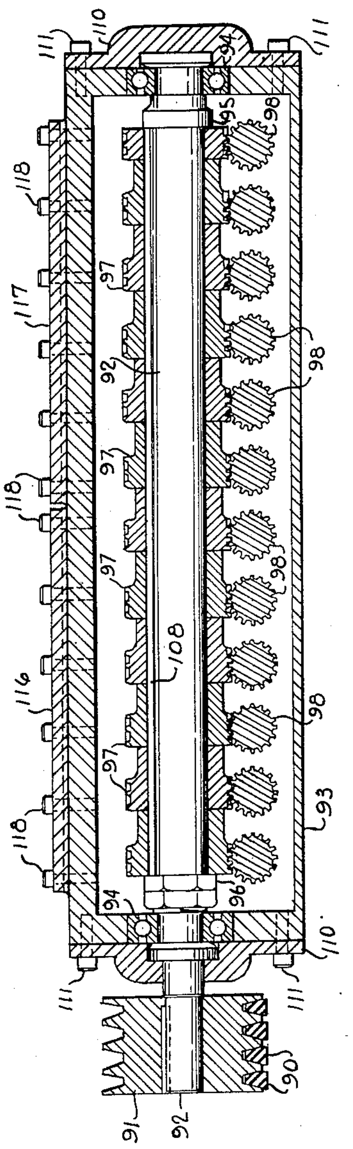
FIG. 34
WILLIAM A. EARLY,
Inventor.
By Paul B. Eaton
Attorney Dec. 11, 1951 W. A. EARLY 2,578,521
DOVETAILING MACHINE
Filed Dec. 30, 1946 53 Sheets-Sheet 22

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 23

INVENTOR:
WILLIAM A. EARLY

BY Raue & Eaton
Attorney

Dec. 11, 1951 W. A. EARLY 2,578,521

DOVETAILING MACHINE

Filed Dec. 30, 1946 53 Sheets-Sheet 24

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 25

WILLIAM A. EARLY,
Inventor.

By Paul B. Eaton
Attorney

Dec. 11, 1951 W. A. EARLY 2,578,521

DOVETAILING MACHINE

Filed Dec. 30, 1946 53 Sheets-Sheet 26

WILLIAM A. EARLY, Inventor.

By Paul B. Eaton Attorney

Dec. 11, 1951 W. A. EARLY 2,578,521

DOVETAILING MACHINE

Filed Dec. 30, 1946 53 Sheets-Sheet 27

WILLIAM A. EARLY,
Inventor.

By [signature]
Attorney

Dec. 11, 1951 W. A. EARLY 2,578,521

DOVETAILING MACHINE

Filed Dec. 30, 1946 53 Sheets-Sheet 28

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 29

WILLIAM A. EARLY,
Inventor.

By [signature]
Attorney

Dec. 11, 1951 W. A. EARLY 2,578,521

DOVETAILING MACHINE

Filed Dec. 30, 1946 53 Sheets-Sheet 30

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 31

WILLIAM A. EARLY,
INVENTOR.

BY Paul A. Eaton

ATTORNEY

Dec. 11, 1951 W. A. EARLY 2,578,521

DOVETAILING MACHINE

Filed Dec. 30, 1946 53 Sheets-Sheet 32

Inventor:
WILLIAM A. EARLY

By [signature]
Attorney

Dec. 11, 1951 W. A. EARLY 2,578,521

DOVETAILING MACHINE

Filed Dec. 30, 1946 53 Sheets-Sheet 33

Inventor:
WILLIAM A. EARLY

By Paul Eaton

Attorney

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 35

WILLIAM A. EARLY,
Inventor.

By [signature]
Attorney

Dec. 11, 1951 W. A. EARLY 2,578,521
DOVETAILING MACHINE
Filed Dec. 30, 1946 53 Sheets-Sheet 36

WILLIAM A. EARLY,
Inventor.

By [signature]
Attorney

Dec. 11, 1951 W. A. EARLY 2,578,521

DOVETAILING MACHINE

Filed Dec. 30, 1946 53 Sheets-Sheet 37

WILLIAM A. EARLY,
Inventor

By Paul Eaton
Attorney

Dec. 11, 1951 W. A. EARLY 2,578,521

DOVETAILING MACHINE

Filed Dec. 30, 1946 53 Sheets-Sheet 38

Inventor:
WILLIAM A. EARLY

By Paul Eaton

Attorney

Dec. 11, 1951 W. A. EARLY 2,578,521

DOVETAILING MACHINE

Filed Dec. 30, 1946 53 Sheets-Sheet 39

Inventor:
WILLIAM A. EARLY

By Paul B. Eaton
Attorney

Dec. 11, 1951 W. A. EARLY 2,578,521

DOVETAILING MACHINE

Filed Dec. 30, 1946 53 Sheets-Sheet 40

WILLIAM A. EARLY,
Inventor.

By Paul B Eaton
Attorney

Dec. 11, 1951

W. A. EARLY 2,578,521

DOVETAILING MACHINE

Filed Dec. 30, 1946

53 Sheets-Sheet 41

WILLIAM A. EARLY,
Inventor.

By Paul B. Eaton
Attorney

DOVETAILING MACHINE

Filed Dec. 30, 1946 53 Sheets-Sheet 42

WILLIAM A. EARLY,
Inventor.

By [signature]
Attorney

Dec. 11, 1951 W. A. EARLY 2,578,521

DOVETAILING MACHINE

Filed Dec. 30, 1946 53 Sheets-Sheet 43

Inventor:
WILLIAM A. EARLY

By Paul B. Eaton
Attorney

Dec. 11, 1951 W. A. EARLY 2,578,521

DOVETAILING MACHINE

Filed Dec. 30, 1946 53 Sheets-Sheet 44

Inventor:
WILLIAM A. EARLY

By Paul L. Eaton
Attorney

Inventor:
WILLIAM A. EARLY

By Bauer & Eaton
Attorney

WILLIAM A. EARLY,
Inventor.

By Paul B. Eaton
Attorney

WILLIAM A. EARLY,
Inventor.

By [signature]
Attorney

Dec. 11, 1951 W. A. EARLY 2,578,521

DOVETAILING MACHINE

Filed Dec. 30, 1946 53 Sheets-Sheet 48

WILLIAM A. EARLY,
Inventor.

By Paul B. Eaton
Attorney

WILLIAM A. EARLY,
Inventor.

By Paul Eaton
Attorney

Dec. 11, 1951 W. A. EARLY 2,578,521

DOVETAILING MACHINE

Filed Dec. 30, 1946 53 Sheets-Sheet 50

WILLIAM A. EARLY,
INVENTOR.

BY Paul S. Eaton
ATTORNEY

Dec. 11, 1951 W. A. EARLY 2,578,521
DOVETAILING MACHINE
Filed Dec. 30, 1946 53 Sheets-Sheet 51
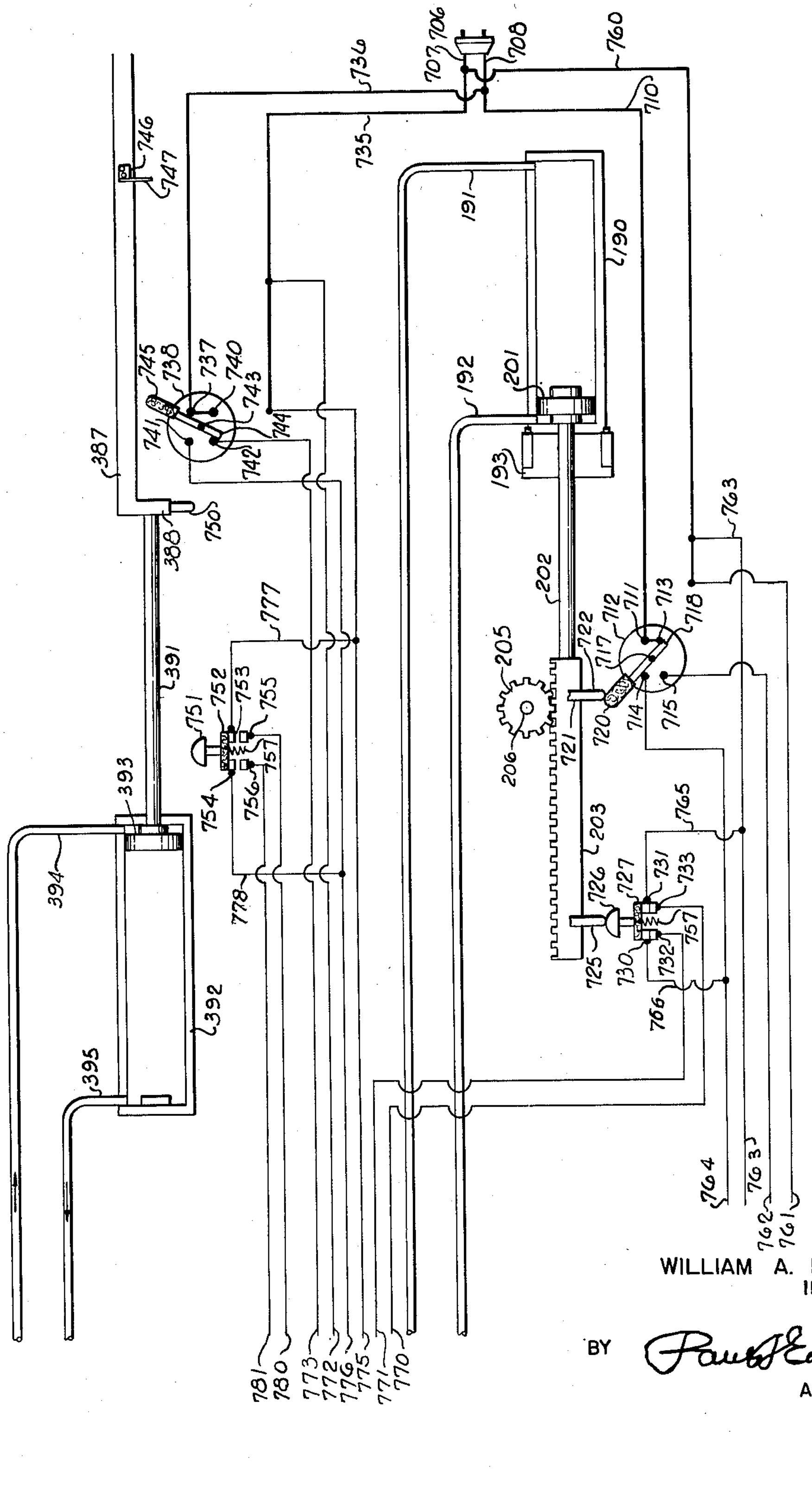
FIG. 120-A
WILLIAM A. EARLY,
INVENTOR.
BY Paul Eaton
ATTORNEY.

Dec. 11, 1951 W. A. EARLY 2,578,521

DOVETAILING MACHINE

Filed Dec. 30, 1946 53 Sheets-Sheet 52

WILLIAM A. EARLY, INVENTOR.

By Paul B. Eaton

Attorney

Dec. 11, 1951 W. A. EARLY 2,578,521

DOVETAILING MACHINE

Filed Dec. 30, 1946 53 Sheets-Sheet 53

WILLIAM A. EARLY,
Inventor.

By [signature]

Attorney

Patented Dec. 11, 1951 2,578,521

UNITED STATES PATENT OFFICE 2,578,521

DOVETAILING MACHINE

William A. Early, Lenoir, N. C., assignor of one-third to Kent-Coffey Manufacturing Company, Lenoir, and one-third to Drexel Furniture Company, Drexel, N. C., both corporations of Delaware Application December 30, 1946, Serial No. 719,243

18 Claims. (Cl. 144—87)

This invention relates to a wood-working machine, and more especially to a machine for cutting dovetails and tenons in the ends of pieces of wood and the like for the making of furniture, especially for the joining together of the front, sides, and back portion of drawers which are used in various articles of furniture, such as bureaus, dressers, chifforobes, tables, cabinets, china closets, and the like.

Heretofore, various means have been provided in which one or two work pieces at a time could be placed in a machine and the tenons would be cut in one end of one or two work pieces, some later machines placing two work pieces together and cutting the tenons in one end of both pieces at one operation by causing the cutters to travel in an orbital path to provide tenons which are semi-elliptical in cross-section. Other machines have been provided whereby a work piece can be inserted in a machine and the grooves, or dovetails, cut in one end of the work piece at a time and then it is removed and the other end is likewise treated. It is an object of the invention to provide a wood working machine in which means are provided for conveying in step-by-step relation a plurality of work pieces through a machine and simultaneously cutting either the tenons or the dovetail grooves in both ends of the work piece at the same time.

It is another object of this invention to provide a wood-working machine having means for conveying in step-by-step relation to the machine a plurality of work pieces and simultaneously engaging opposite ends of the work pieces for cutting tenons or grooves therein. This is accomplished by other means for raising and lowering the bits for cutting the grooves or tenons in such a manner in case it is desired to cut tenons in one end of the work piece and grooves in the other end of the work piece, then the lower step of the vertically disposed cutting bits on one side of the machine would be adjusted to the same elevation as the horizontal or upper cutting bits on the other side of the machine so that as the work pieces are moved through the machine in step-by-step relation, the bits for cutting the groove would be caused to move inwardly and outwardly in a straight line to cut the grooves in one end of the work piece, while the bits for cutting the tenons in the other end of the work piece would be caused to move in an up-and-down and sidewise relation in an orbital path to thereby cut the tenons in the other end simultaneously with the cutting of the grooves in the other end of the work piece.

It is another object of this invention to provide in a wood-working machine a pair of assemblies disposed in the upper part of the machine case carrying a plurality of rotary bits and a pair of assemblies in the lower part of the machine, each carrying a plurality of rotary bits with conveyor means for moving a plurality of work pieces through the machine in step-by-step relation with automatically controlled means for moving the bits into contact with the ends of the work pieces to cut tenons or grooves therein, the machine being so arranged that clamping means are provided for clamping the work pieces in position while they are in a state of rest for a cutting operation, and which clamping means then move out of clamping relation when the conveyor moves the work pieces for another step.

It is another object of this invention to provide in a wood-working machine a pair of assemblies of vertically disposed rotary cutting bits mounted in the lower portion of the machine and another pair of assemblies of horizontally disposed rotary cutting bits mounted in the upper part of the machine, with means for adjusting the position of the bits, as desired, so that in case of an irregularly shaped piece of wood or other object being processed, where one end of the work piece would be at a higher elevation than the other end, such as is shown in Fig. 105, the bit assemblies can be adjusted to any desired position as to elevation, so as to cause tenons or grooves, or grooves and tenons to be cut in the opposed ends of the work piece simultaneously.

It is another object of this invention to provide a wood-working machine for cutting tenons or grooves, or both, simultaneously in the opposed ends of a work piece, such as parts of a drawer for furniture, wherein a plurality of cutting bits are provided on each side of the path traveled by the work pieces, and in this machine a conveyor is provided for moving the work pieces in step-by-step relation through the machine and automatically causing the bits to engage the ends of the work pieces to perform an operation thereon, with other automatic means for moving the conveyor another step and causing the bits to automatically engage the opposed ends of a work piece for cutting grooves, or tenons therein. In fact the whole operation, except the feeding of the work pieces onto the conveyor, being fed automatically once the machine has been set for a given type of work piece.

Some of the objects of the invention having been stated, other objects will appear as the description proceeds when taken in connection with the accompanying drawing, in which Figure 1 is a front elevation of the machine;

Figure 33 is a sectional view taken along the line 33—33 in Figure 31;

Figure 34 is a sectional view taken along the line 34—34 in Figure 21, and being on an enlarged scale;

Figure 120:
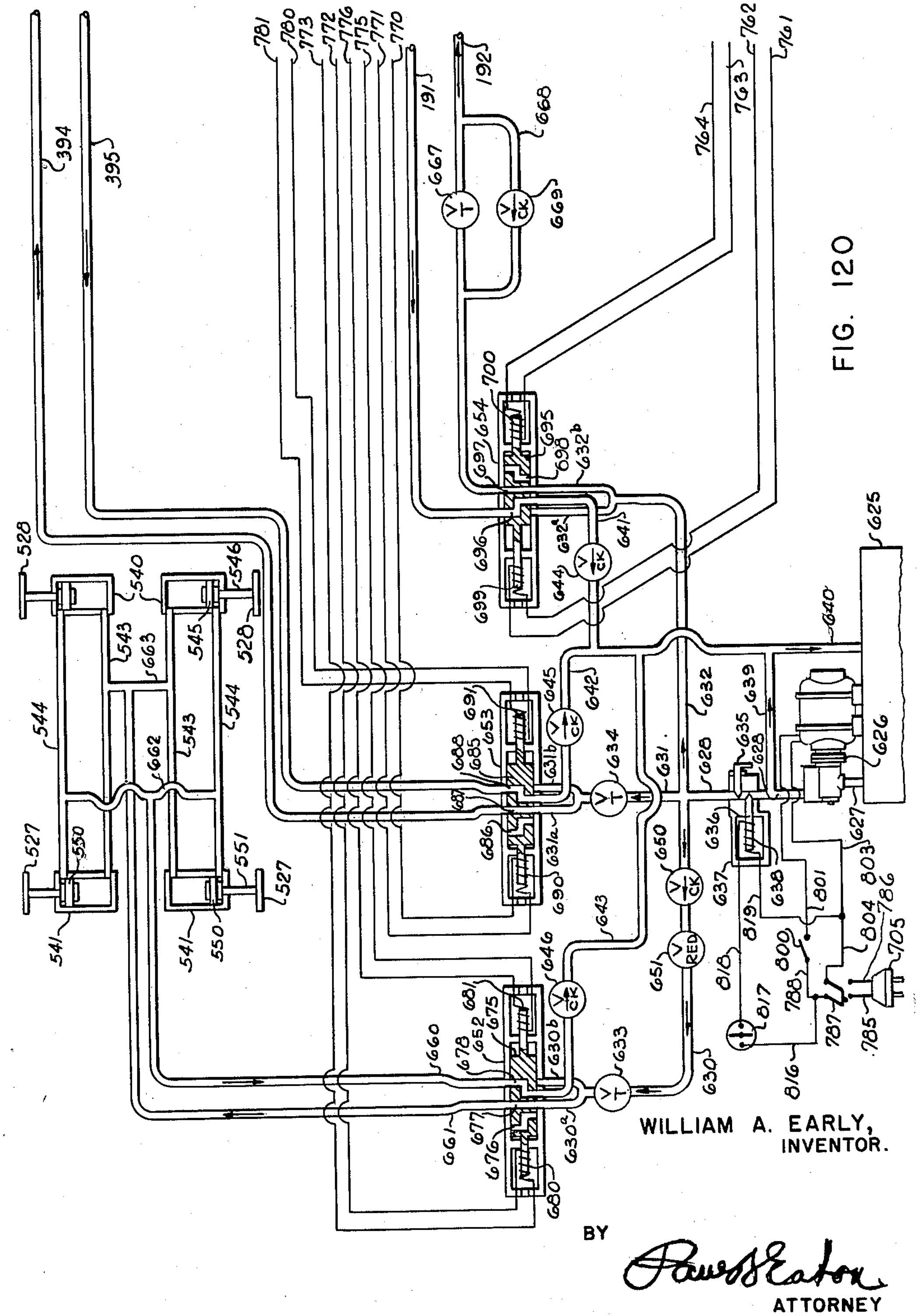
Figure 120 is a partial schematic diagram of the control mechanism for the wood-working machine.
Figure 121:
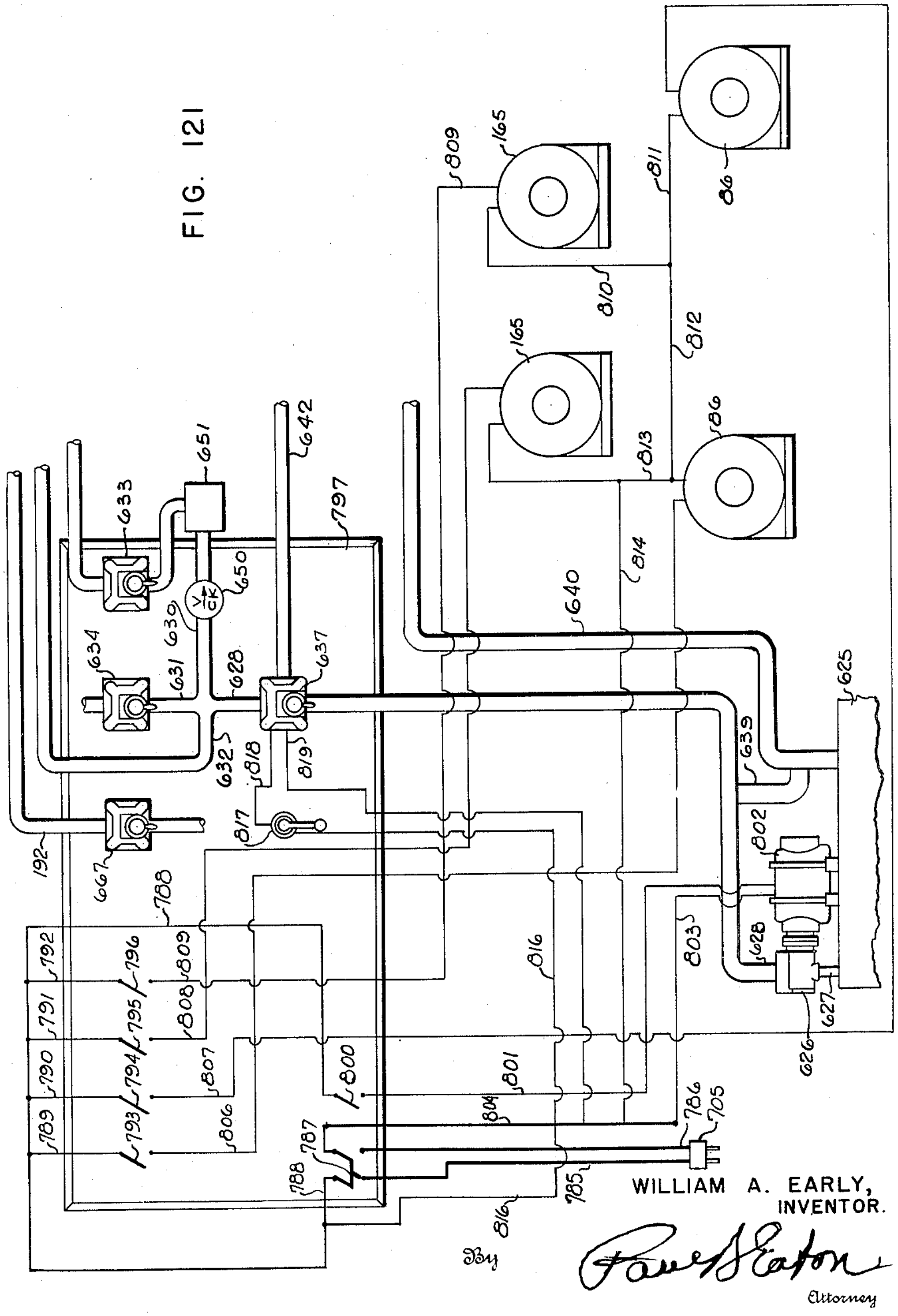
Figure 122:
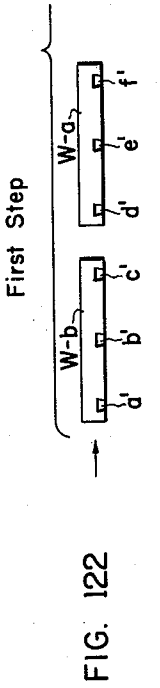
Figure 123:
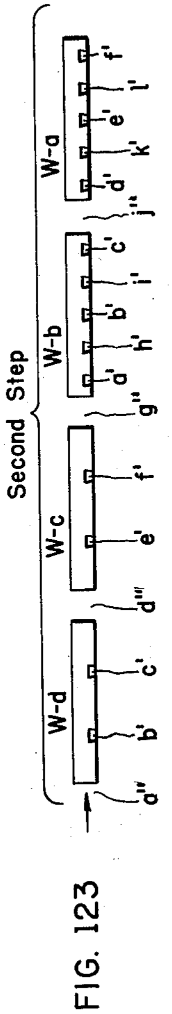
Figure 124:
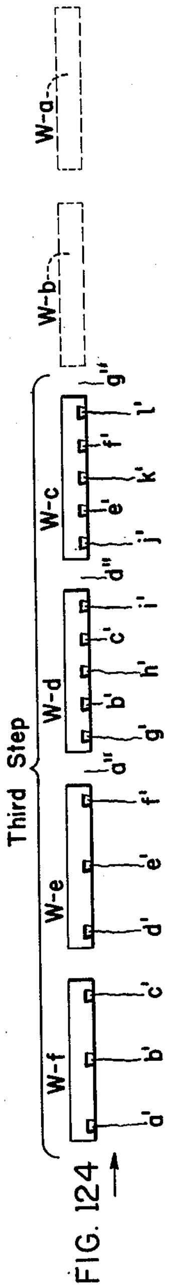
Figure 125:
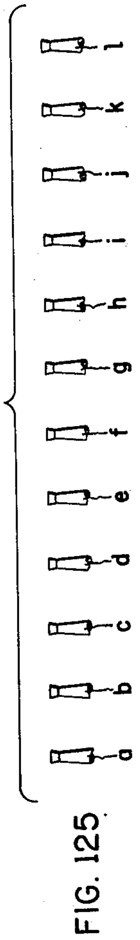

Figure 120-A is a partial schematic diagram of the control mechanism for the wood-working machine and is an extension of Figure 120;

Figure 121 is a schematic wiring diagram of the electric circuit in the wood-working machine;

Figure 122 is a schematic diagram showing how the first two leading workpieces are operated upon by the cutters;

Figure 123 is a schematic diagram showing the result upon the second cutting operation of the cutting bits on the ends of the workpieces;

Figure 124 is a schematic diagram showing the third step in the operation of the cutters on the ends of the workpieces;

Figure 125 is a schematic diagram of the cutter bit assembly showing the relation of the cutter bits to the schematic diagram shown in Figures 122 to 124, inclusive.

Referring more specifically to the drawings, the entire machine is bottomed upon a rectangular framework comprising elongated side members 10 and 11 which are joined together at their ends by cross straps 12 and 13, with a plurality of intermediate connecting straps 14 and 15 mounted between the inner surfaces of frame members 10 and 11.

It will be noted that a groove 16, which is on the front of the machine, has upper and lower surfaces which are parallel with each other, while a groove 17, which is on the rear of the machine, has a flat lower surface, while its upper surface slopes inwardly and downwardly. This is for purposes of adjustment and will be presently described.

Slidably mounted on top of the members 10 and 11, and above the grooves 16 and 17, is a plate member 20 which has a down-turned lip 21 on the rear edge thereof. Disposed on the interior surface of 21 is a tongue member 22 which has a plurality of vertically disposed holes therethrough, through which pass a plurality of screws 23, which are threadably imbedded in suitable threaded holes in the lower surface of plate 20. The front edge of plate 20 has a down-turned lip 25 which has threadably secured therein a screw 26 which confines a tongue 27 in position to hold the plate 20 on the trackway in adjusted position.

As both sides of the machine are identical, but opposite hand to each other, a description of one side will likewise apply to the other side of the machine and like reference characters will apply.

Figures 22, 23:
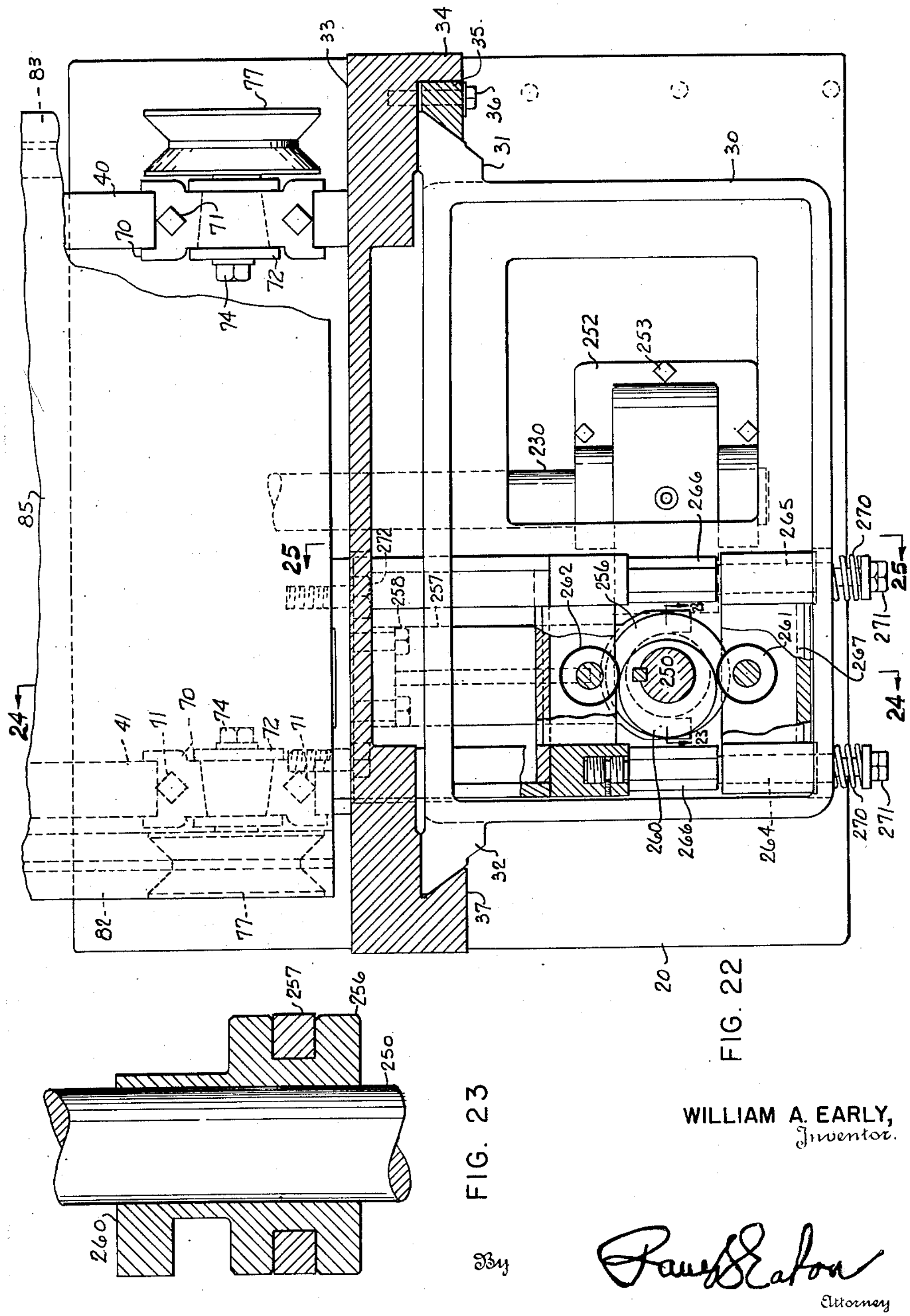
Figure 22 is a sectional plan view taken along the line 22—22 in Figure 16.
Figure 23 is a sectional view taken along the line 23—23 in Figure 22.

Rising upwardly from, and usually cast integrally with the plate 20 is a hollow member 30 which is rectangular in cross section. Each of the members 30 have, on opposed sidewalls near their proximate edges, outwardly projecting tongues 31 and 32 (see Figure 22) and these tongues are adapted to serve as guides for a vertically slidable plate 33, which plate 33 supports both the upper and lower cutter bit assemblies to be presently described. The plate 33 has an inner-turned tongue 34 against which fits a guiding tongue 35, which is secured to the plate 33 by means of suitable screws 36 penetrating the guiding tongues 35 and being threadably imbedded in the lower surface of the plate 33.

Figure 21:
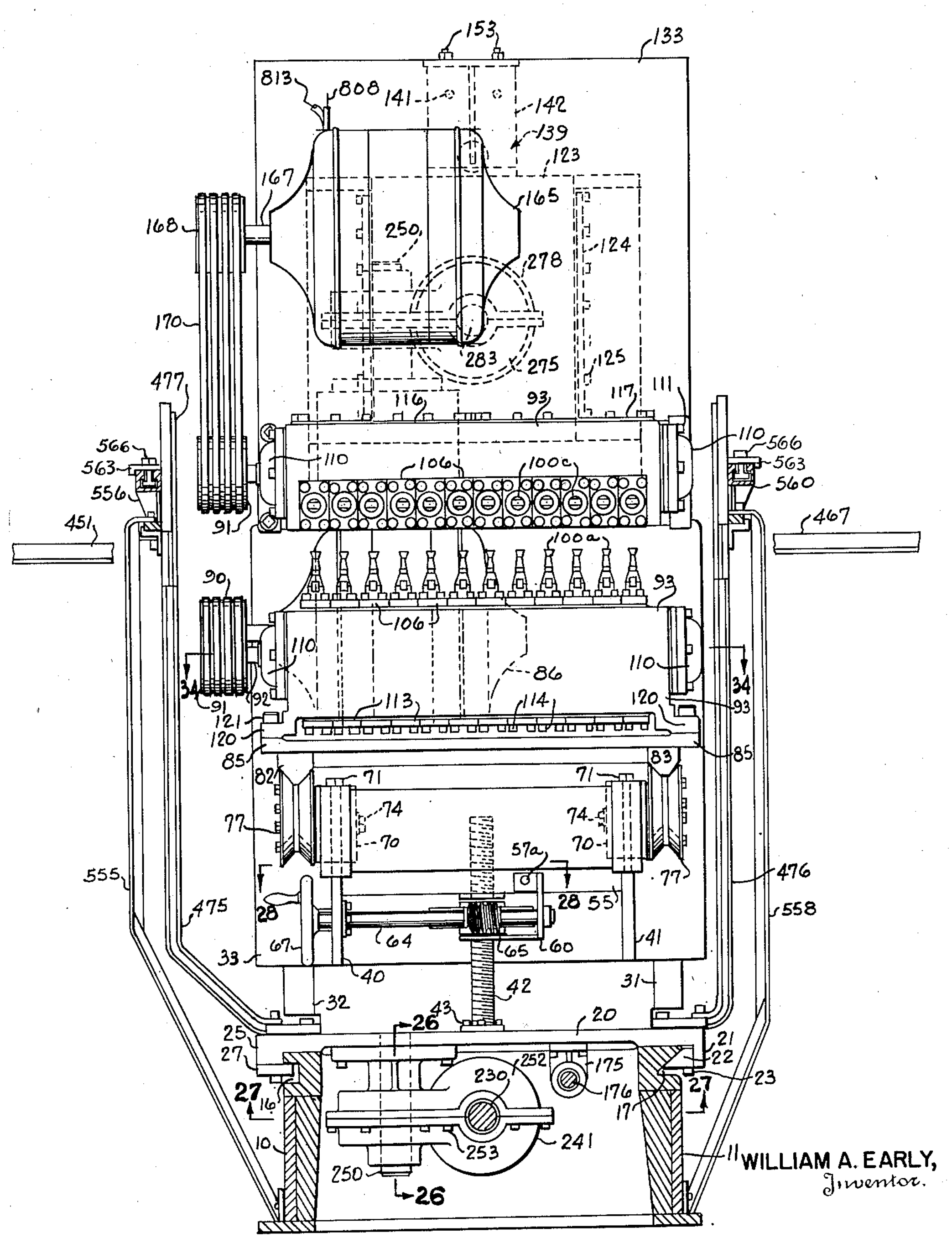
Figure 21 is a vertical sectional view taken along the line 21—21 in Figure 1.

At the other edge of plate 33 an inwardly dovetailed tongue 37 is provided which fits against the corresponding tongue 32 to provide a guideway for the plate 33. The amount of play between the plate 33 and the tongues 31 and 32 is adjusted by means of the screws 36 as is illustrated in Figure 21. Both of the plates 33 project upwardly and then laterally from each other as at 38 and on which suitable mechanism associated with the upper cutter bit assemblies is supported and which will be later described.

Projecting inwardly towards each other from both of the vertical slidable plates 33 are the spaced arms 40 and 41, which support the lower cutter bit assemblies. For purposes of vertical adjustment of the lower cutter bit assemblies, there is secured to plate 20 the headed end of a vertically disposed threaded shaft 42 by means of screws 43. Each shaft 42 projects upwardly and has threadably mounted thereon a hub member 44 which has threadably mounted thereon a worm gear 45 and a collar 46 which is threaded onto the hub portion 44 to hold the worm gear 45 in position on the hub 44. Suitable pins 47 penetrate the collar 46, the worm gear 45 and a portion of the hub 44 for preventing relative movement between these parts (see Figure 29).

The upper end of collar 44 is recessed and accommodates a race ring 48 which supports a plurality of balls 50 and a race ring 51 rests on top of these balls and is disposed in a recess in the lower surface of a member 53 which is secured to the lower surface of a channel member 55 by any suitable means, such as screws 56. Secured on the exterior surface of the channel member 55 are angles 57 and 57*a* which support a housing 58 for the parts just described.

Figures 28, 29:
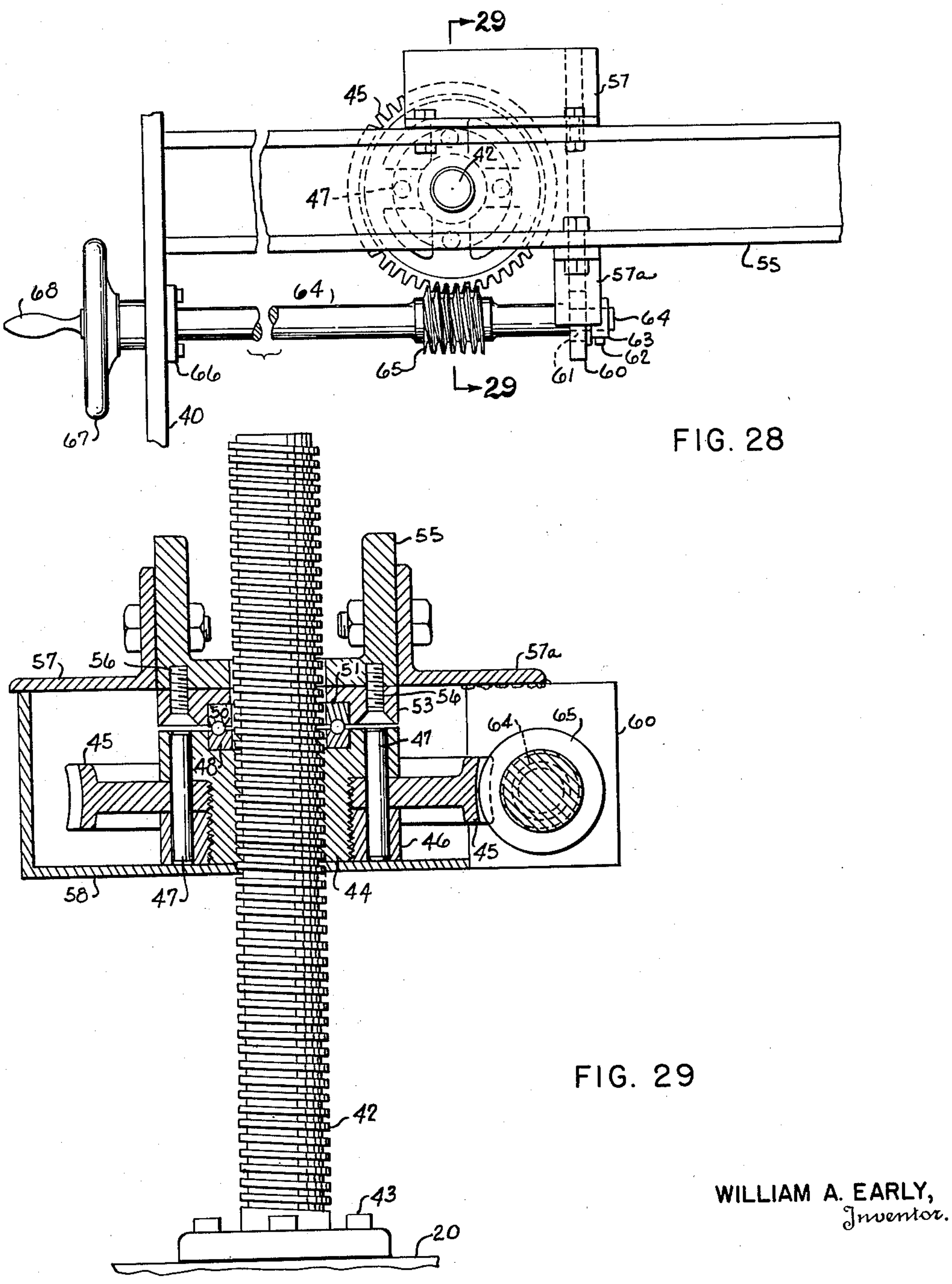
Figure 28 is a top plan view taken along the line 28—28 in Figure 21.
Figure 29 is a vertical sectional view taken along the line 29—29 in Figure 28.
Figure 30:
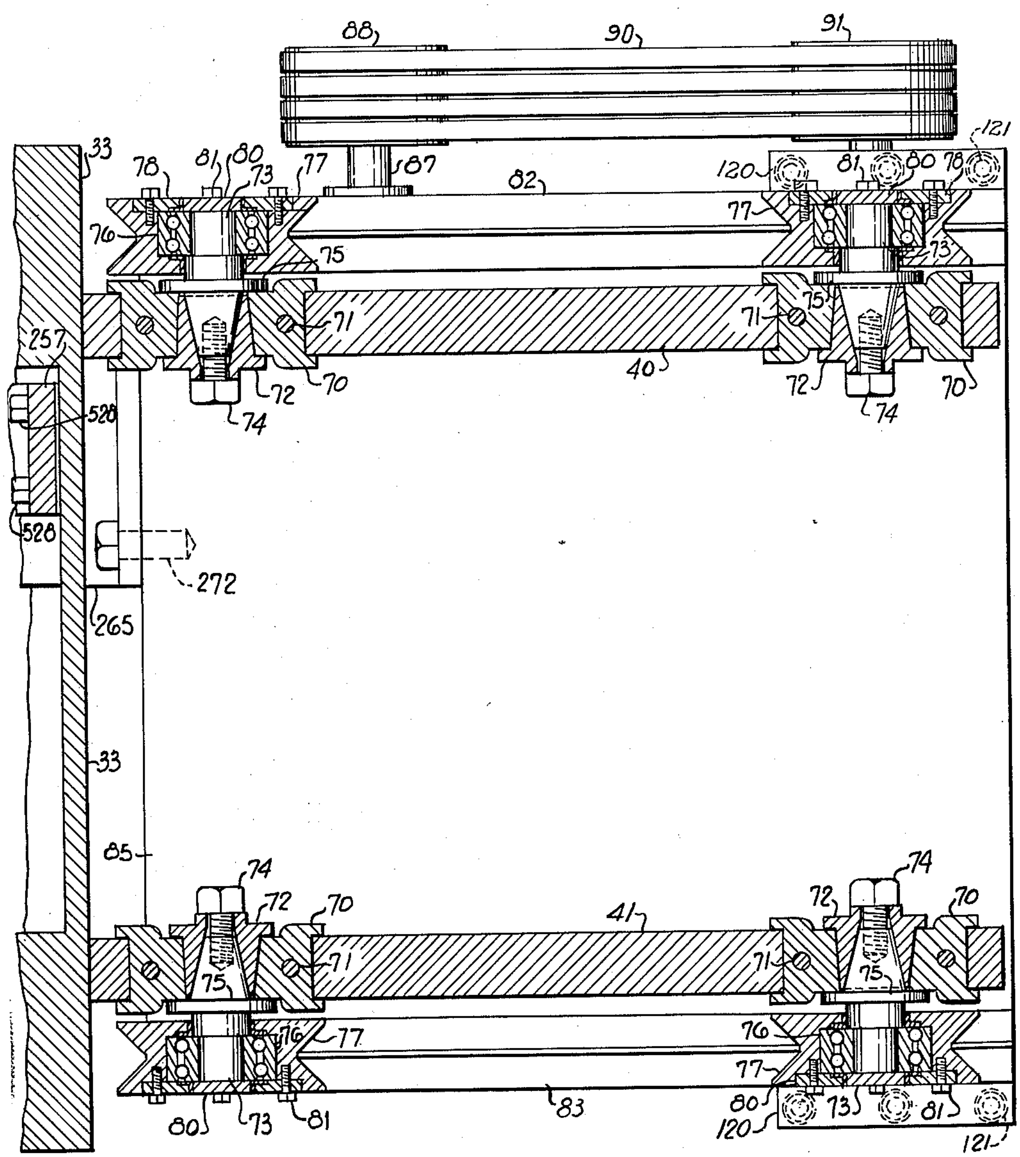
Figure 30 is a sectional view on an enlarged scale taken along the line 30—30 in Figure 6, and looking upwardly.

The housing 58 is integral with the left-hand angle 57 in Figure 29. The angle 57*a* has, welded to the lower surface thereof, a plate 60. The plate 60 has mounted therein a bearing 61. This bearing 61 rotatably receives one end of a shaft 64. Shaft 64 has a collar 63 secured to the end thereof by a screw 62 threadably mounted in collar 63 to confine lateral movement of the shaft 64, which shaft has fixedly secured thereon a worm 65. The shaft 64 is also rotatably mounted in a bearing 66 disposed in the arm 40, and the outer end of shaft 64 has secured thereon a hand wheel 67, having a handle 68 for turning same (see Figures 21, 28 and 29).

By referring to Figures 6, 21, 24, 25, and 30, it is seen that in the upper portion of the members 40 and 41 rectangular openings are provided into which bearing blocks 70 are fitted and held in position by means of screws 71, and these bearing blocks have a central aperture therein into which a tapered tubular plug 72 fits. Penetrating each of said plugs and also having a tapered bore which is adapted to fit the tapered portion of the plugs is a bearing shaft 73, and this tapered portion of the shaft has a threaded hole therein for receiving a screw 74. The bearing pin 73 has a collar 75 integral therewith, whereby upon tightening of the screw 74, the bearing shaft 73 will be secured in position. The bearing shaft 73 has thereon a ball bearing 76 which is also disposed within a grooved wheel 77, the ball bearing 76 being confined in position by an annular collar 78, while the ball bearing is confined on the shaft 73 by a washer 80 and a screw 81 penetrating the end of the shaft 73. All four of these bearing and wheel assemblies are identical and bear like reference characters, the four wheels 77 supporting trackways 82 and 83.

Integral with the trackways 82 and 83 is a plate 85 and plate 85 supports the lower cutter bit assemblies and therefore permits lateral inward and outward movement of the lower cutter bit assemblies. Mounted on the plate 85 is an electric motor 86 having a motor shaft 87 on which is mounted a V-pulley 88 and which drives the lower cutting bits in said mechanism to be presently described.

The V-pulley 88 has mounted thereon a plurality of V-belts 90 which are also mounted on a V-pulley 91 disposed on a shaft 92 mounted in a housing 93. Housing 93 is mounted on the plate 85. The shaft 92 is rotatably mounted in ball bearings 94 disposed in the ends of the housing 93 and has a collar 95 near one end thereof, and nuts 96 near the other end thereof for confining a plurality of helical gears 97 which mesh with helical pinions 98 which are integral with the shank portions 99 which are mounted in ball bearings 101 and project outwardly and have cutting bit portions 100. The cutting bits 100 are preferably not integral with the shank portions 99 but the outer end of the shank portions 99 are threaded as at 102 and have a sleeve 103 screwed thereon, and which sleeve at its outer end has a threaded bore therein which receives a threaded portion 105 of the cutting bits 100. Surrounding the sleeve 103 is an annular collar 106 which is secured to the exterior of the housing 93 by any suitable means, such as screws 107, slidably penetrating the annular collar 106 and being threadably imbedded in the housing 93.

Shaft 92 has extending longitudinally thereof a keyway in which is mounted an elongated key 108 and each of the helical gears 97 also have a keyway therein which prevents relative rotative motion between the shaft 92 and the helical gears 97.

Both ends of the housing 93 have caps 110 secured thereon by means of screws 111 which close the ends of the housings 93, the right-hand member 10 in Figure 34 being imperforate, while the one at the left-hand end of Figure 34 has a hole therethrough through which the shaft 92 passes out for reception of the V-pulley 91.

There is disposed in one of the walls of the housing 93 a hole 112 normally closed by a cap 113 and each cap 113 is confined in position by means of screw 114.

Figure 35:
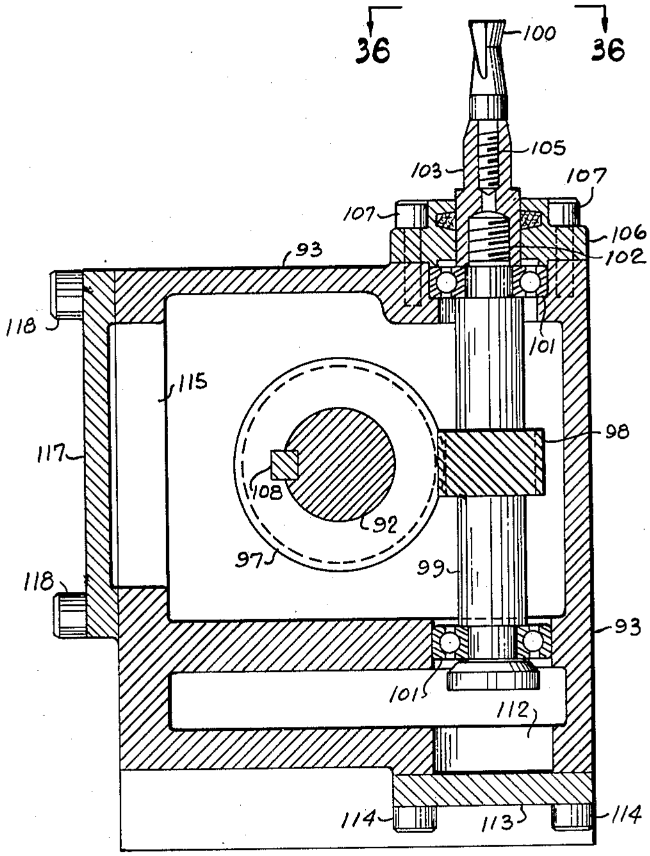
Figure 35 is a sectional view taken along the line 35—35 in Figure 33.
Figure 36:
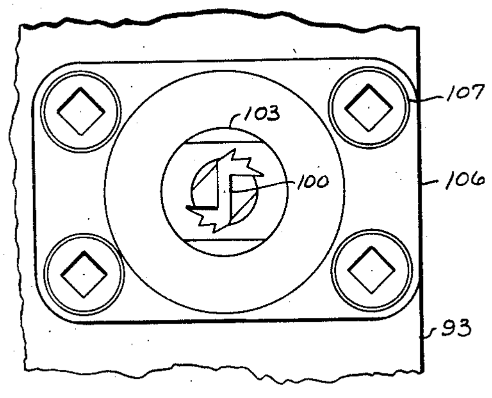
Figure 36 is a top plan view taken along the line 36—36 in Figure 35 showing the mountings for one of the cutting bits.

Also one of the sidewalls of the housing 93 has an elongated opening 115 which is covered by a pair of plates 116 and 117, which plates are confined in position by means of screws 118. These plates 116 (see Figures 33, 34 and 35) can be removed when it is desired to replace one or more of the helical gears 97, after shaft 92 has been partially or wholly removed from the casing, depending upon which of the helical gears have to be replaced.

Figures 8, 9, 10, 12:
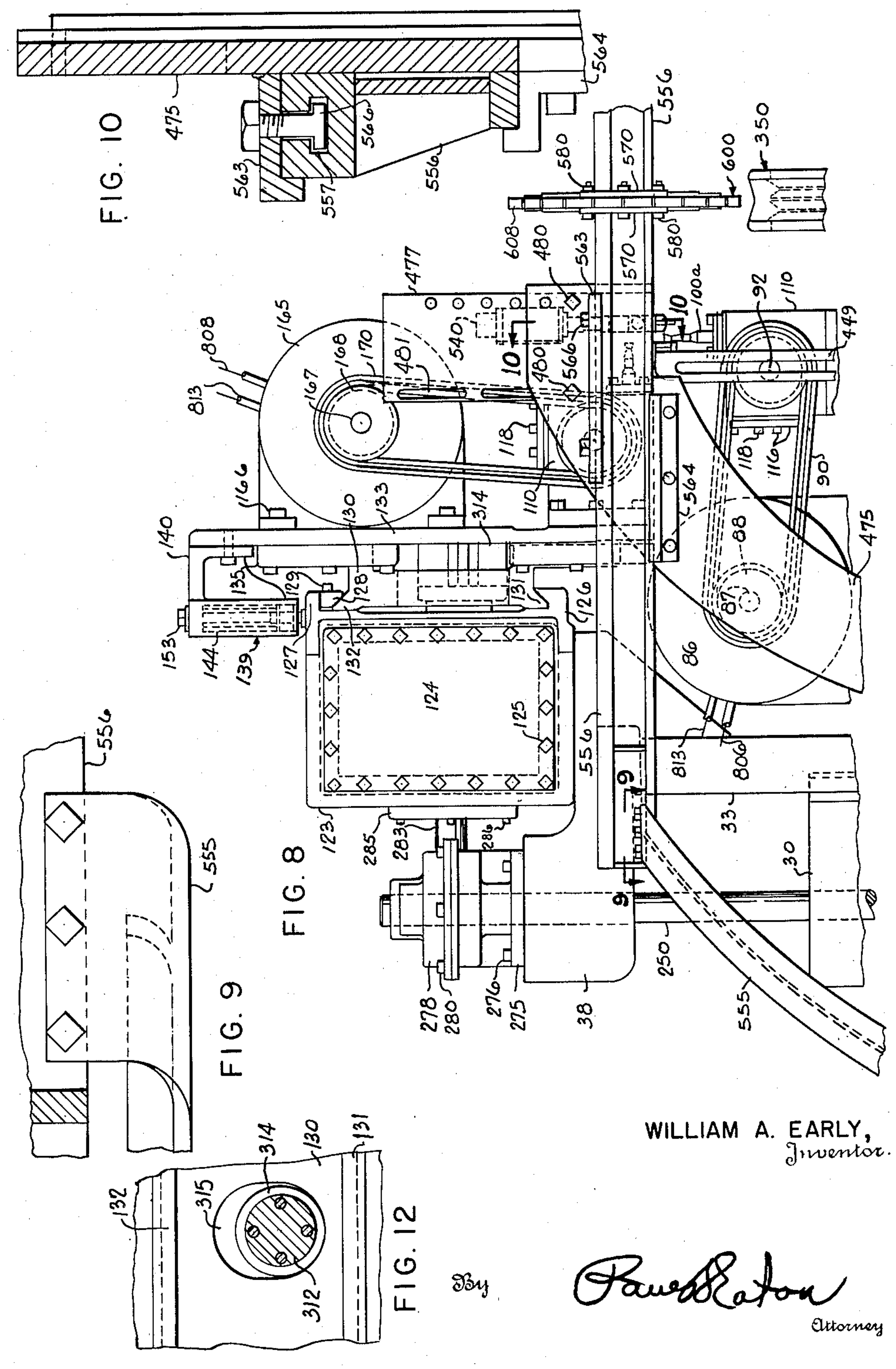
Figure 8 is an elevation on an enlarged scale of the upper left-hand portion of Figure 1.
Figure 9 is top plan view on an enlarged scale taken along the line 9—9 in Figure 8.
Figure 10 is a vertical sectional view on an enlarged scale taken along the line 10—10 in Figure 8.
Figure 12 is detail view taken along the line 12—12 in Figure 11.

The housing 93 for the lower cutters has projections 120 at each end thereof which are penetrated by suitable screws 121 which are threadably imbedded in the plate 85 for mounting the housing (see Figures 21 and 33). Integral with the portion 38 (see Figures 1, 8, 11 and 18) is a housing 123 disposed on the upper side of portion 38 which has its front and rear sides open, and which are covered by plates 124 secured in position by means of screws 125. On the right-hand face of this housing 123, as shown in Figure 8, are projections 126 and 127. The lower projection 126 has a groove therein, while the upper portion 127 has a beveled strip 128 secured therein by means of screws 129, very much in the same manner as the structure shown in Figure 21.

There is a dovetailed bracket 130 having projections 131 and 132 thereon which fit into the grooves in projections 126 and 127, and has lateral sliding movement in said grooves. A plate 133 is mounted for vertical sliding movement in Figure 8 (also see Figure 19) and this plate 133 has on each side thereof vertically disposed tongues 134, (Figure 18), and 135 (Figure 8) which fit over the outer edges of laterally projecting and vertically disposed tongues 136 and 137 (Figures 19 and 20) disposed in vertical relation on the side edges of member 130. This allows vertical movement to member 133, and member 130 has lateral movement as a result of its tongues 131 and 132 sliding in the horizontally disposed grooves in the side of the housing 123.

Figure 53:
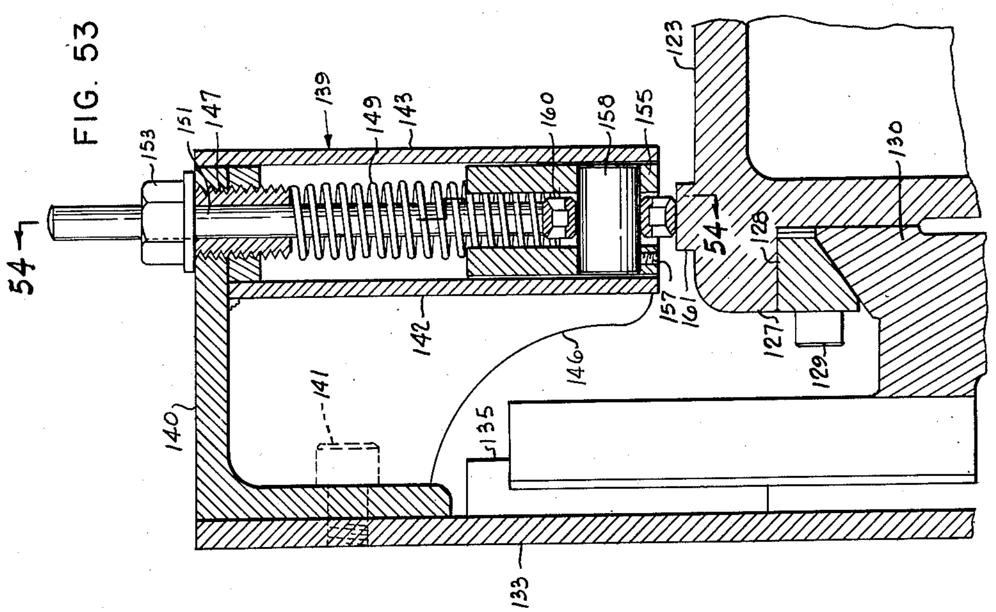
Figure 53 is a vertical sectional view taken along the line 53—53 in Figure 18.
Figure 54:
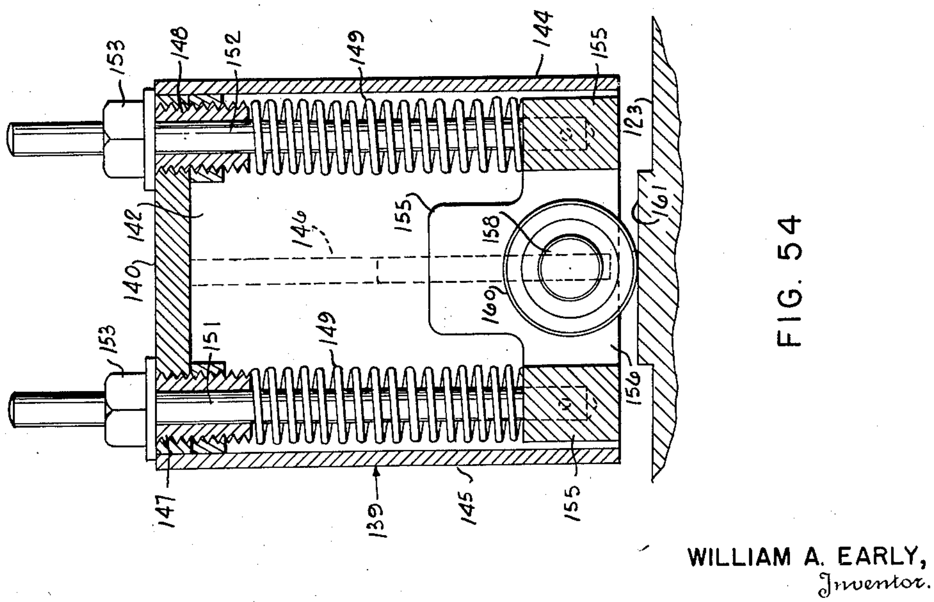
Figure 54 is a vertical sectional view taken along the line 54—54 in Figure 53.

Secured to the upper portion of plate 133 is a bracket 140 (see Figures 8, 11, 19, 20, 53 and 54) by any suitable means, such as a screw 141. By referring to Figures 53 and 54, it is observed that there is a casing 139, having inner and outer walls 142 and 143 and end walls 144 and 145, and being open at the top and bottom, but the upper end of this casing 139 is welded to the lower surface and outer edges of the bracket 140 and depends in vertical position. To the inner wall 142 is welded a rib 146, which is also welded to the vertical leg of bracket 140.

Threadably mounted in vertical position in the horizontal leg of bracket 140 are two bushings 147 and 148 (see Figure 54) which project downwardly between the walls 142 and 143. Slidably mounted in these bushings and projecting above the horizontal leg of bracket 140 is a pair of shafts 151 and 152 which has stop nuts 153 near their upper ends and disposed above the horizontal leg of bracket 140 for limiting downward movement of the shafts 151 and 152. Surrounding shafts 151 and 152 are compression springs 149 which sustain the weight of the upper cutter assembly.

Suitably secured to the lower ends of the shafts 151 and 152 is a bearing housing 155 which has a cavity 156 centrally disposed therein in which is fixed by means of a set screw 157, a pin 158, upon which is mounted a roller bearing wheel 160 which is adapted to rest on a suitable trackway 161, disposed on top of the housing 123. This arrangement relieves much of the excess weight of the motor and cutter bits assembly from the cam-operating mechanism to be presently described.

By referring to Figures 1, 8, 11, 19 and 20, it is seen that an electric motor 165 is secured to the plate 133 by any suitable means, such as screws 166. This electric motor has a shaft 167 on which is mounted a V-pulley 168 having a plurality of grooves therein for receiving a plurality of V-belts 170, which V-belts in turn are mounted on a multiple grooved V-pulley 91, which is identical to the pulley 91 for the lower cutter bit assembly. This pulley 91 is mounted on a shaft 92, disposed in a housing 93, all of which has been previously described with reference to Figures 33 and 34 which show the structure of the lower cutter bit assemblies. Like reference characters will apply to all of the portions of the upper cutter bit assemblies, and the structure is identical except that the housing 93 in the upper cutter bit assemblies is turned 90 degrees to cause the cutter bits to be disposed in a horizontal plane instead of a vertical plane as is the case in the lower cutters.

For the sake of clearness in the description of method of operation, the lower cutter bits will be referred to as 100*a* and 100*b*, while the upper cutter bits will be referred to as 100*c* and 100*d*, yet their structure is identical as has previously been stated.

Figure 6:
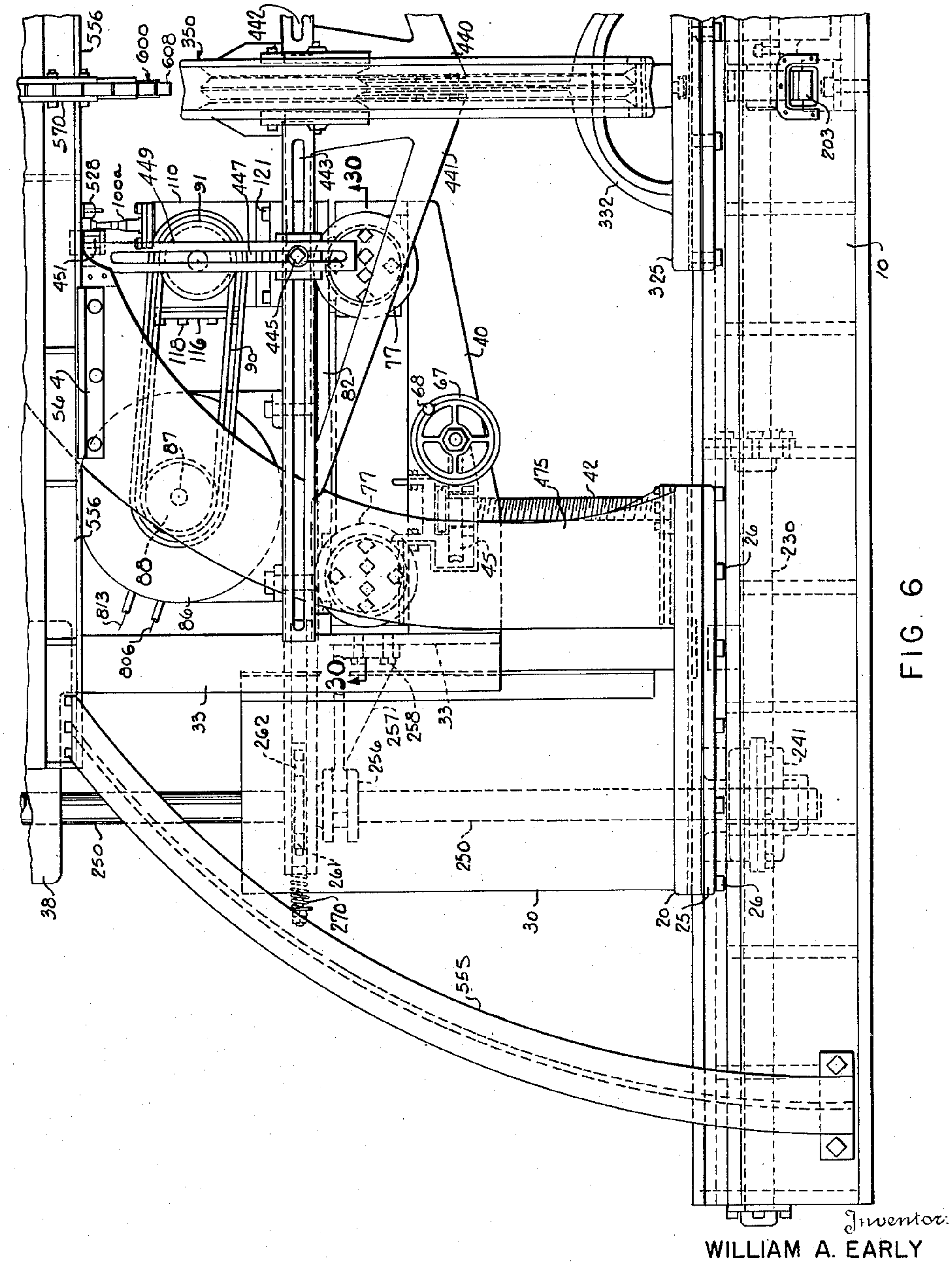
Figure 6 is an enlarged elevation of the lower left-hand portion of Figure 1.
Figure 7:
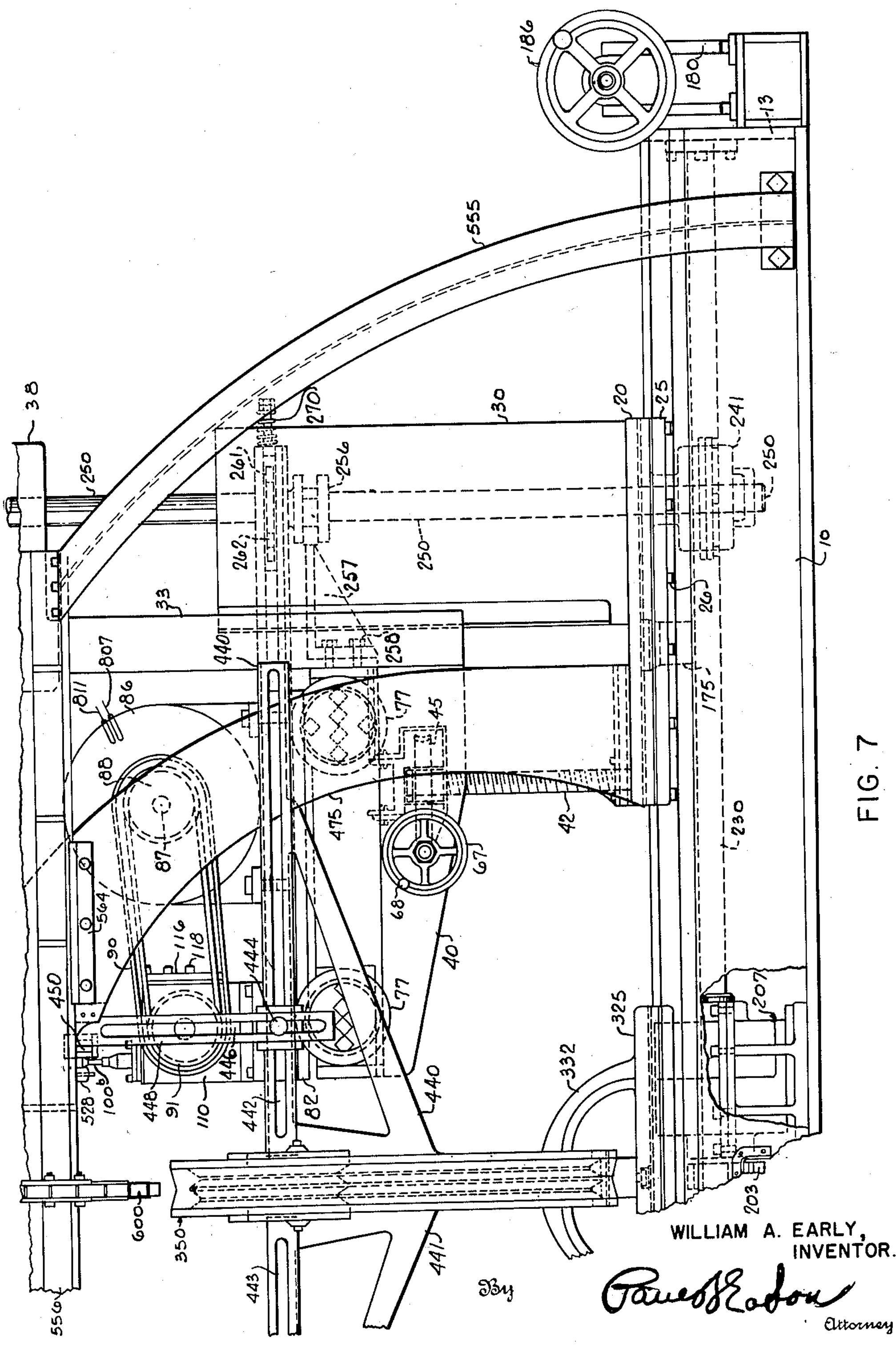
Figure 7 is an elevation on an enlarged scale of the lower right-hand portion of Figure 1.

It has already been described with especial reference to Figures 6, 28 and 29, as to how the member 33 along with supports 40 and 41 is raised manually by hand wheel 67 and vertical screw threaded shaft 42. It is evident that since the upper cutter assemblies are mounted on and supported by the plate 33, that both the upper and the lower cutter assemblies on one side of the machine are simultaneously raised manually to the desired position.

It is evident that the lower cutter bits do not have to have orbital movement but only an in-and-out movement for cutting grooves in the end of a workpiece, that is, the female grooves which are to receive the male tenons formed by the upper cutters. In addition to the in-and-out movement of the cutter bits in cutting the grooves, and the mechanism for effecting this will be presently described, there must be a manual adjustment of these upper and lower cutter bits, depending upon the length of the workpieces being passed through the machine. This manual adjustment of the position of the upper and lower cutter bit assemblies is shown in Figures 21 and 89 to 102, inclusive.

It has already been described as to how the plates 20 are mounted on top of the members 10 and 11. These plates 20 have secured to the lower surface thereof brackets 175 which are threadably penetrated by a shaft 176 which is threaded between its bearing portions 177 disposed in the cross ribs 14 and 15 and end portion 12. This shaft 176 has one or more couplings 178 therein for purposes of ease of installation and removal. The shaft 176 extends from coupling 178 adjacent end wall 13 and enters a housing 180 and has a worm gear 181 secured thereon, which meshes with a worm 182, also mounted in the housing 180, and said worm 182 having integral therewith a shaft 184 mounted in a bearing 185 rising from side member 10 and has a hand wheel 186 thereon, whereby the hand wheel can be turned and the two ends of the shaft being threaded in opposite directions will cause the upper and lower cutter assemblies to be moved towards or away from each other, depending upon the direction of rotation of the hand wheel 186 (see Figures 1, 5, 19, 20, 21, 91, 97 and 100).

The moving of the lower cutter members inwardly and outwardly to form the female grooves in the end of a workpiece and for imparting an orbital movement to the upper cutters with respect to the workpiece during a cutting operation is carried out automatically. Figures 6, 7, 8, 11, 15, 16, 18, 19, 20, 21, 24, 26 and 27 show this means for automatically effecting movement of the lower cutter bit assemblies both inwardly and outwardly towards each other and in imparting vertical movement in an orbital path to the upper cutters, after they have been moved inwardly manually to cutting position in respect to the workpiece.

Figure 1:
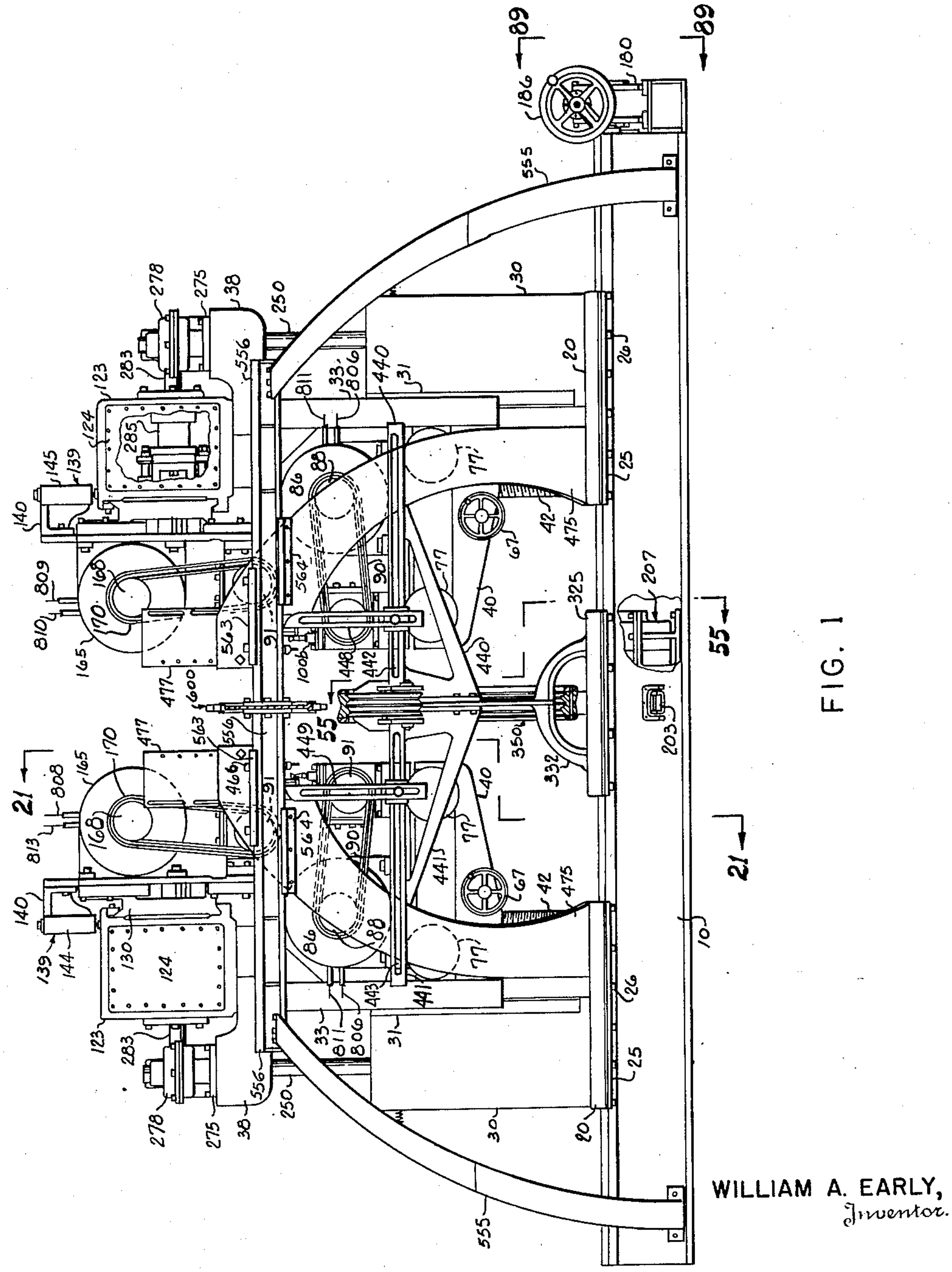
Figures 2, 3, 4:
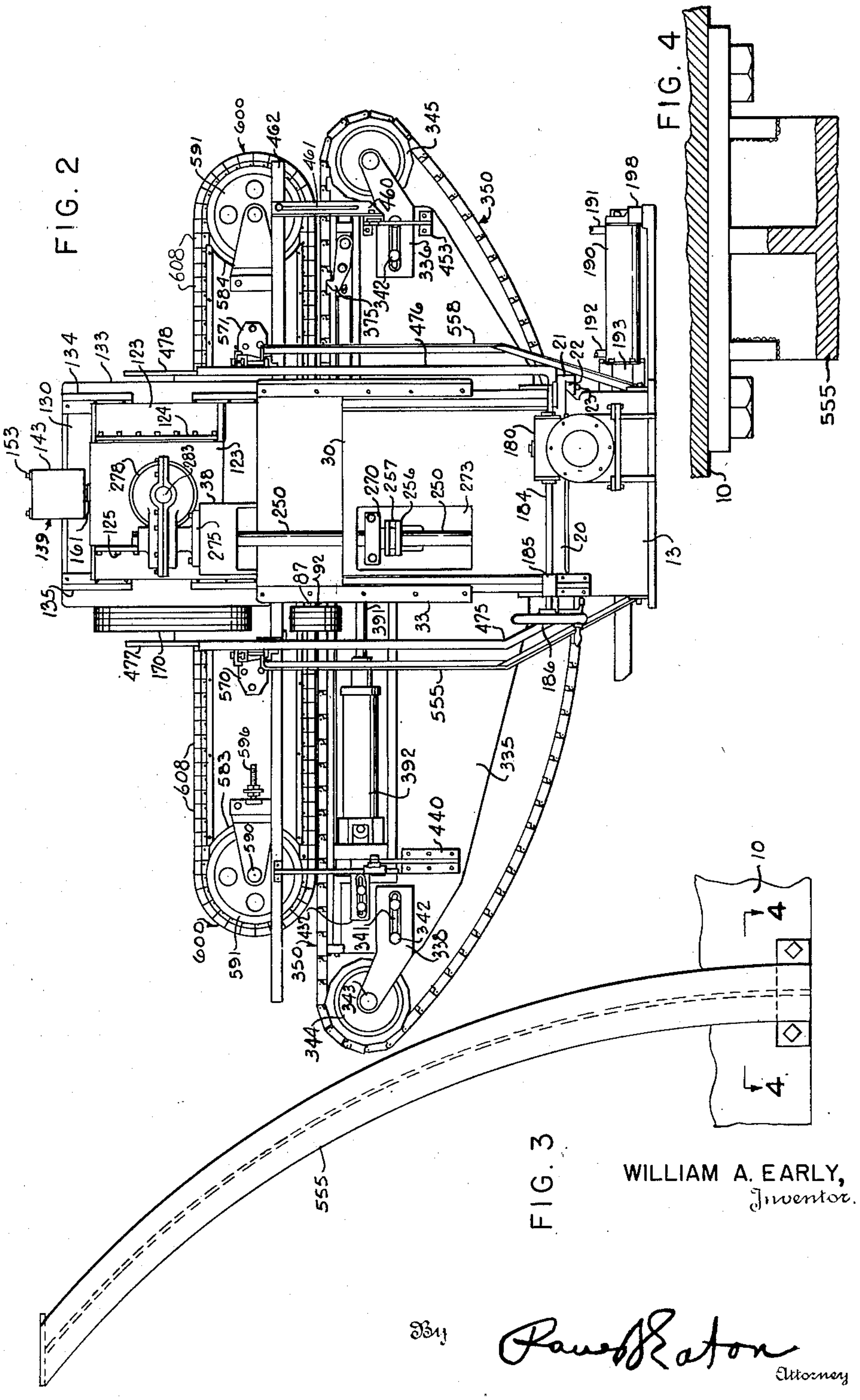
Figure 2 is a side elevation looking from the right- hand side of Figure 1.
Figure 3 is an elevation of one of the end braces of the framework.
Figure 4 is a horizontal sectional view taken along the line 4—4 in Figure 3.
Figure 5:
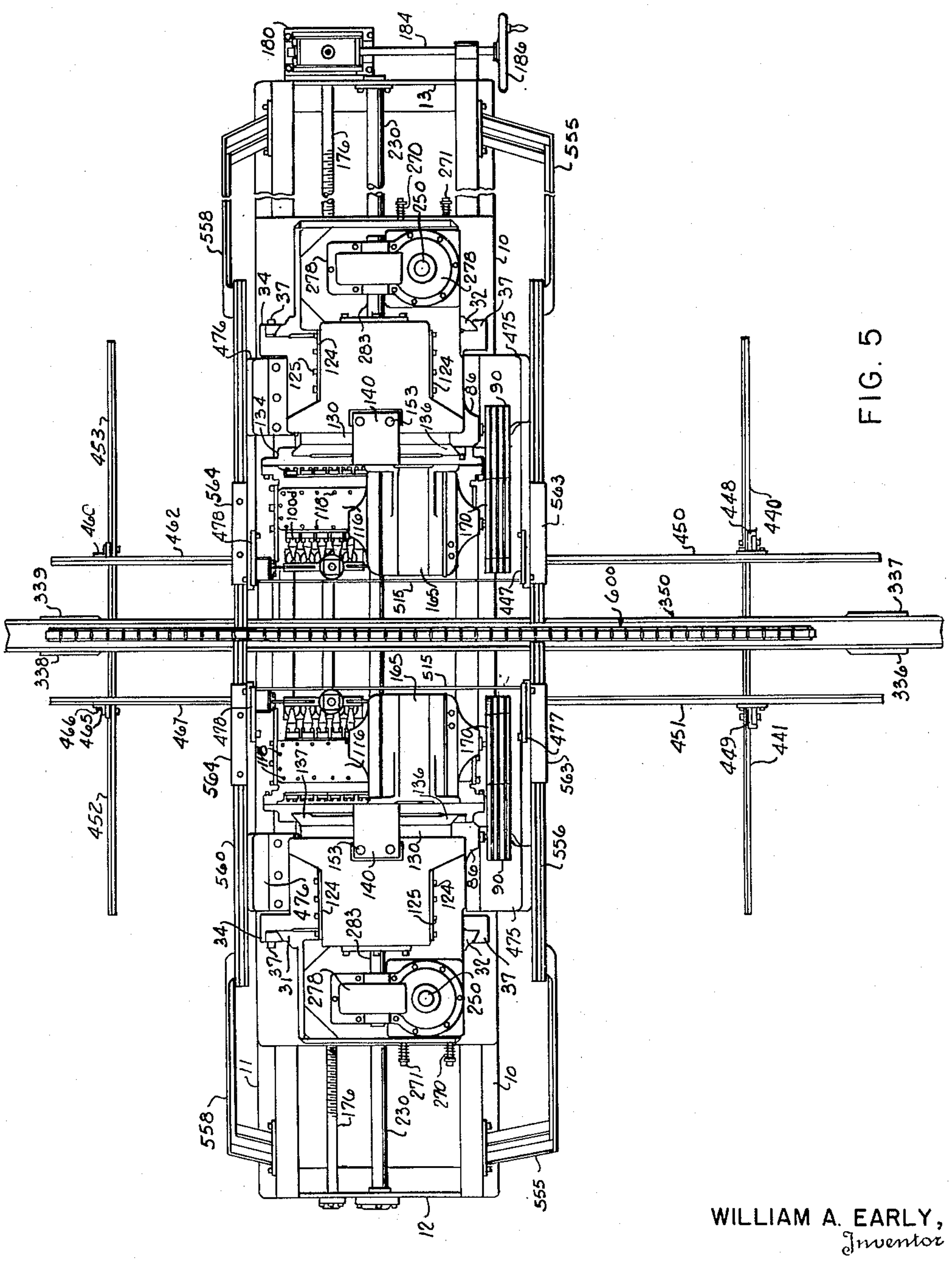
Figure 5 is a top plan view of the machine as shown in Figure 1.
Figures 16, 17:
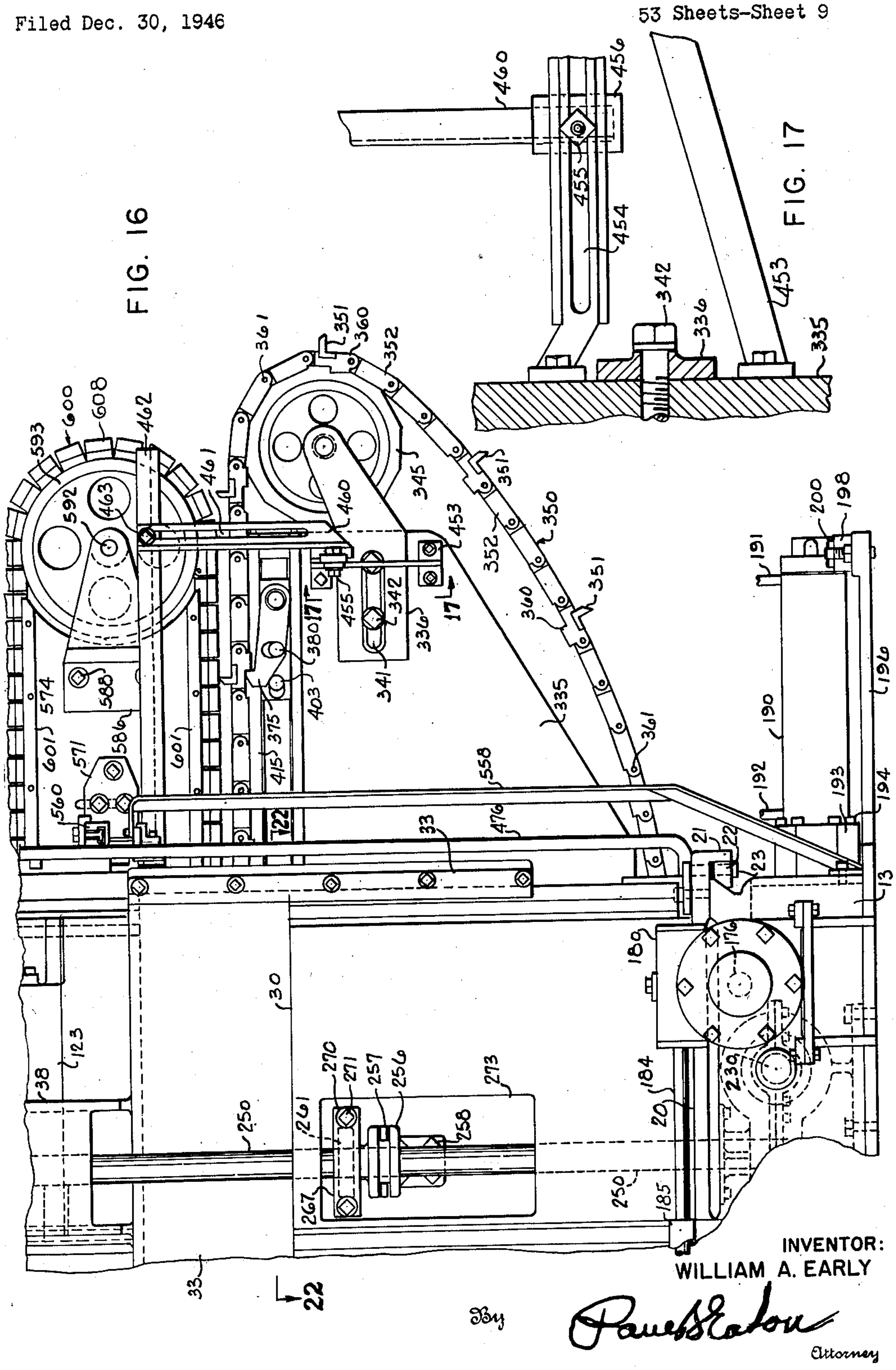
Figure 16 is an elevation on an enlarged scale of the lower right-hand portion of Figure 2.
Figure 17 is an enlarged detailed view taken along the line 17—17 in Figure 16.

By referring to Figures 2, 16 and 120-A there is shown a cylinder 190 for controlling and operating the cutter assemblies. This cylinder has pipes 191 and 192 leading to opposed ends thereof. The cylinder is secured to the rear member 11 by having an enlarged thickened flange portion 193 which is penetrated by bolts 194, which threadably engage a block 195 disposed on the inside of member 11 (see Figure 94). There is a bed plate 196 secured between the lower proximate surfaces of members 10 and 11 which extends rearwardly. The cylinder at its other end has a flanged projection 198 which is penetrated by bolts 200 (Figure 16) which are threaded into the plate 196 to anchor that end of the cylinder. The cylinder 190 has slidably mounted therein a piston 201 which has a piston shaft or rod 202 affixed thereto and which projects out of the front end of the cylinder 190.

The rod 202 has integral therewith a rack portion 203 which projects through a suitable hole in the member 11 and block member 195 and the rack portion 203 engages a pinion 205 (see Figure 94) fixed on a shaft 206 disposed in a housing 207 which is disposed between the base members 10 and 11.

By referring to Figures 82 through 86 it is seen that on shaft 206 there is a sleeve 210 on which the pinion 205 is mounted. This pinion 205 is elongated and projects inwardly inside the housing 207 and has an enlarged portion 211. The portion 211 has a plurality of cavities 212 therein, in which a plurality of dogs 213 are pivotally mounted, said dogs normally being pressed against the inside surface of an annular portion 214 by means of tension springs 215 which are disposed in suitable cavities 216 in the member 211. The annular portion 214 has a plurality of cavities 217 therein, into which the ends of the dogs 213 are adapted to engage when the pinion 205 is rotated in one direction. The annular portion 214 is a part of a disk 220 which is secured to a collar 221 by means of screws 222.

A suitable key 223 is disposed in a keyway in the shaft 206 and not only keys the collar 221 to shaft 206, but also projects into a slot in one end of the sleeve 210 and keys it on the shaft 206. The key 223 also keys on the shaft 206 a pinion 225 which meshes with a pinion 226 keyed by a key 227 on a shaft 230 which projects from both sides of the housing 207 and is rotatably mounted in a plurality of base bearing blocks 231. The shaft 206 and the pinion 205 are rotatably mounted in bushings 232 and 233 disposed in the sidewalls of the housing 207.

The shaft 230 is rotatably mounted in bushings 234 and 235, mounted in the sidewalls of the casing 207. The casing 207 is formed of two halves, 207*a* for the top and 207*b* for the bottom which are secured to each other by any suitable means, such as screws 236 (Figures 87 and 88), so that the top 207*a* can be removed to gain access to the parts just described, when desired. The lower half 207*b* of the casing 207 is secured to the plate 196 by any suitable means, such as screws 237.

Disposed between the side members 10 and 11 and in spaced relation to each other, are two housings 241. The shaft 230 penetrates both of these housings 241 and is mounted in spaced bushings 243 and 244. Disposed between the bushings 243 and 244 is a helical gear 245 which is keyed to the shaft 230 by means of a key 246. The helical gear 245 meshes with another helical gear 248 which is keyed as at 249 on a vertical shaft 250, there being one of these shafts and one of these housings and associated parts on each side of the machine and like reference characters will apply.

The lower end of the shaft 250 is rotatably supported in the bottom of the housing 241. The housing 241 has a cover 252 secured thereto by any suitable means, such as screws 253, and which cover 252 has an upwardly projecting portion 254 which is secured to the lower surface of each of the slides 20 by any suitable means, such as screws 255. The vertically disposed shaft 250 projects upwardly through this portion 254 and through the slide 20 and has a grooved collar 256 secured thereon, into the groove of which fits a forked member 257, which member is secured to the vertically sliding member 33 which supports the upper and lower cutter assemblies. It is thus seen that rotation of the shaft 230 will cause inward and outward movement of the lower cutter assemblies.

The shafts 250 each have slidably mounted thereon a sleeve 256 which has a peripheral groove therein, into which the forked end of a bracket 257 fits, and this bracket is connected by screws 258 to the vertically moving plate 33. The sleeve 256 is keyed onto shaft 250 for vertical sliding movement. The sleeve 256 also has an eccentric portion 260 for engagement with rollers 261 and 262, the eccentric portion 260 being disposed in an opening between the bracket 263 and the member 267. The bracket 263 has threadably secured therein a pair of bolts 264 and 265, on which are mounted the two spacing sleeves 266 and also mounted on the shafts 264 and 265 is a member 267 which has a cavity therein in which the roller 261 is mounted. This member 267 is normally pressed to the right in Figure 24 or away from the observer in Figure 22 by means of compression springs 270 mounted on the shafts 264 and 265 and confined by nuts 271.

Figures 24, 25:
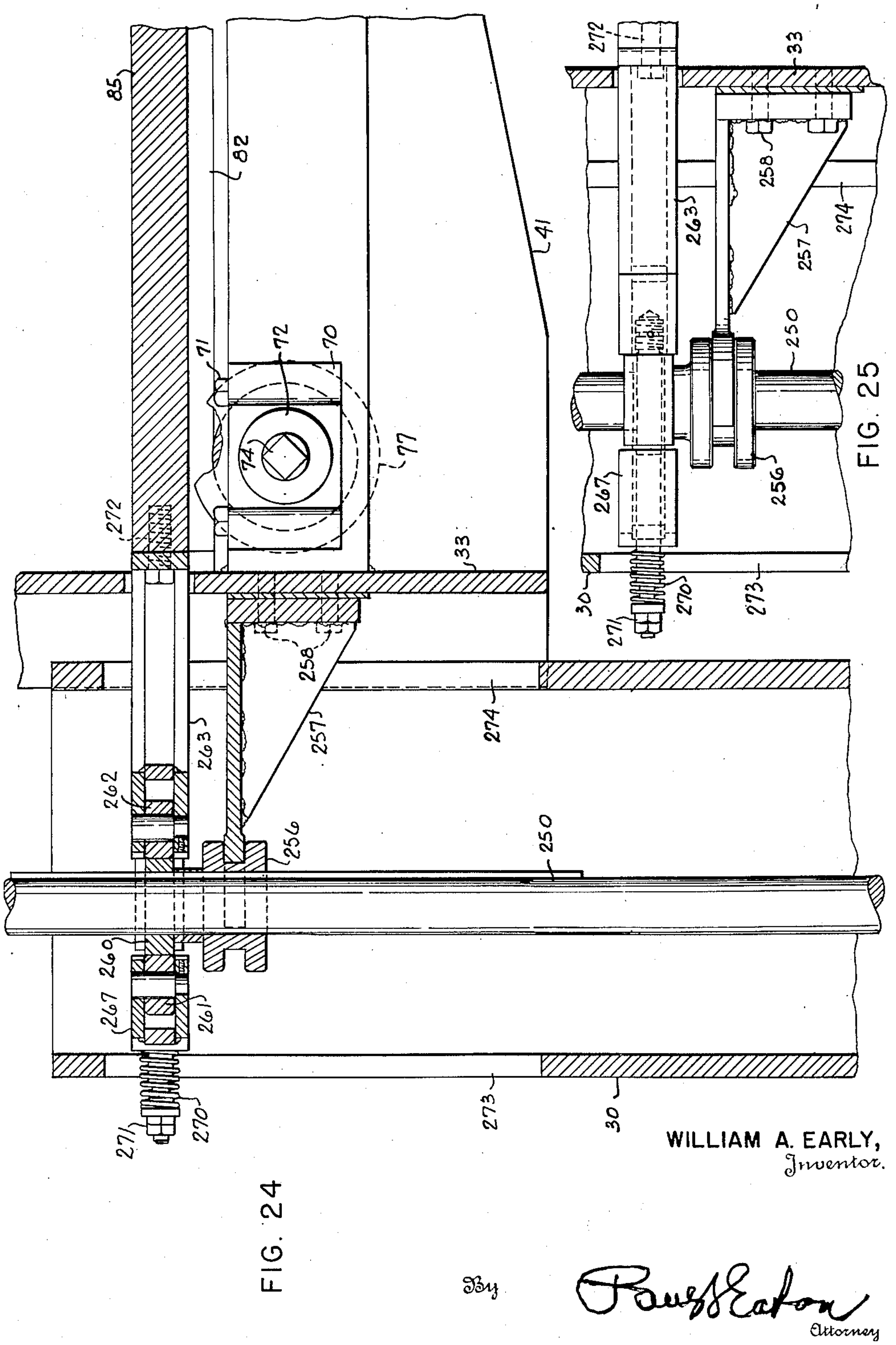
Figure 24 is a sectional view taken along the line 24—24 in Figure 22.
Figure 25 is an elevation partly in section taken along the line 25—25 in Figure 22.
Figure 26:
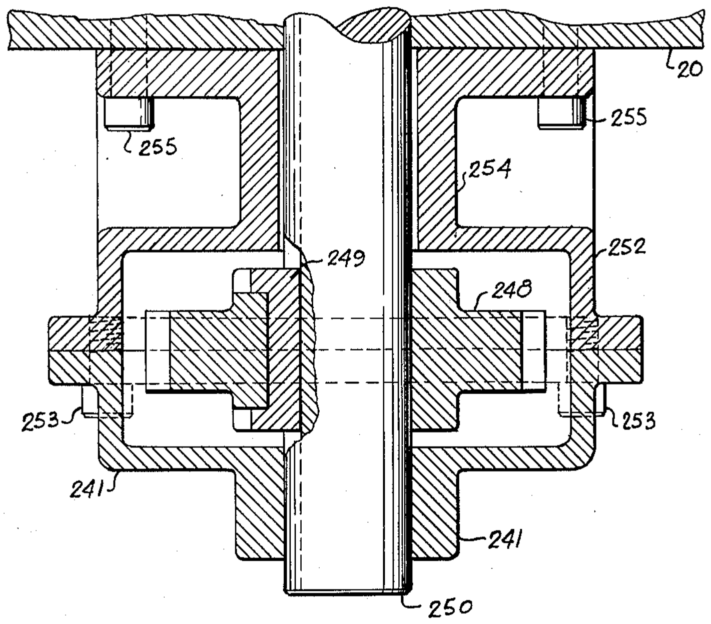
Figure 26 is a sectional view taken along the line 26—26 in Figure 21.
Figure 27:
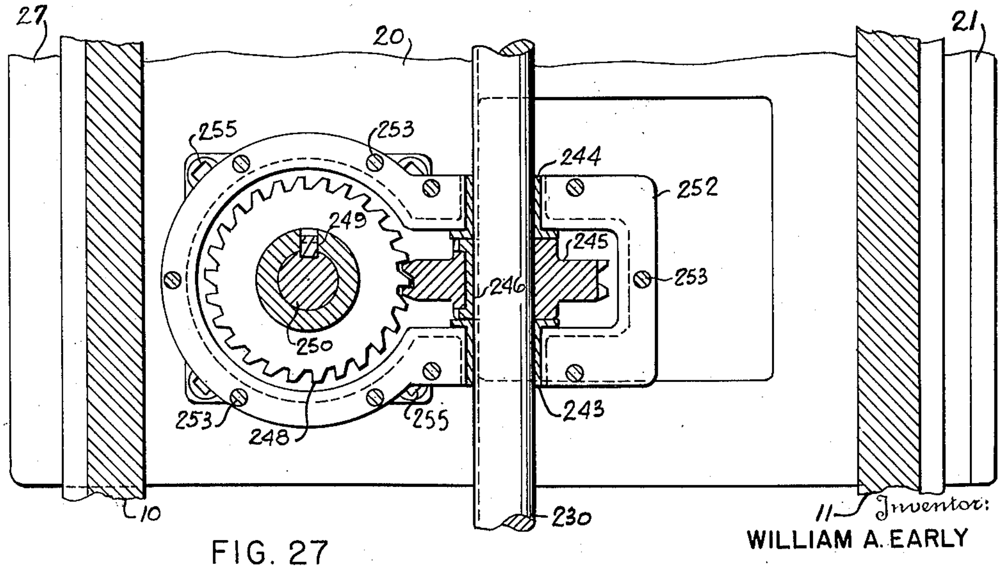
Figure 27 is a sectional view taken along the line 27—27 in Figure 21, and looking upwardly.

Bracket 263 is secured to the plate 85 as at 272. It is thus seen that as shaft 250 rotates, it imparts reciprocatory movement to the plate 85 which moves the lower cutter bits 100*a* and 100*b*, as both sides of this machine are identical, in and out in a straight line for cutting the female grooves in the end of the workpiece due to the eccentricity of cam 260. Also as the member 22 is manually raised or lowered, the forked portion of the bracket 257 will cause the sleeve 256 to move upwardly or downwardly on the shaft 250 and always be in relative position with respect to bracket 263 as shown in Figure 24.

The hollow members 30, through which the shafts 250 project, have apertures 273 and 274 therein to allow up-and-down movement of the bracket 257 and the bracket 263 and associated parts when the elevation of the cutting assemblies is raised or lowered by the manually-operated means associated with threaded shafts 42.

The two shafts 250, there being one for each side of the machine, after passing the bracket 267, project upwardly out of the top of the hollow members 30 and these shafts 250 pass through suitable bores in outwardly projecting portions 38, previously described.

Figures 11, 13, 14:
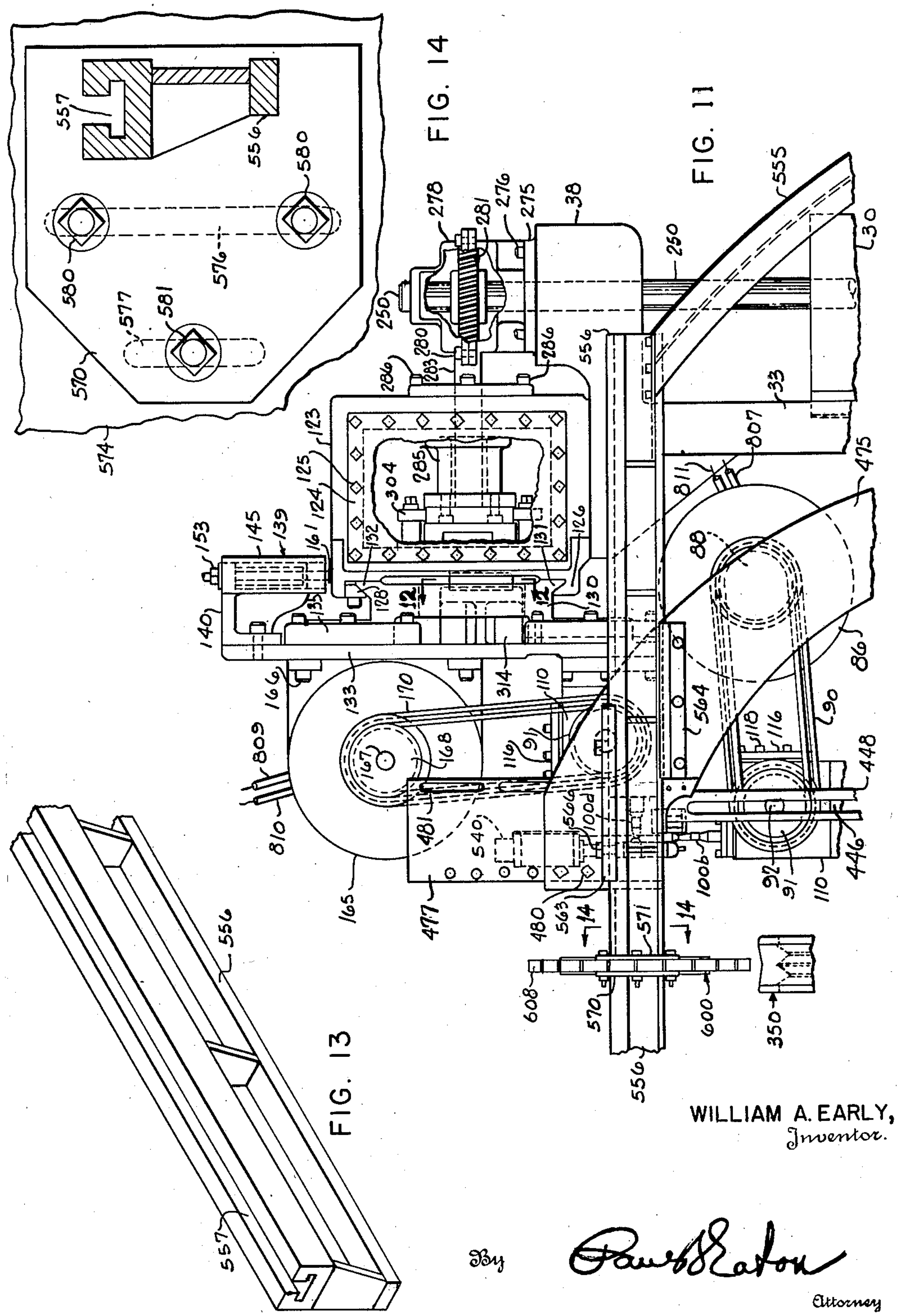
Figure 11 is an elevation on an enlarged scale of the upper right-hand portion of Figure 1.
Figure 13 is an isometric view of a portion of one of the sides for guiding the upper or pressure-applying chain associated with the conveyor.
Figure 14 is an enlarged view partly in elevation and partly in section of the guide and associated parts as shown in Figure 13; taken along the line 14—14 in Figure 11.
Figure 15:
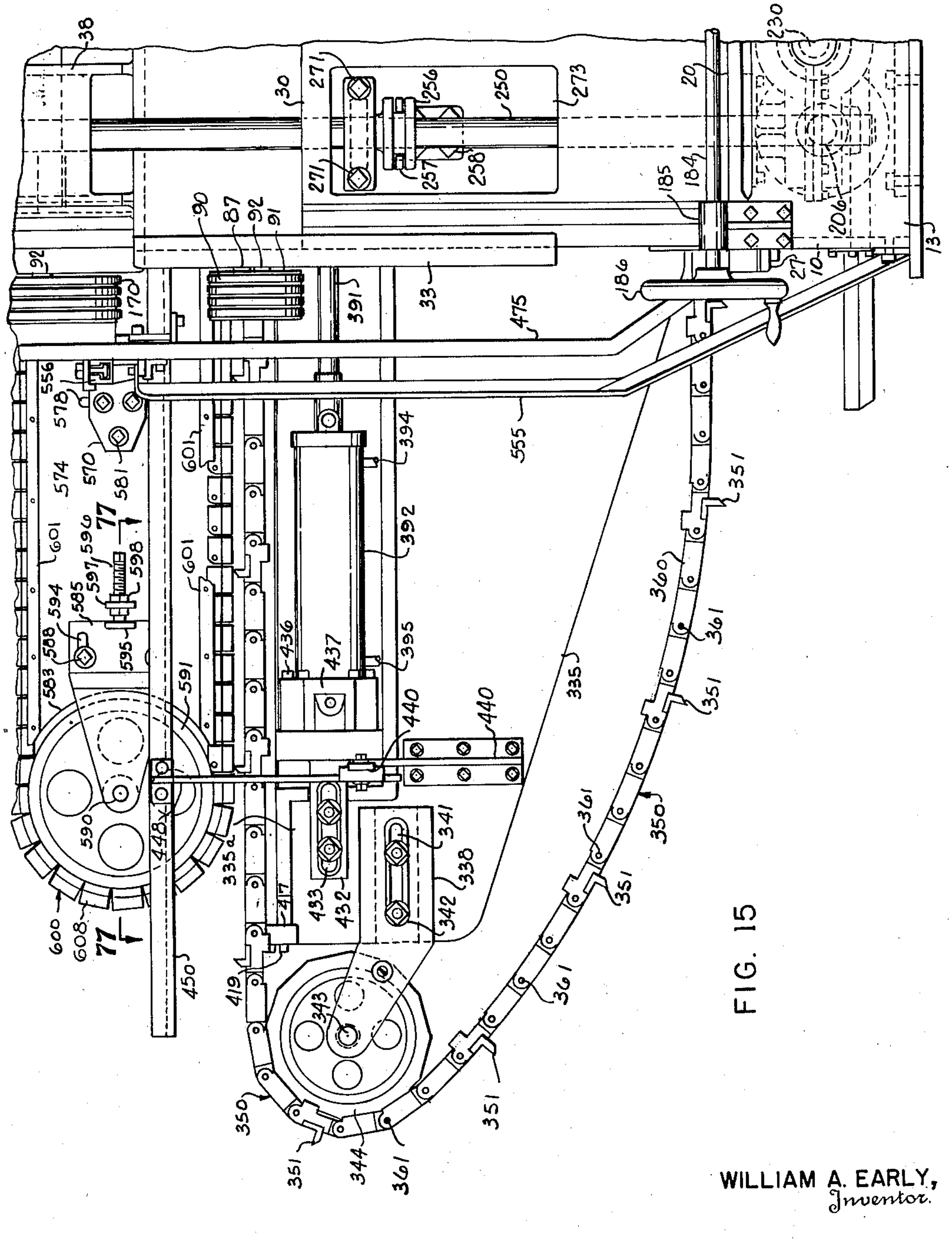
Figure 15 is an elevation on an enlarged scale of the lower left-hand portion of Figure 2.
Figure 18:
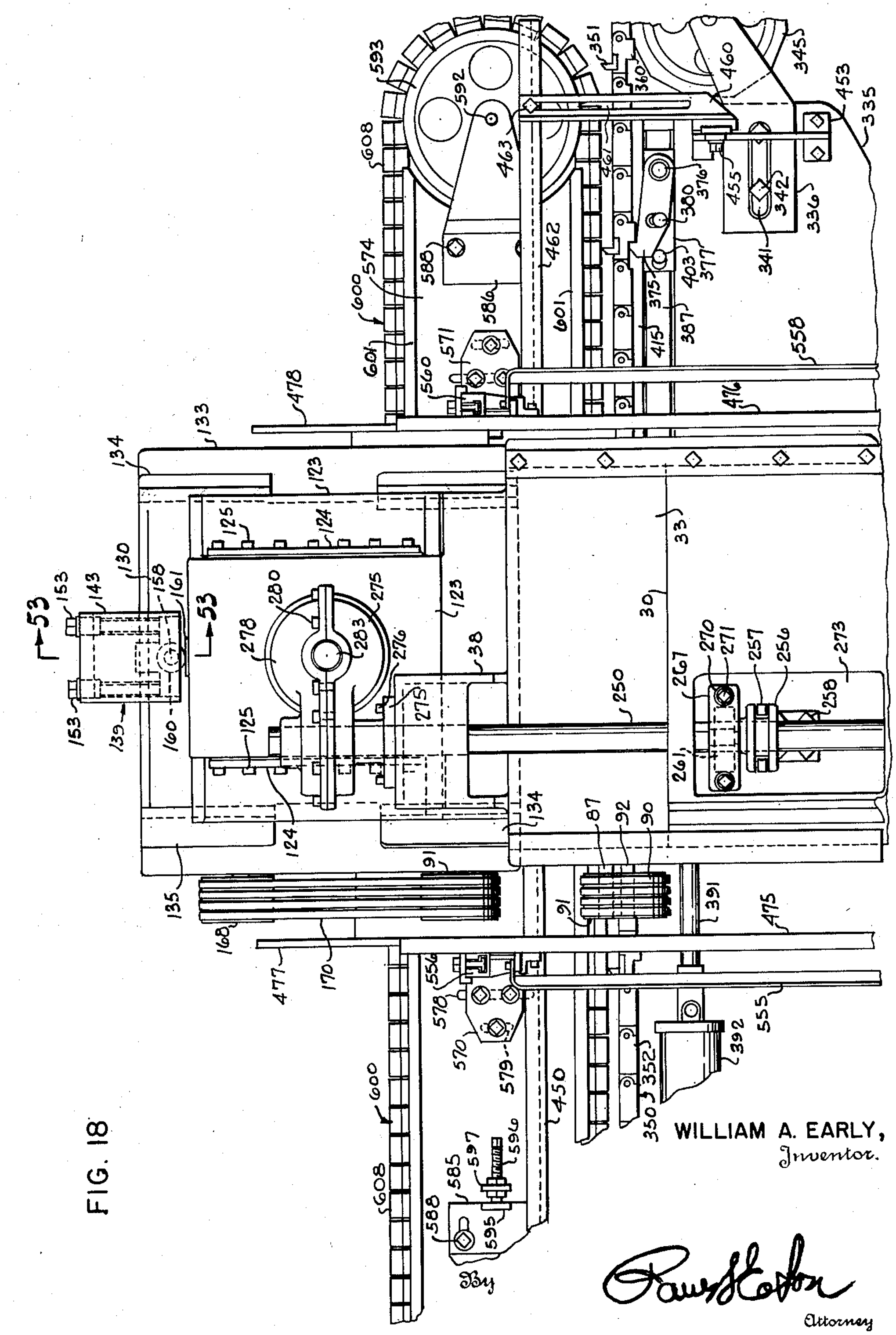
Figure 18 is an elevation on an enlarged scale of the upper right-hand portion of Figure 2.

By referring to Figures 8, 11 and 18, it is seen that on top of the projecting portions 38 is mounted a housing 275, through which the shaft 283 projects, the housing 275 being secured on top of the projecting portion 38 by means of suitable screws 276. The housing 275 has a cover member 278 secured thereto by any suitable means, such as screws 280. The shaft 250 projects through the top of cover 278. Suitably keyed on the shaft 250, inside the housing 275 and its cover 278, is a helical gear 281 which, in turn, meshes with a helical gear 282, fixed on a horizontally disposed shaft 283. There are identical shafts 283 on each side of the machine and each of these projects into the housings 123 (Figures 1, 2, 5, 8, 11, 18, 19, 20, 49 to 51, inclusive). Each housing 123 has a tubular or sleeve member 285 secured in a suitable opening in one of the sidewalls of the housing by any suitable means, such as screws 286. This sleeve member 285 projects into the housing 123 and has fixed thereon two eccentric members 287 and 288 by means of suitable screws 290. These eccentric members 287 and 288 are secured on a restricted portion of the sleeve 285.

Sleeve 285 has a bushing 291 therein through which the shaft 283 projects. It is seen that the eccentrics 287 and 288, being fixed on the sleeve 285, and the sleeve being fixed to the housing 123, they do not rotate. Secured on the restricted end of the shaft 283 which projects into the housing 123 by any suitable means, such as a nut 292, and pins 293, is a member 295 which has two outwardly projecting portions 296 and 297, disposed 180 degrees from each other, and having slots therethrough in which is slidably mounted a bar 300. This bar 300 has fixed therein two shouldered, tapered shafts 301 and 302 on the ends of which are rotatably mounted ball bearings 304 and 305, which are adapted to follow the contours of the eccentrics 287 and 288, respectively, thus to impart a reciprocatory movement to the bar 300.

The bar 300 has an eccentrically disposed bore therein in which is threadably secured a stud shaft 306 locked in position by a screw plug 307. The stud shaft 306 on its free end has mounted a ball bearing 310 which is confined between plates 311 and 312 by means of screws 313 which are threadably mounted on a projecting portion 314 of the housing 133. The plate 130 has an oval-shaped opening 315 therein (see Figure 12) to allow free lateral and vertical or orbital movement to the projecting portion 314.

Figures 50, 52:
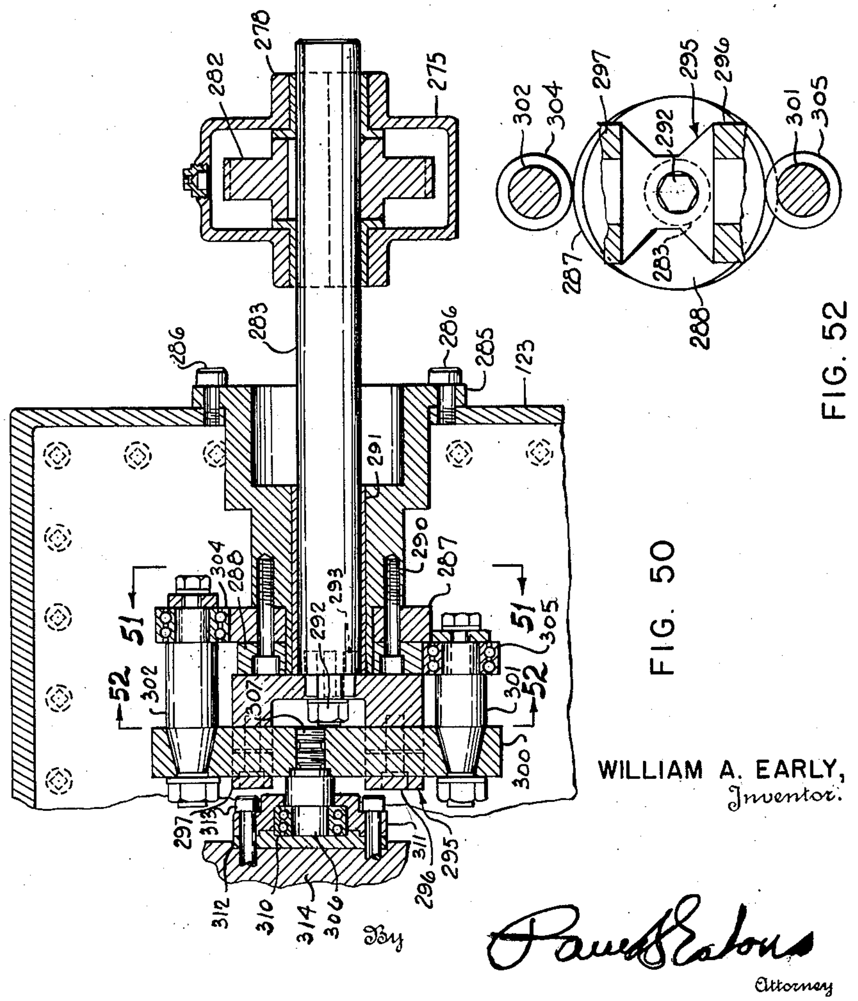
Figure 50 is a sectional view taken along the line 50—50 in Figure 49.
Figure 52 is an elevation, with parts in section and taken along the line 52—52 in Figure 50.
Figure 116:
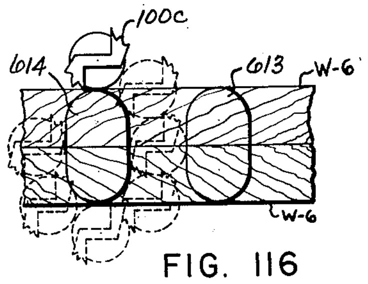
Figure 116 is a view similar to Figure 115 but on an enlarged scale, and showing the various successive positions of the travel of a cutting bit.

It is thus seen from the broad description that by referring to Figure 50, that the eccentrics 287 and 288 will impart reciprocatory movement to the bar 300, and this vertical reciprocatory motion to the bar 300 is multiplied on account of the stud shaft 306 being eccentrically located with relation to the center of shaft 283, thereby causing the upper cutter bits 100*c* and 100*d* to travel in an orbital path as shown in Figure 116 to cut the male tenons on the ends of two workpieces simultaneously.

As is apparent in the drawings, the upper cutter assemblies and the lower cutter assemblies are in spaced relation to each other so that work pieces can be progressed between the cutter assemblies for forming male and female tenons in the ends of the workpieces. In order to efficiently carry out this part of the invention, there has been provided a conveyor mechanism conveying the work pieces in spaced relation and in step-by-step movement through the apparatus and past the cutters where the workpieces stop long enough for the cutters to operate upon same (see Figures 1, 6, 7, 15, 16, 18, 55 to 58, inclusive).

The conveying mechanism comprises a plate 325, slidably mounted on top of the members 10 and 11. These members 10 and 11, as have been previously described, have grooves 16 and 17 on the exterior surfaces and near the top thereof. The plate 325 has downwardly projection portions 326 and 327. On the inside surface of projection 327 is secured a bar 328 by means of screws 329, which has a sloping surface which fits into the inwardly and downwardly sloping surface of the groove 17. The portion 326 has a clip or bracket 330 secured to its lower surface by means of a screw 331, the member 330 projecting into the groove 16 to thus confine the plate 325 on top of the two members 10 and 11.

Rising upwardly from, and integrally with, the upper surface of plate 325, is a pair of semi-circular members 332 and 333. The workpiece conveyor chain, to be later described, passes through these members 332 and 333 on its return movement. The members 332 and 333 have cast integrally therewith or welded thereto an elongated steel plate 335. This steel plate has at one end thereof brackets 336 and 337 and brackets 338 and 339 at the other end (see Figures 5 and 57).

All of these brackets, 336 to 339, inclusive, have each a slot 341 therein which is penetrated by bolts 342, which slidably penetrate the plate 335 to adjust the position of the brackets. The brackets 336 to 339, inclusive, have mounted in their free ends a shaft 343 on which sheaves 344 and 345 are mounted, there being a sheave at each end of the plate 335. Mounted on these sheaves 344 and 345 is an endless sprocket chain 350 which has spaced pairs of projections 351 extending therefrom which are adapted to engage work pieces and move them through the machine.

A majority of the links in sprocket chain 350 are indicated by 352 (see Figures 55 to 68) and comprise three tongues 353, 354 and 355, which are adapted to fit between spaced tongues 356 and 357 on the other end of the links. Spaced at a predetermined distance along the sprocket chain at any desired distance, according to the size of the workpieces being processed, are special links 360, embodying the dogs 351. The links 352 and 360 are joined together by pins 361, confined in position by set screws 362. The special links 360 have the same three dogs, 353, 354 and 355 on one end, and the two dogs, 356 and 357 on the other end, but they have a cavity 370 in which the base portion of the dog 351 rests. Each of the dogs 351 has a pair of bores in its rear wall for receiving a compression spring 373 for holding them in position and to prevent their working out at each end of the slot 370. The base portion of the dog 351 has an elongated slot 371 therein which is penetrated by a shoulder screw 372 which is threadably imbedded in the body portion of the link 360. The transverse slot 370 in which the dog 351 is mounted is wider than the width of the dog 351 and mounted between the rear face of the dog 351 and the rear wall of the cavity 370 is the compression spring 373 for making the dogs resilient so that when the workpieces are at rest the dogs will resiliently lock the work pieces in position and apply pressure thereto and also compensate for slight deviations in the width of the workpieces.

These special links 360 have a cut-away portion in the lower surface thereof providing a shoulder 374 which is adapted to be engaged by the hooked end of a dog 375 pivoted as at 376 in a block 377 and having an elongated slot 378 therein penetrated by a screw 380 mounted in said block so as to permit swinging movement of the free end of the dog 375. The dogs 375 and blocks 377 are in duplicate, there being one mounted on each side of the conveyor and on screws 376 which are threadably imbedded in a sleeve 385 mounted in an elongated slot 386 in the plunger 387, which plunger 387 is slidably mounted on top of plate 335 and plunger 387 has a downturned portion 388 in which is secured by nuts 389 and 390 a piston rod 391, extending from a cylinder 392 having a piston 393 disposed on the interior thereof and fixed on the piston rod 391.

Suitable pipes 394 and 395 for conveying a fluid under pressure lead to opposite ends of the cylinder 392 for moving the piston from one end of the cylinder to the other and the operation of which will be presently explained. The plate 335 is cut away to provide a space in which the cylinder 392 is mounted and for allowing the downwardly projecting portion 388 to have movement therein thus forming a shoulder 397. Mounted on shoulder 397 as shown in Figure 55, is a set screw 396 which limits the movement of the plunger 387 to the right in Figure 55.

The screws 380 which are mounted in the elongated slot 378 in the dogs 375 are also shoulder screws and penetrate the side portions of the members 377 and are threadably imbedded in a sleeve 400 which is adapted to have sliding movement in another elongated slot 401 disposed in the plunger 387. Projecting outwardly from each of the plates 377 is a pin 403 which is adapted to cooperate with a sliding cam surface 404.

Each of the links 352 and 360 has a pair of downwardly projecting and longitudinally extending ribs 410 and 411 which travel in longitudinally extending grooves 413 and 414, disposed in an elongated bar 415. The bar 415 is supported at each end by brackets 416 and 417, which brackets are secured to the upper end portions of the flanged plate 335 by means of screws 418 and 419 which penetrate the brackets 416 and 417 and are threadably imbedded in the ends of bar 415 for supporting the same, thus providing an elongated slot 420 extending from one end of the plate 335 to shoulder 397 in which plunger 387 has movement.

Figures 55, 56:
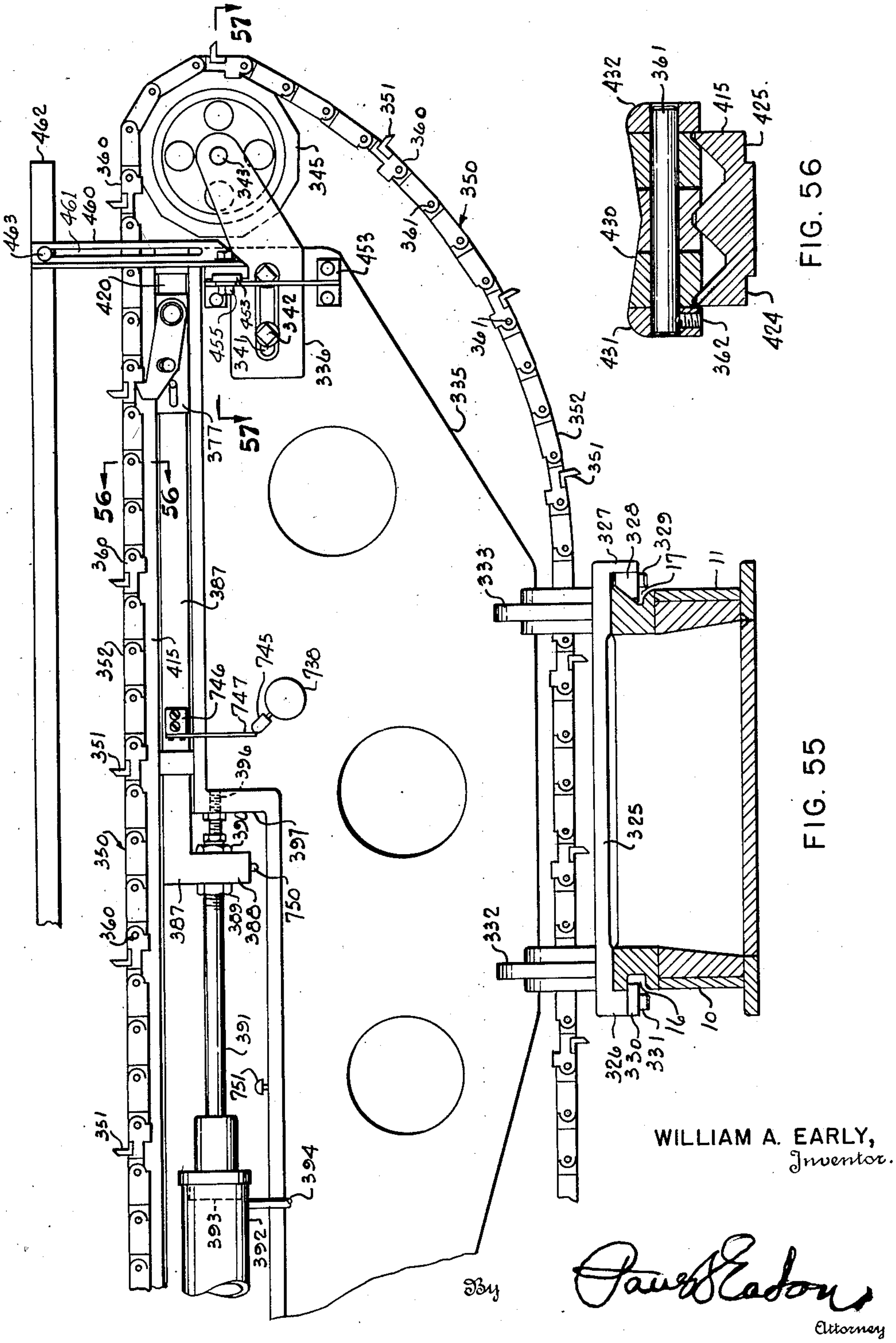
Figure 55 is a view mostly in elevation, and partly in section, and taken along the line 55—55 in Figure 1.
Figure 56 is a vertical sectional view taken along the line 56—56 in Figure 55.
Figures 65, 66, 67, 68:
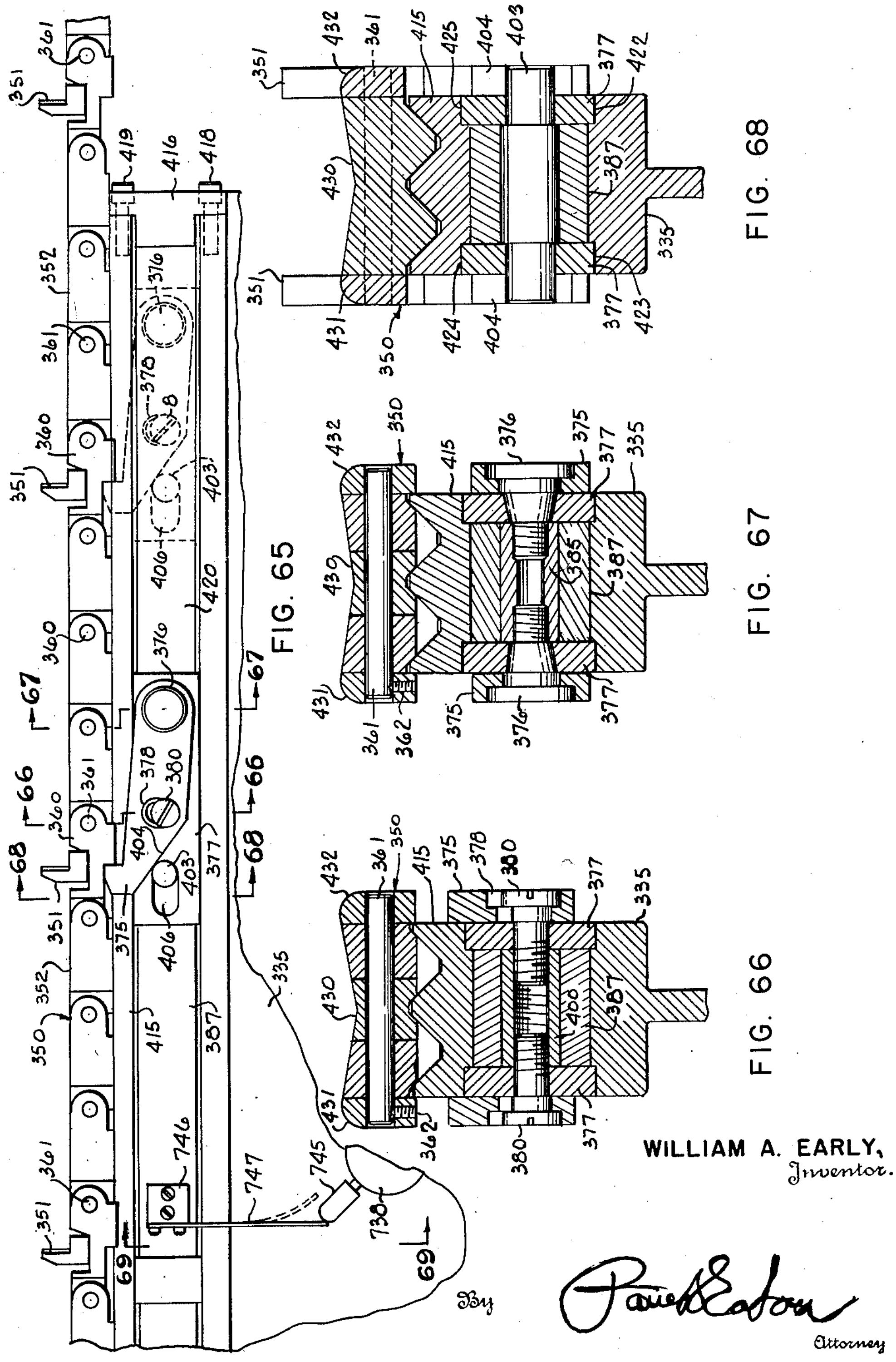
Figure 65 is a view similar to Figure 61 but showing additional portions and showing the step-by-step movements by dotted lines of the propelling means.
Figure 66 is a vertical sectional view taken along the line 66—66 in Figure 65.
Figure 67 is a vertical sectional view taken along the line 67—67 in Figure 65.
Figure 68 is a vertical sectional view taken along the line 68—68 in Figure 65.

By referring to Figures 55 and 68, it will be observed that from the shoulder 397 to the discharge end of the plate 335 suitable grooves 422 and 423 are provided in which blocks 377 have sliding movement. Also the bar 415 has two corresponding grooves 424 and 425 in the lower outer surface thereof in which the upper edges of the bars 377 have sliding movement. It is also to be observed in Figures 31, 32 and 57 that sheaves 344 and 345 have peripheral grooves 426 and 427 into which the tongues 410 and 411 fit and thus cause the sheaves 344 and 345 to fit the main conveyor chain 350.

Figure 106:
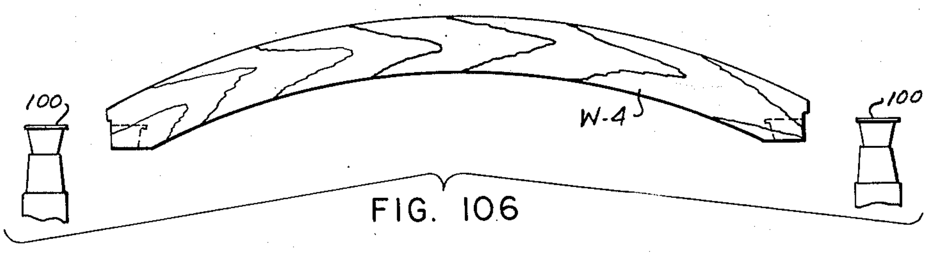
Figure 106 is an edge view of another type of work piece after it has been operated upon by the lower cutting bits.
Figure 107:
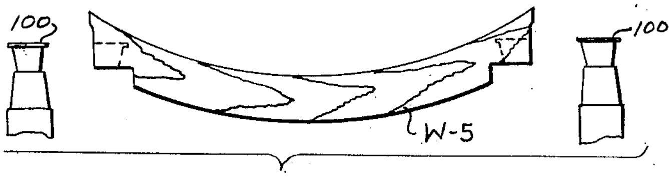
Figure 107 is an edge view of another type of work piece after it has been operated upon by the lower cutting bits.
Figures 108, 109, 110, 111:
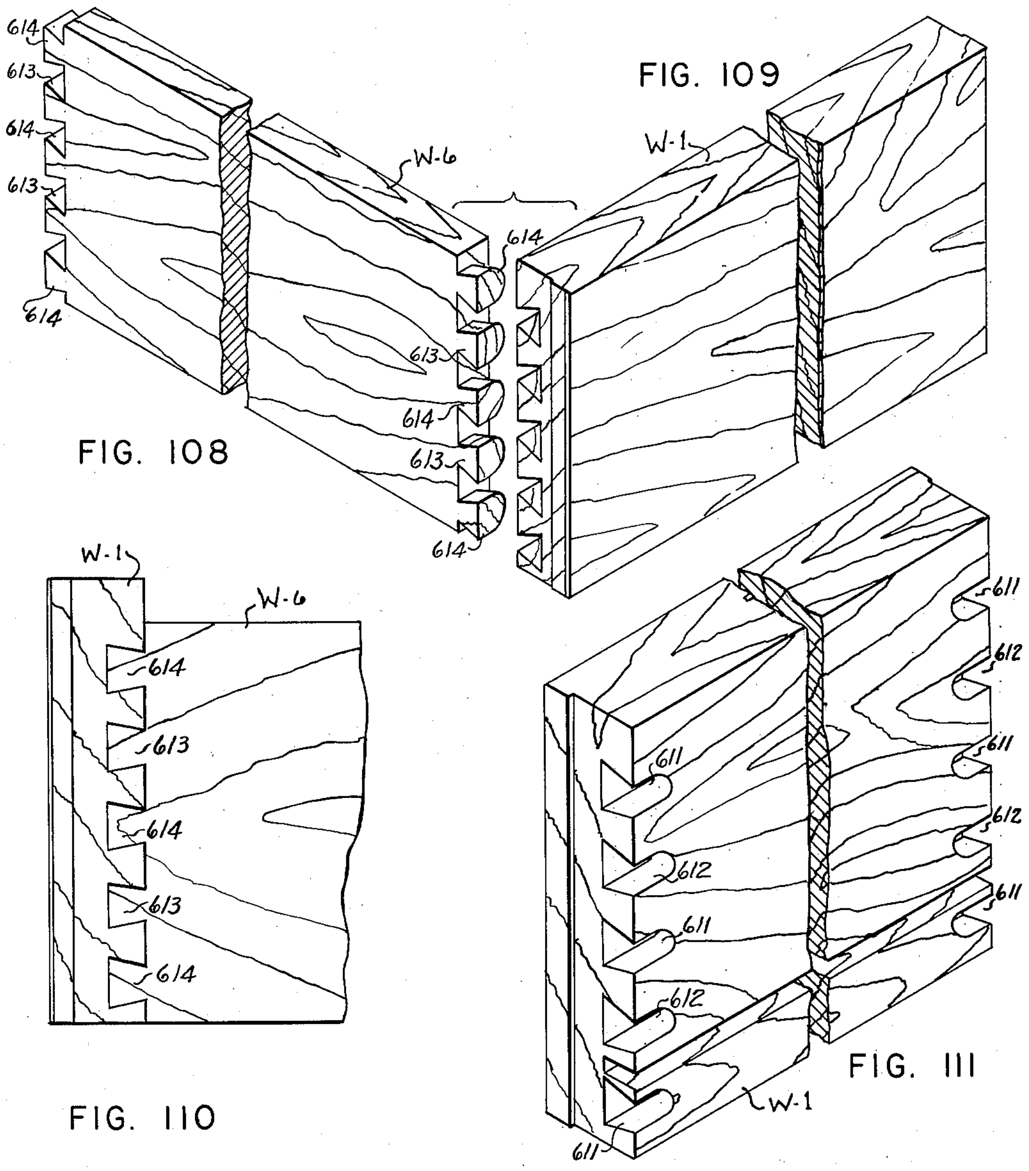
Figure 108 is an isometric view of a work piece which has had male tenons cut therein and which is usually employed for the side portion of the drawer.
Figure 109 is an isometric view of a work piece with female tenons cut in one end thereof and which is usually employed for the drawer front or rear of the drawer.
Figure 110 shows one side of the drawer after one of the side pieces and the front piece of the drawer have been placed in assembled position.
Figure 111 is an isometric view looking at the inside of a drawer front, with central portion thereof broken away, after the female tenons have been cut therein.
Figure 112:
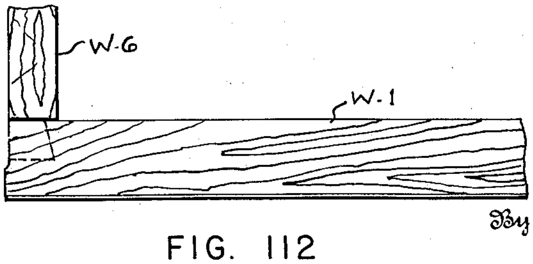
Figure 112 is a top plan view of one of the front corner portions of a drawer after the male and female tenons have been moved to assembled positions.

The top surface of each of the links 352 and 360 are concave, which concavity is shown by reference character 430. This concavity is necessary when work pieces which have their ends directed upwardly are being operated upon, such as shown in Figure 107. In the event of operating upon work pieces such as shown in Figure 106, the concavity, of course, will not be needed but the outer edges of each of the links 352 and 360 are convex as indicated at 431 and 432.

It should be added that the description heretofore has referred to the main conveyor assembly just described as being mounted for sliding movement by having plate member 325 resting on top of the members 10 and 11 and having tongues fitting into the grooves in members 10 and 11. It is to be noted that this is employed as a convenient means of mounting but once the main conveyor mechanism is adjusted in position, it is rarely necessary to change the position, and it can be locked in adjusted position by means of tightening up on the screw 331 which binds the plate 325.

The plate 335 is cut away on its upper edge as has been previously described for reception of the cylinder 392. This cut-away portion does not extend all the way to the intake end of the plate 335, leaving an upwardly projecting portion 335*a* (see Figures 15 and 58). For supporting the cylinder 392, a bracket 432 is provided having an elongated slot 433 therein, which is penetrated by screws 434 which are threadably imbedded in the uprising portion 335*a*. Bracket 432 has an enlarged circular portion 435 which threadably receives the threaded end of a plurality of screws 436 which penetrate the base 437 of the cylinder 392 to hold it in position.

Secured on each side of the plate 335 at the intake end of the conveyor mechanism as shown in Figures 5, 6, 7, 15 and 58 are brackets 440 and 441. Each of these brackets projects laterally from the plate 335 and bracket 440 has an elongated slot 442 and bracket 441 has an elongated slot 443 therein. By means of bolts 444 and 445 penetrating the slots 442 and 443 and vertically disposed slots 446 and 447 in uprising brackets 448 and 449, the brackets 448 and 449 can be adjusted away from and toward the conveyor belt and these brackets 448 and 449 can also be adjusted vertically with respect to the brackets 440 and 441. The upper end of bracket 448 has secured thereto an angle guide member 450, while the upper end of bracket 449 has secured thereto another angle guide bar 451.

Figure 57:
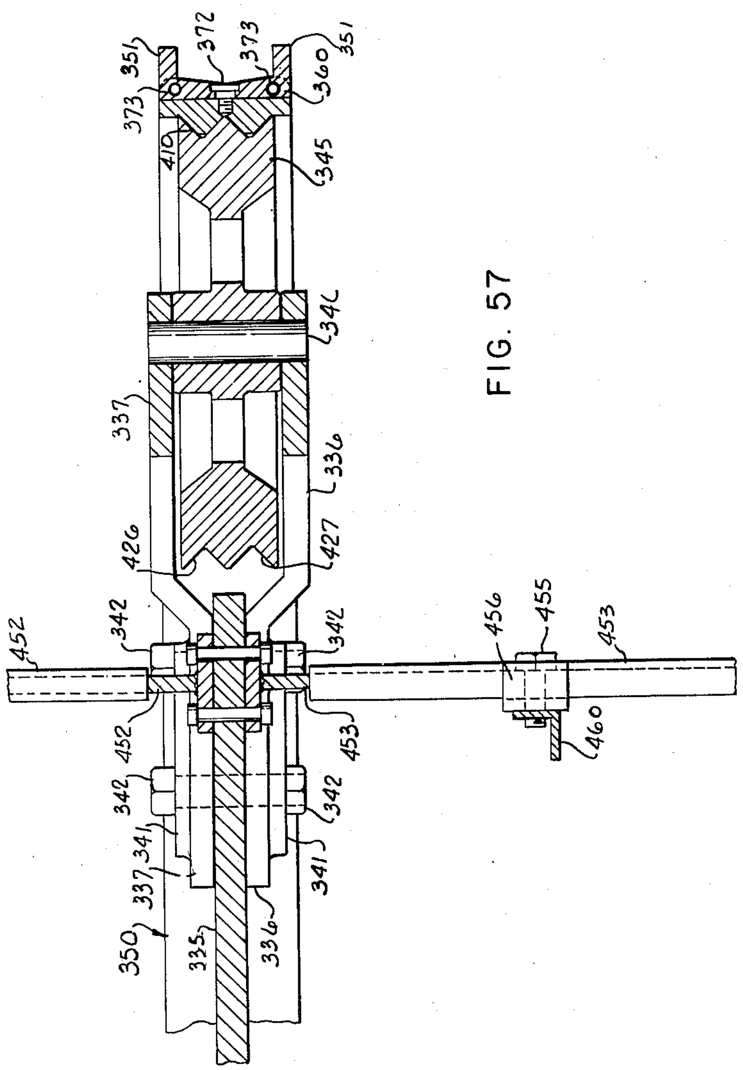
Figure 57 is a sectional view taken along the line 57—57 in Figure 55.
Figures 58, 59, 60:
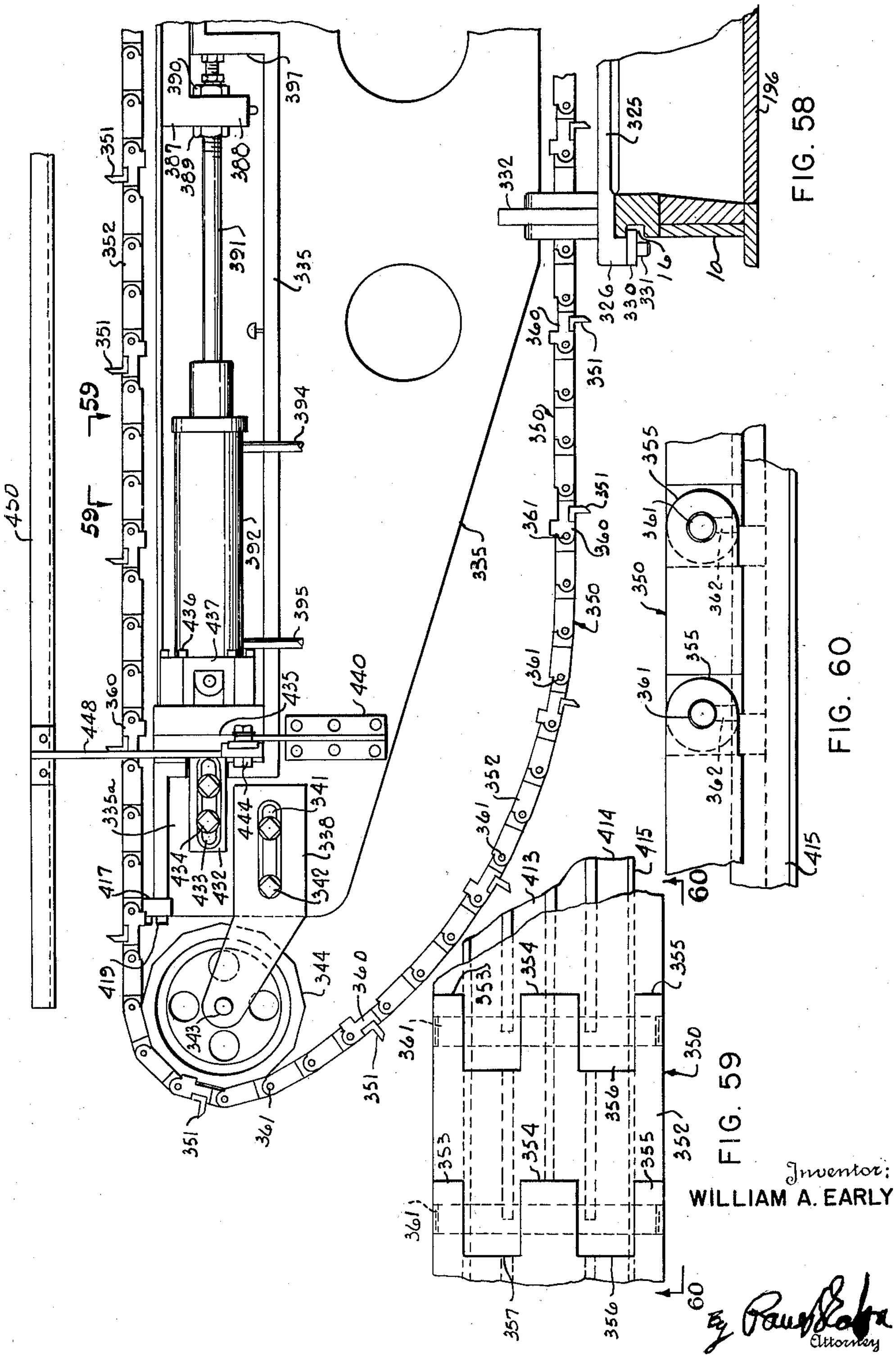
Figure 58 is a view similar to Figure 55 and showing the other portion of the conveyor chain support.
Figure 59 is a top plan view on an enlarged scale and being taken along the line 59—59 in Figure 58.
Figure 60 is a side view taken along the line 60—60 in Figure 59.
Figure 61:
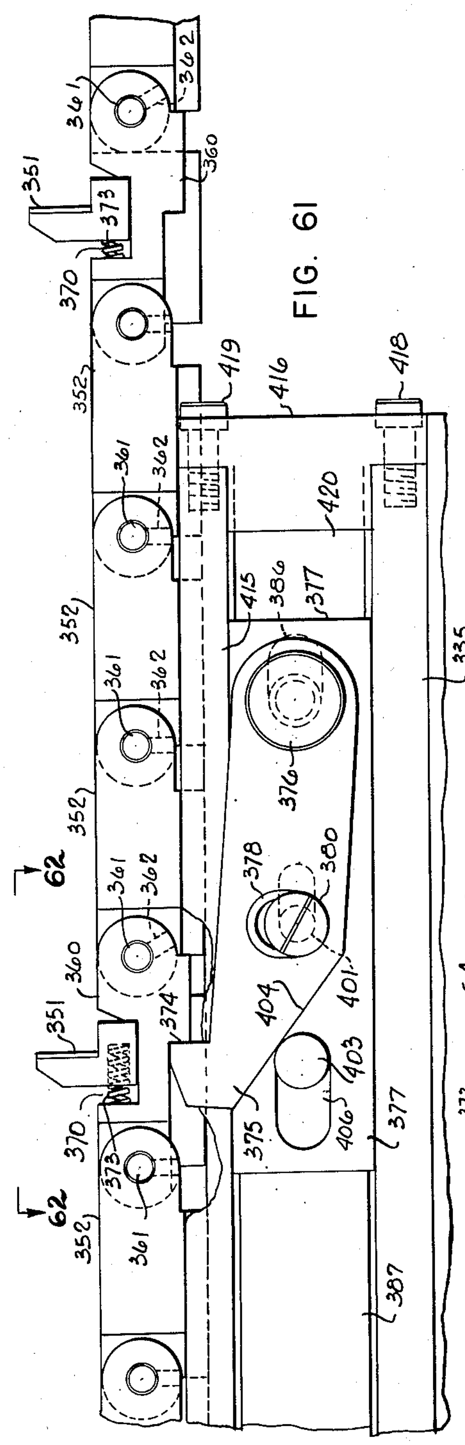
Figure 61 is an elevation of a portion of the conveyor chain and showing a portion of the propelling means therefor.
Figure 64:
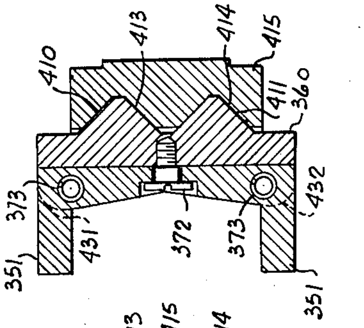
Figure 64 is a cross sectional view taken along the line 64—64 in Figure 62.
Figure 63:
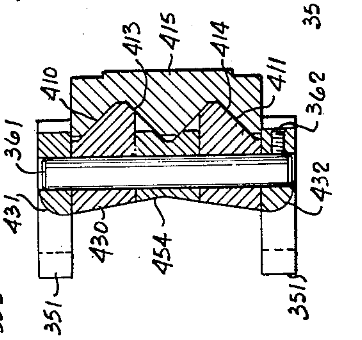
Figure 63 is a cross sectional view taken along the line 63—63 in Figure 62.
Figure 62:
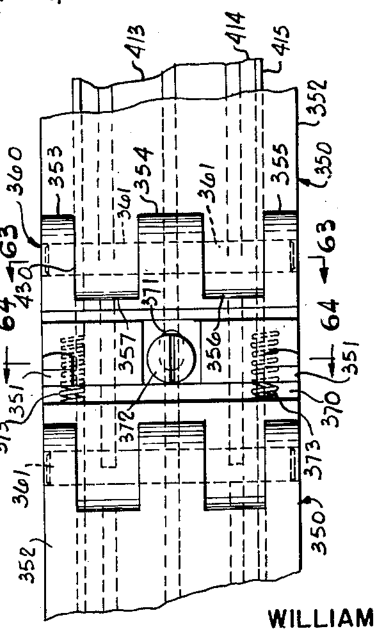
Figure 62 is a top plan view on an enlarged scale taken along the line 62—62 in Figure 61.

By referring to Figures 16, 17, 55 and 58, it is seen that the discharge end of the plate 335 has secured thereon a bracket 453 and there is an identical opposite hand bracket 452 on the other side of the plate 335 (Figure 57). These brackets have a laterally projecting horizontal portion provided with a slot 454 (see Figure 17) which slot is penetrated by a bolt 455, in block 456, and the slot 454, so as to provide a horizontal adjustment of the block 456. Block 456 has rising upwardly therefrom a bar 460 which is slotted as at 461 to receive a bolt 463 which also penetrates an angle guide bar 462 for supporting the discharge end of the angle guide bar 462.

Although the details of the bracket and associated parts disposed on the other side of the plate 335 from bracket 453 are not shown, such bracket and associated parts are identical to the structure just described and has rising upwardly therefrom a slotted bar 465 (Figure 5) which is identical to bar 460. This has a vertically slidable bolt 466 therein for supporting the discharge end of an angle guide bar 467. All of the angle guide bars 450, 451, 462 and 467 have vertical angle portions and inwardly projecting angle portions at the bottom thereof, on which the end of the work pieces rest as they are conveyed through the machine.

Secured on the front and rear upper portions of the bed plate 20 are upwardly and inwardly projecting supports 475 and 476 (Figures 1, 2, 6, 7, 8, 19 and 20) from the point where they are bolted to the bed plate 20, project outwardly and then upwardly and inwardly toward the conveyor belt assembly. At their upper end they have secured thereto vertically adjustable plates 477 and 478 by means of bolts 480 penetrating suitable slots 481 in the plates 477 and 478, whereby the plates 477 and 478 can be adjusted vertically by loosening the nuts 480 when it is desired to change the elevation of the angle guide bars to accommodate different types of work pieces.

Secured to the lower edges of plates 477 and 478 by means of a bolt 489 are downwardly projecting T-shaped members 490 and 491 whose lower horizontal portions are secured to the angular guide members (see Figures 37 to 48, inclusive). The T-shaped members 490 have one end thereof secured secured to the angle guide members 450 and 451 by means of a suitable bolt 492, whereas the T-shaped members 491 have a portion thereof secured to the angular guide members 462 and 467 by means of a suitable bolt 493. Between the proximate ends of the above-mentioned angle guide bars, special guide bars must be secured for holding the workpieces and allowing travel of the cutting bits inwardly and outwardly or upwardly and downwardly to engage the ends of the workpieces for cutting grooves and tenons therein.

When the upper cutters are employed on one or both ends of the work piece, special bars 494 are employed and these have their ends secured to the proximate ends of the angular guide bars 450, 451, 462 and 467 by means of a suitable bolt 496 penetrating the horizontal portion of the T-shaped members 490 and 491 and being threadably imbedded in the horizontal angular portion of these special guide bars. These special guide bars 494 have spaced cavities 500 cut therein and between each of these cavities there is a pin 501 screwed into the angular guide bar and the top cutting bits move in an orbital path between the pin 501 and down into the cavity 500 and back up again as will be described more in detail as the description progresses.

The above described mechanism, comprising the intermediate angle guide bars for supporting the ends of the work piece is shown in detail in Figures 37 to 44, inclusive. When it is desired to employ the lower cutting bits for cutting a female dovetail or groove in the ends of a workpiece, a different type of intermediate angle guide bar will be used on both sides of the conveyor mechanism. This structure is illustrated in Figures 45 to 48, inclusive. In this instance, a different type of intermediate angle guide bar 505 is employed on each side of the conveyor mechanism. These guide bars 505 are supported by the same T-shaped brackets 490 and 491 and are secured in position by the same bolts as previously described, and since these bars are interchangeable on both sides of the machine, like reference characters will describe the two bars on opposed sides of the conveyor mechanism. These bars 505 have spaced cavities 507 extending from the inner edges thereof a substantial distance into the bars 505 and the bars 505 on their proximate faces have outwardly projecting lips 508 for supporting the ends of the workpieces W.

Attention is called to the fact that in using the upper cutters, which use has been previously described, usually two work pieces are laid one on top of the other and the tenons in the ends of the work pieces are cut simultaneously by moving the cutters in an orbital path. However, when cutting female tenons or grooves in the ends of a workpiece, as is now being described, there will be only one workpiece employed at a time for cutting grooves in the lower end surfaces thereof.

It is also to be noted that the cavities 507 are sufficiently deep to allow the vertically disposed lower cutter bits to move entirely away from the end of the workpiece to be housed by the bars 505 and thus serving as a guard for the cutter bits when they are withdrawn away from the workpiece.

Figures 46, 47, 48:
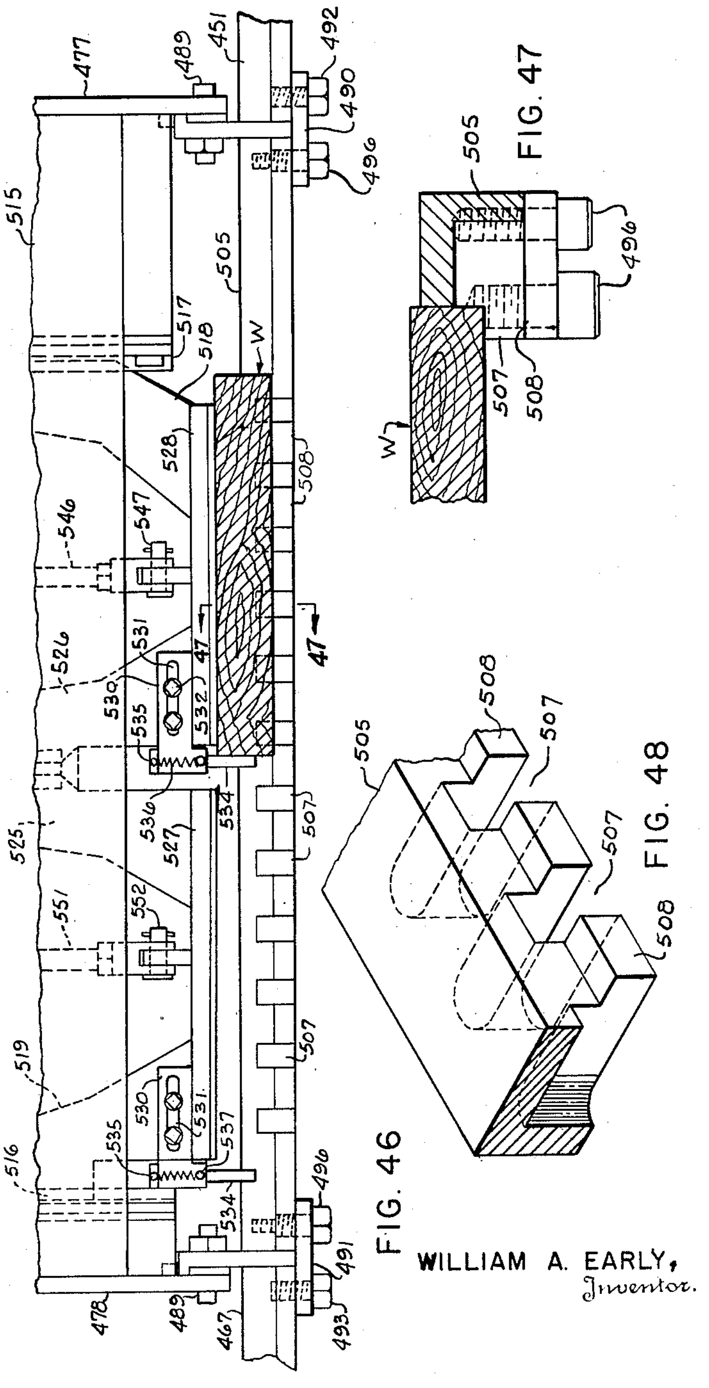
Figure 46 is a sectional view taken along the line 46—46 in Figure 45.
Figure 47 is a sectional view taken along the line 47—47 in Figure 46.
Figure 48 is an isometric view of one of the side supports for supporting the ends of the work pieces when the lower cutting bits are used for the forming of female dovetails in the end of the work piece.
Figure 49:
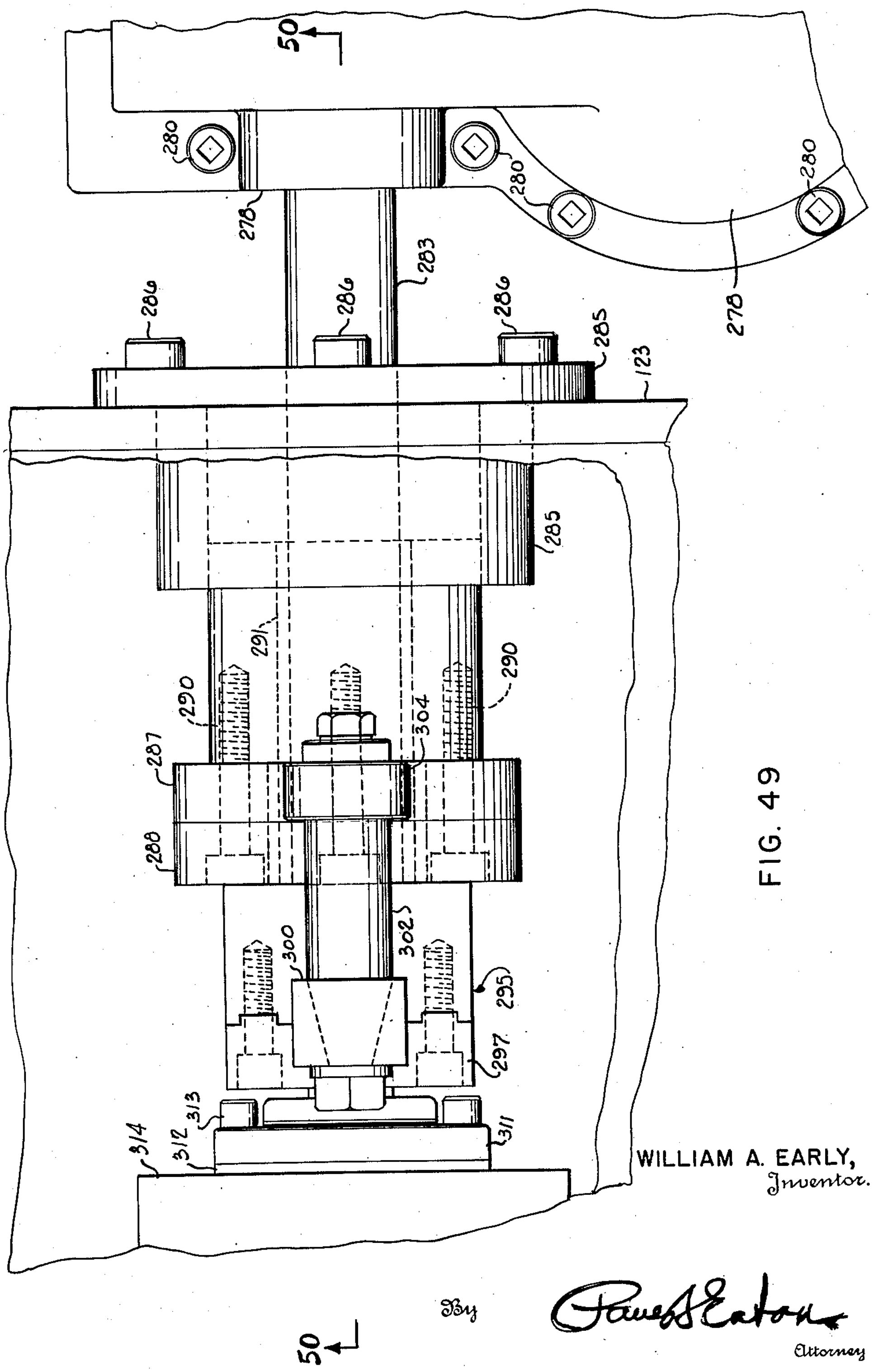
Figure 49 is a top plan view with portions broken away of the housing and parts therein for controlling the movements of the upper cutting assemblies.
Figure 51:
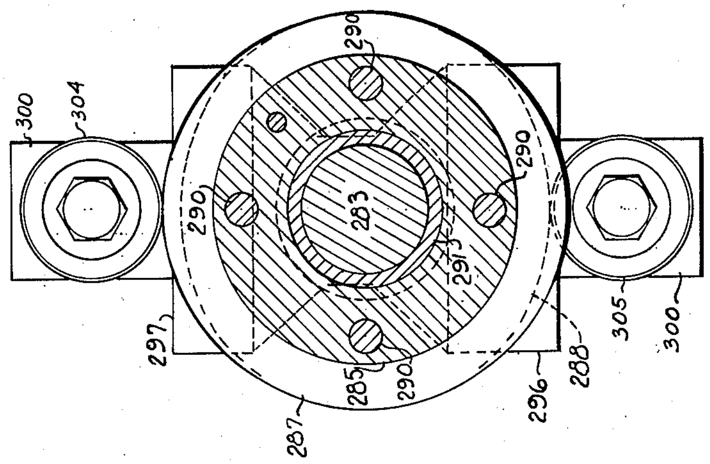
Figure 51 is a vertical sectional view taken along the line 51—51 in Figure 50.

It is, of course, to be understood that the depth of the female grooves cut in the workpiece, that is how far they progress towards the front side of the workpiece, or the upper side of the workpiece in Figure 47, depends upon the vertical height of the portions 508 for if a deeper groove should be desired to be cut in the workpiece, then the vertical height of the projections 508 would be lessened. It is also evident that the vertical height of the shoulder portions 508 could be somewhat less than shown in Figures 47 and 48 and the depth of the cut in the end of the workpiece by the cutting bits could be regulated by the vertical adjustment of the position of the vertically disposed or lower cutting bits.

Figure 37:
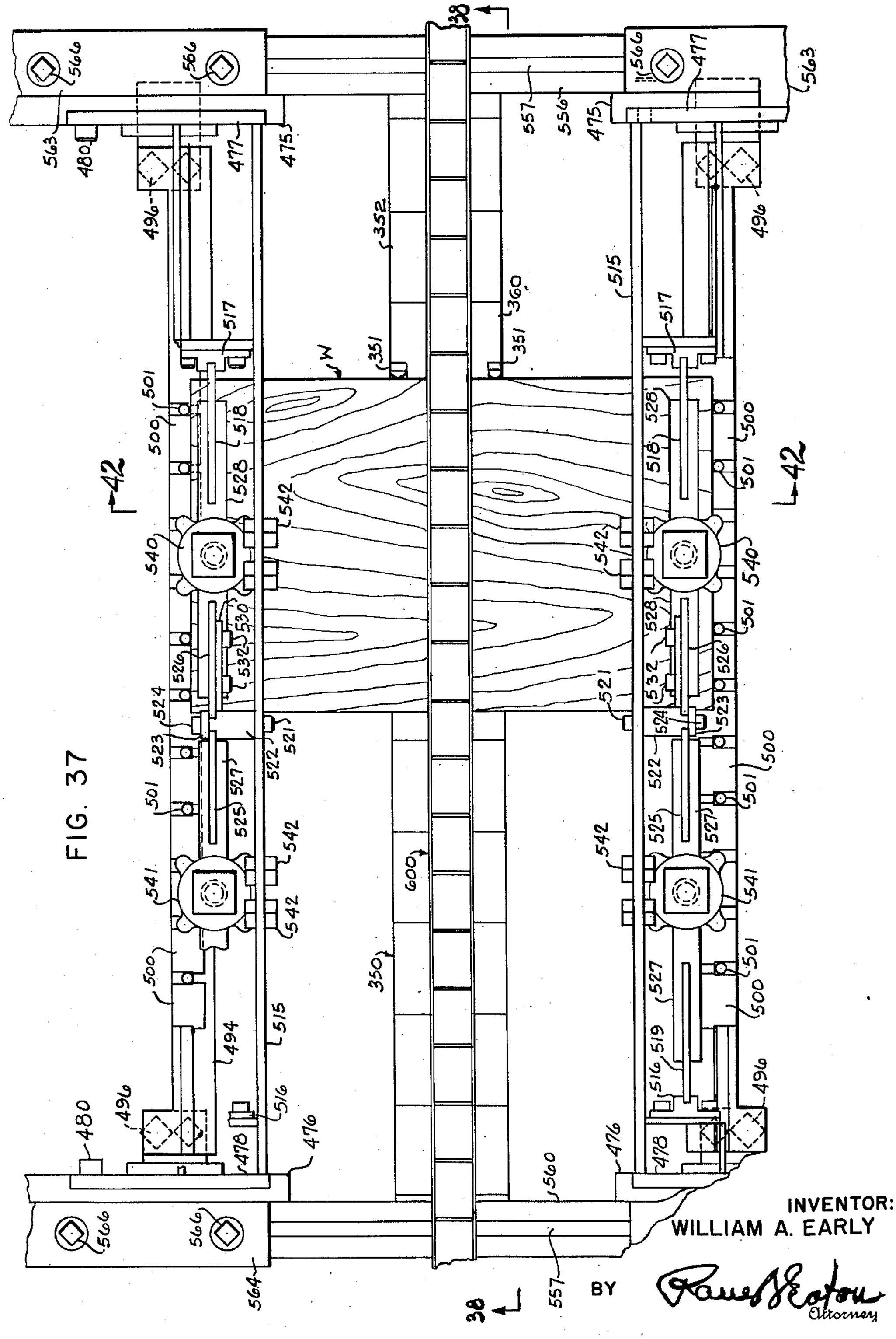
Figure 37 is a top plan view of the central portion of the machine and omitting the cutter assemblies, showing the horizontally disposed supports on each side of the conveyor for supporting work pieces when they are being operated upon by the upper cutting bits or forming the male dovetails.
Figures 38, 39, 40, 41:
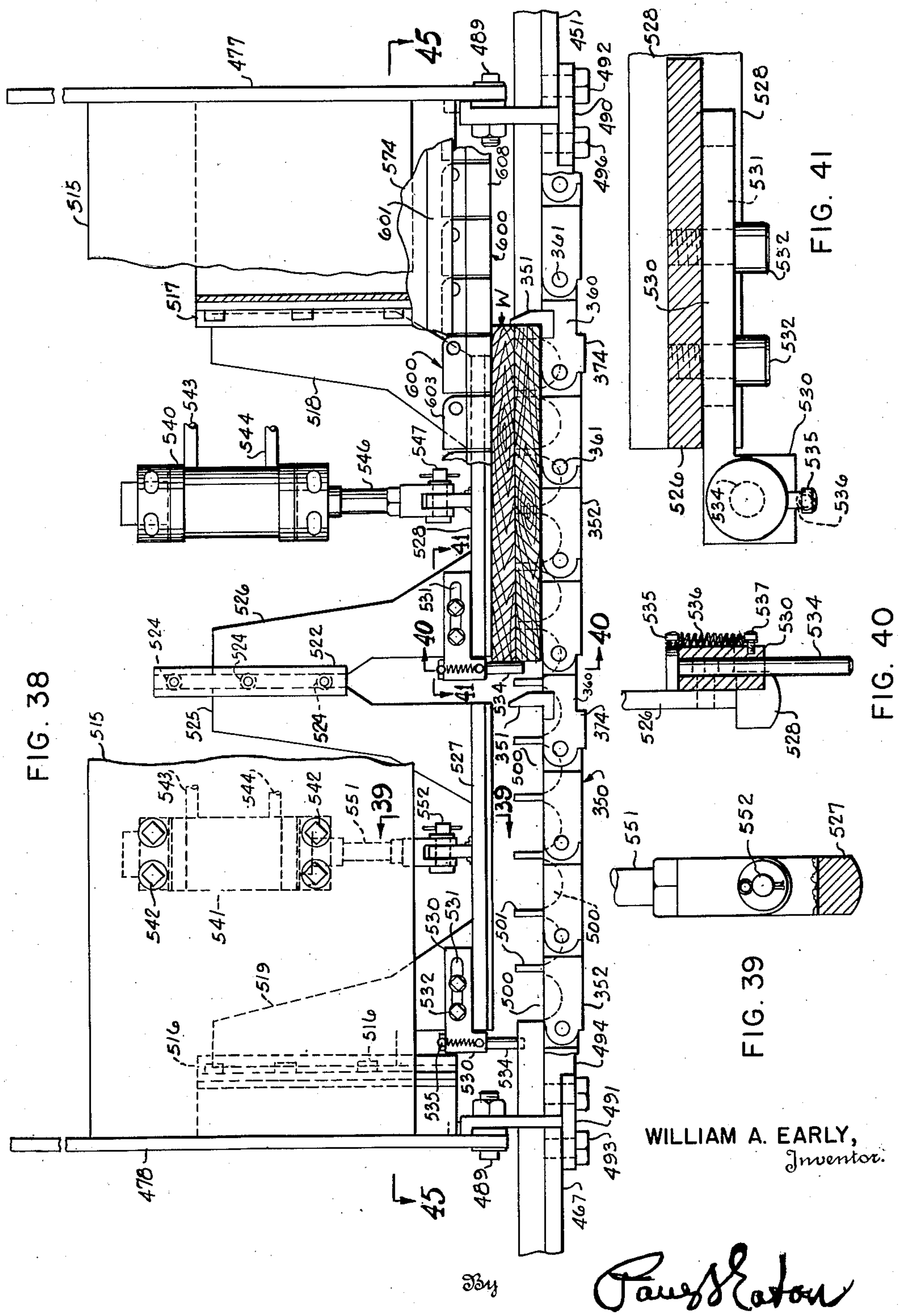
Figure 38 is a sectional view, looking horizontally, and taken along the line 38—38 in Figure 37.
Figure 39 is a sectional view, taken along the line 39—39 in Figure 38.
Figure 40 is a vertical sectional view taken along the line 40—40 in Figure 38.
Figure 41 is a sectional view, looking downwardly, on the line 41—41 in Figure 38.
Figures 42, 43, 44:
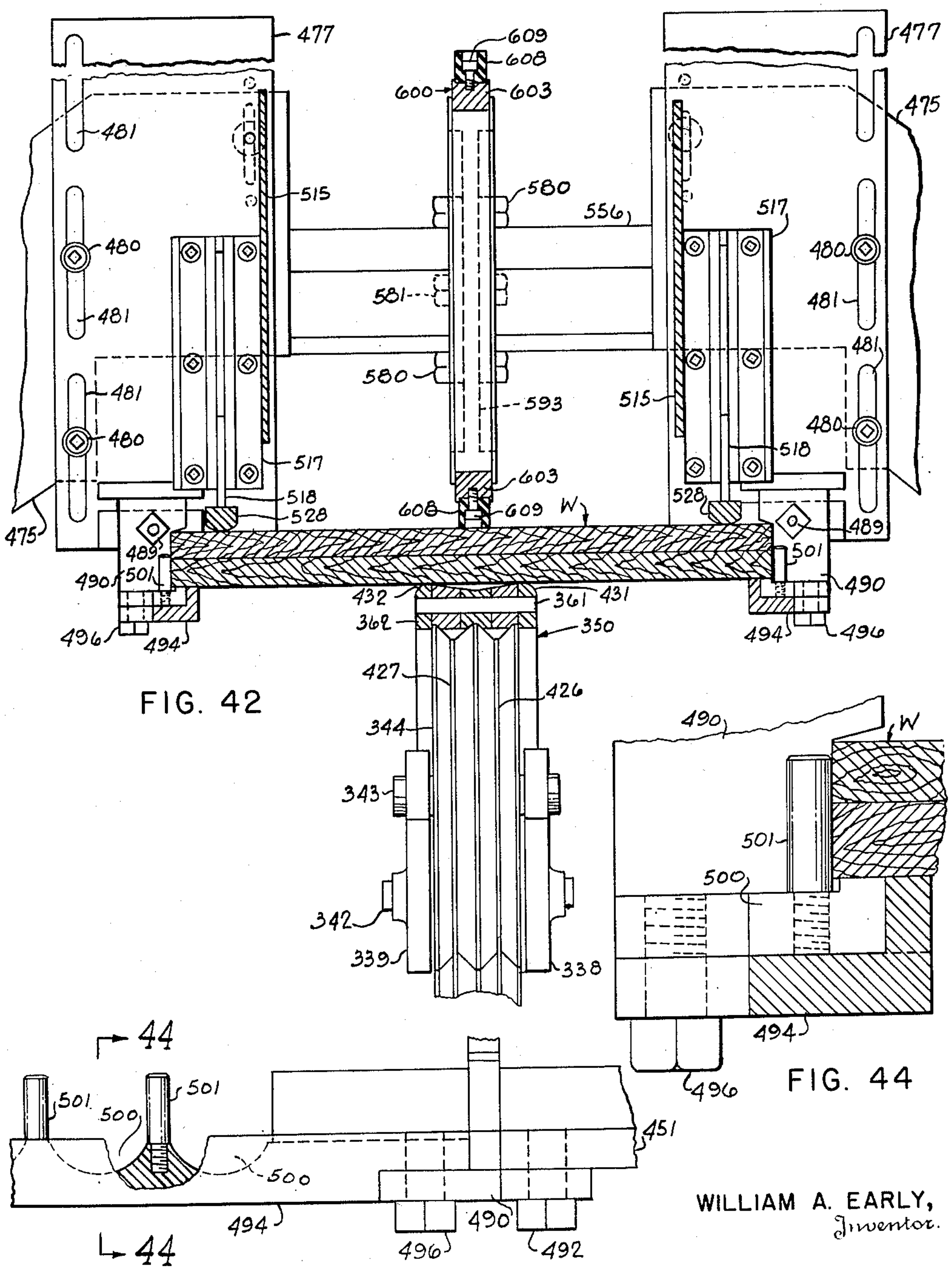
Figure 42 is a vertical sectional view taken along the line 42—42 in Figure 37.
Figure 43 is an elevation of a portion of one of the supports disposed on each side of the conveyor for supporting work pieces when they are being operated upon by the upper cutting bits or forming the male dovetails.
Figure 44 is a sectional view, taken along the line 44—44 in Figure 43.
Figure 45:
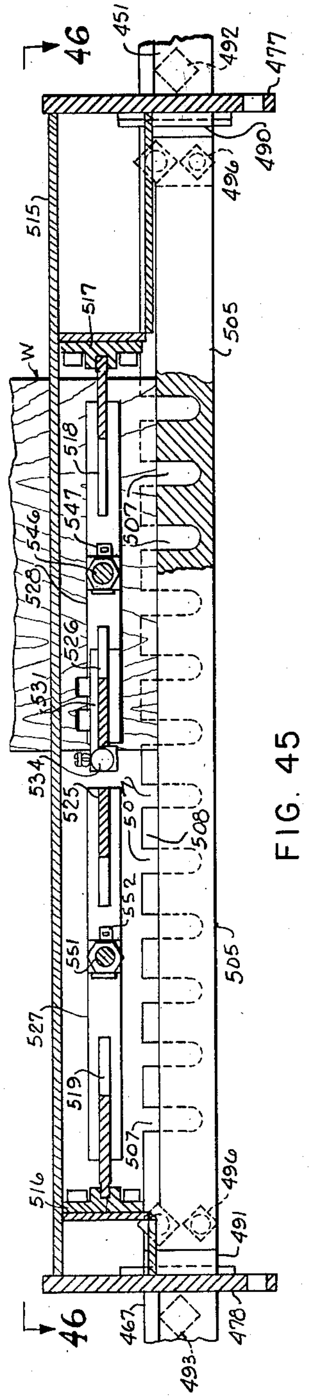
Figure 45 is a sectional plan view taken along the line 45—45 in Figure 38, but showing one of the supports disposed on each side of the conveyor for supporting work pieces when they are being operated upon by the lower cutting bits or forming the female dovetails.

Welded between the plates 477 and 478 is a plate member 515. Bolted to the proximate faces of plates 477 and 478 are guide members 516 and 517, in which are mounted vertically slidable members 518 and 519. Bolted by means of a bolt 521 to the plate 515 is a vertically disposed member 522, which has a restricted outer face to which is secured a strip 523 by means of bolts 524, thus providing guideways for receiving vertically slidable members 525 and 526 (Figure 37.). Members 519 and 525 at their lower ends are welded to a clamping bar 527, while to the lower ends of members 518 and 526 is welded a clamping bar 528. These clamping bars 527 and 528 are adapted to clamp a workpiece near its end, one at a time, to hold it against the angle guide supporting members while a cutting operation is performed. It is to be noted that the lower face of the clamping members 527 and 528 are convex. This convex surface is provided to cause the clamping members to properly engage the workpiece regardless of whether it occupies a planar position or whether the portion engaged by the planar member is sloping as the case would be in some types of workpieces, such as the workpieces shown in Figures 105 and 106.

Secured on the lower portions of vertically slidable members 519 and 526 is a bracket 530 which is slotted as at 531 for receiving one or more bolts 532, which thread into portions 519 and 526 for securing the bracket 530 to the members 519 and 526. This bracket has a vertically slidable pin 534 mounted therein which has a spring perch 535 secured in its head portion, to which is secured a tension spring 536, the lower end of the tension spring being secured to a spring perch 537, mounted on the side of the bracket 530. The purpose of this arrangement is to cause the pin 534 to pass down in front of the workpiece or workpieces as they are being advanced to operative position, and to thus properly position the workpiece or workpieces for a clamping operation. The reason for the spring tension on pins 534 is to allow the pins to move upwardly, without damage, in the event that the workpiece should be wider than the standard form of workpiece for which the machine is set to operate upon.

Mounted on the transverse plate 515 are cylinders 540 and 541 which are secured to the plate 515 by suitable means, such as bolts 542. The cylinder 540 has leading to the interior of one end thereof a pipe 543 and to the other end thereof a pipe 544. These pipes 543 and 544 also lead to opposed ends of cylinder 541. The cylinder 540 has mounted therein a piston 545 which has connected thereto a piston rod 546 which slidably penetrates one end of the cylinder and has its lower end connected to clamping bar 528 by any suitable means, such as a bolt 547. The cylinder 541 has therein a piston 550 which has a piston rod 551 connected thereto and slidably projecting into the cylinder and has its lower end connected to the clamping bar 527 by any suitable means, such as a bolt 552. By means which will be later described, these pistons in cylinders 540 and 541 are caused to move downwardly to clamp the workpiece, but this operation will be explained in the working diagram explanation hereinafter following.

Secured to the front bed beam 10 and rising upwardly and projecting inwardly toward each other, are two supports 555 which have secured to their upper ends a channel member 556 which has a T-slot 557 extending throughout its entire length (see Figures 6 to 21, inclusive). Secured to and rising upwardly from the rear transverse base beam 11 are two similar supports 558 which project upwardly and inwardly and have their upper ends secured to another beam 560, similar to the front beam 556.

The front supports 475 and the rear supports 476, previously described, have angle members 563 and 564 secured thereto on the upper and lower edges of the channel members 556 and 560, which clampingly engage the beam to additionally support the same. Since the members 475 and 476 are secured on top of the movable bed plate 28, therefore have movement longitudinally of the beams 10 and 11, the angle brackets 563 and 564 are provided to allow longitudinal movement of the members 475 and 476 along the channel members 556 and 560. The brackets 563 each have mounted therein a bolt 566 whose head has sliding movement in the T-slot 557. And the nut on bolt 566 may be tightened to lock the apparatus in adjusted position to hold it in that position until another adjustment is necessary.

It is evident that as the workpieces are conveyed through the apparatus for the cutting operation on the part of the cutting bits by the conveyor 350 that some means must be provided for holding the workpieces in position, and that is why the recently-described parts, namely, the channel members 556 and 560 have been provided. The channel members 556 and 560 each have welded thereon in spaced relation to each other brackets 570 and 571, there being two spaced brackets 570 at the front of the machine, and two spaced bracket 571 at the rear of the machine. And these brackets are spaced apart a distance equal to the thickness of the main supporting plate 574, around which an endless chain is adapted to rotate (Figures 15, 18, 60 to 67, inclusive). In this manner the hold-down endless chain is mounted with respect to the main conveyor 350.

The plate 574 has two sets of slots, that is, an elongated vertically disposed slot 576 and a shorter elongated vertically disposed slot 577 in one end thereof and vertically disposed slots 578 and 579 in the other end thereof, in which bolts 580 and 581, respectively, are mounted and which bolts penetrate the brackets 570 and 571 at one end of the conveyor and 570 at the other end of the conveyor so that the conveyor can be manually adjusted vertically as desired by loosening the bolts 580 and 581 at each end of the plate 574 to adjust the plate 574 vertically with relation to the channel bars 556 and 560.

The plate 574 has concave portions 583 and 584 at its two ends and on both sides of this plate adjacent the concave portions are mounted brackets 585 and 586, there being two brackets 585 mounted on opposed sides of the plate 574 at one end and two brackets 586 mounted on opposed sides of the plate 574 at the other end, these brackets being secured to the plate by means of suitable bolts 588 penetrating the plate and brackets.

The plates 585 project outwardly from the end of the plate 574 and have a pin 590 mounted therein on which a grooved wheel 591 is mounted for rotation. The brackets 586 likewise project outwardly from the other end of the plate 574 and have a pin 592 mounted therein on which is rotatably mounted another grooved wheel 593.

Figure 77:
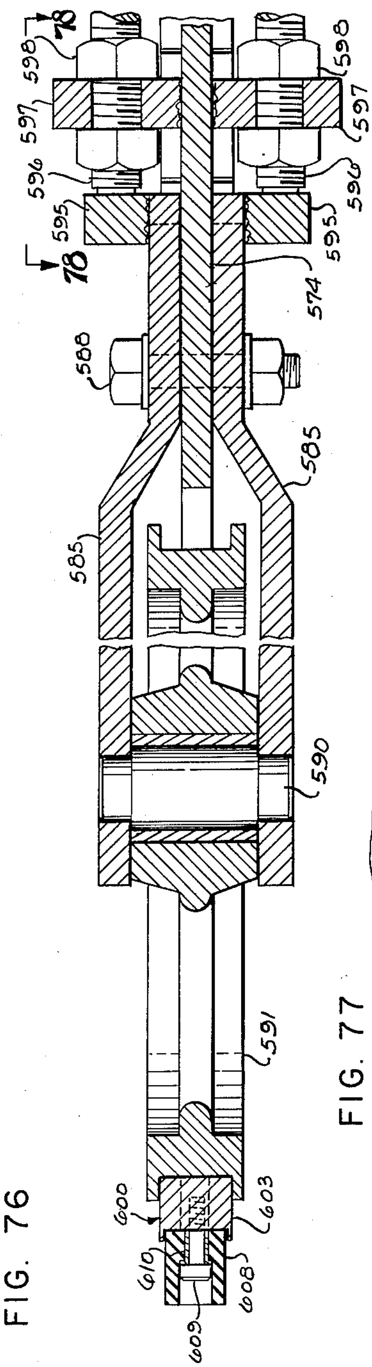
Figure 77 is a sectional view taken along the line 77—77 in Figure 15.
Figure 78:
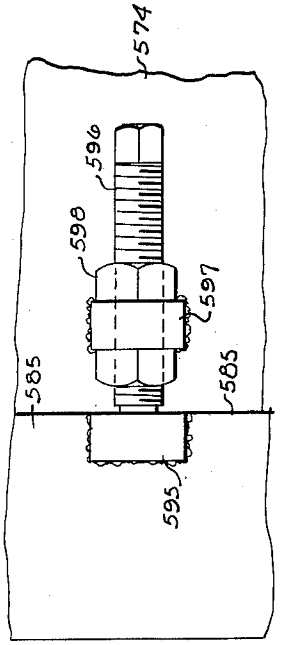
Figure 78 is a side elevation taken along the line 78—78 in Figure 77.
Figure 79:
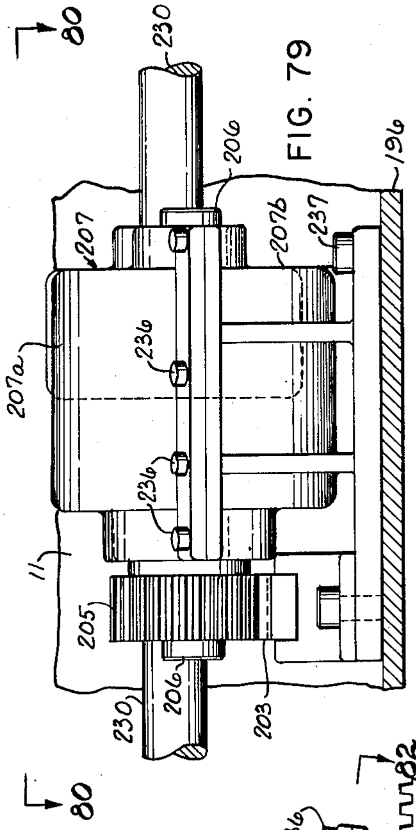
Figure 79 is an elevation of the central portion of Figure 94.
Figure 80:
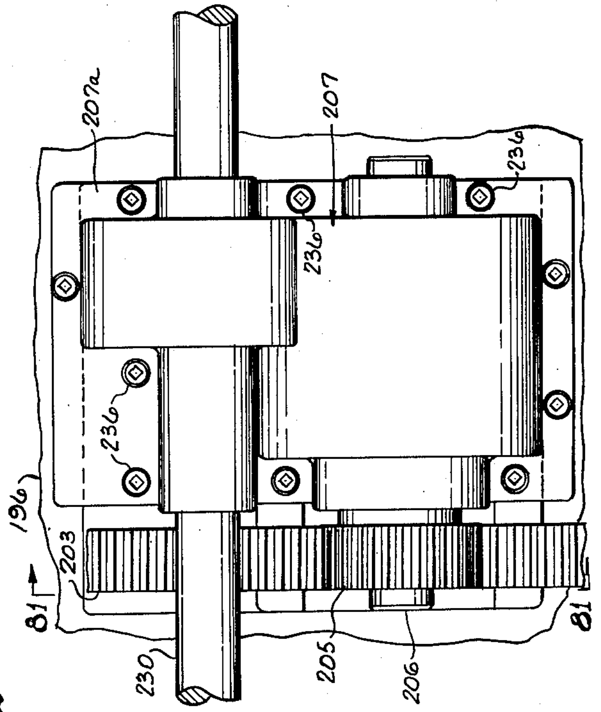
Figure 80 is a top plan view taken along the line 80—80 in Figure 79.
Figure 81:
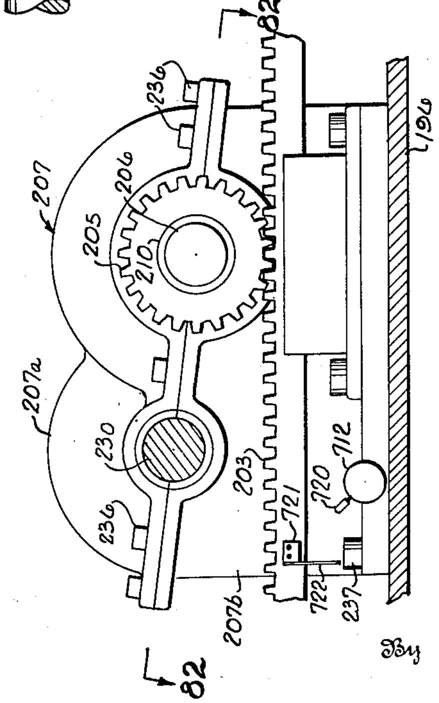
Figure 81 is a transverse sectional view taken along the line 81—81 in Figure 80.
Figure 82:
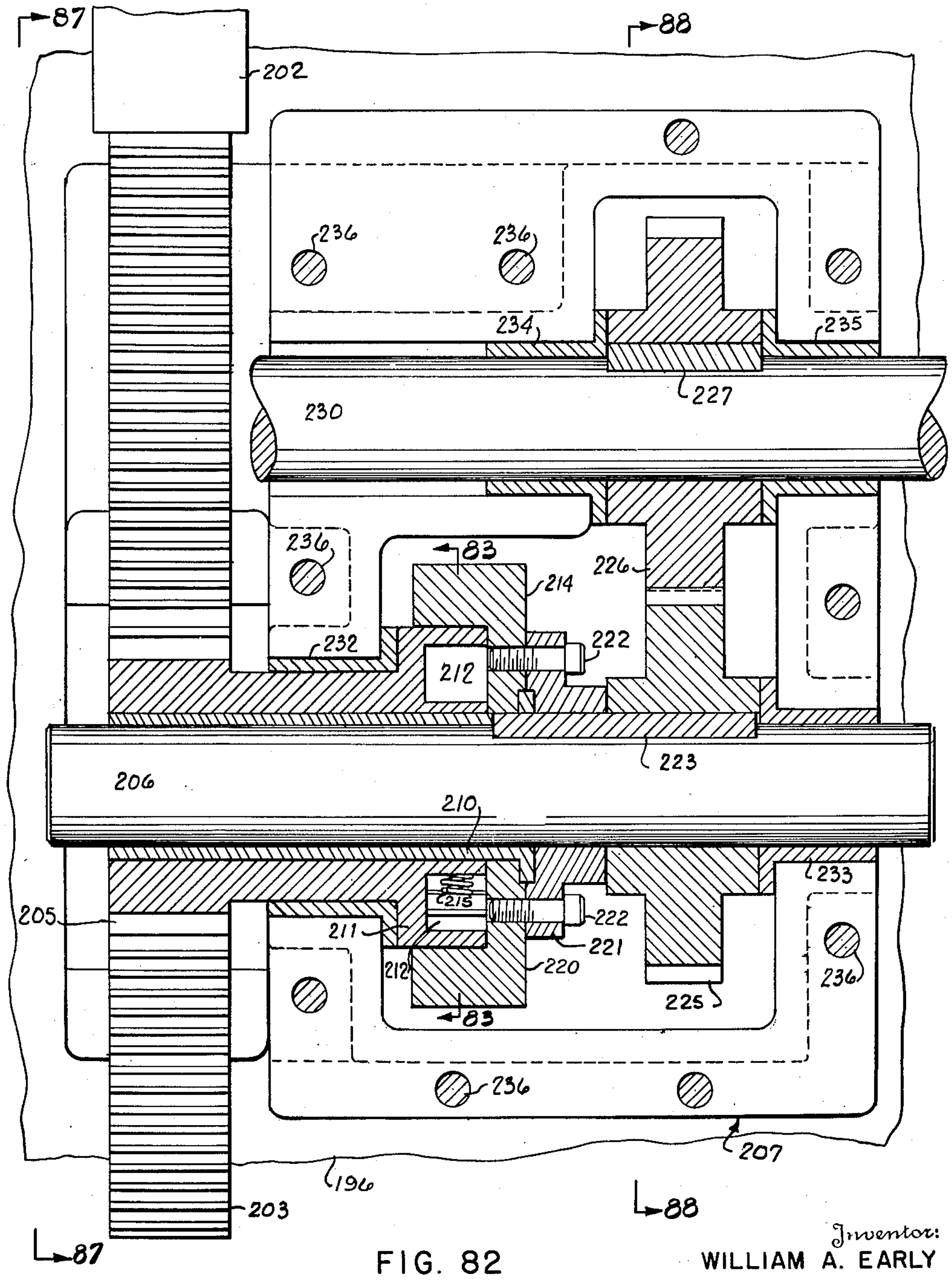
Figure 82 is a transverse sectional view taken along the line 82—82 in Figure 81.
Figure 83:
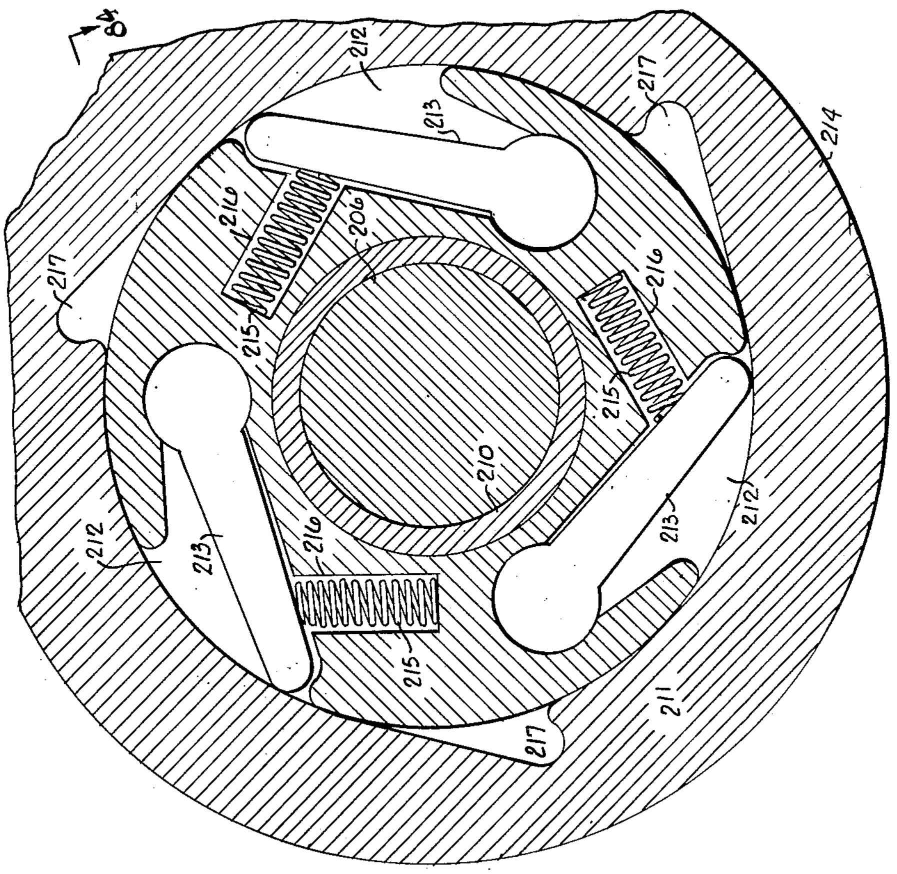
Figure 83 is a sectional view taken along the line 83—83 in Figure 82.
Figure 84:
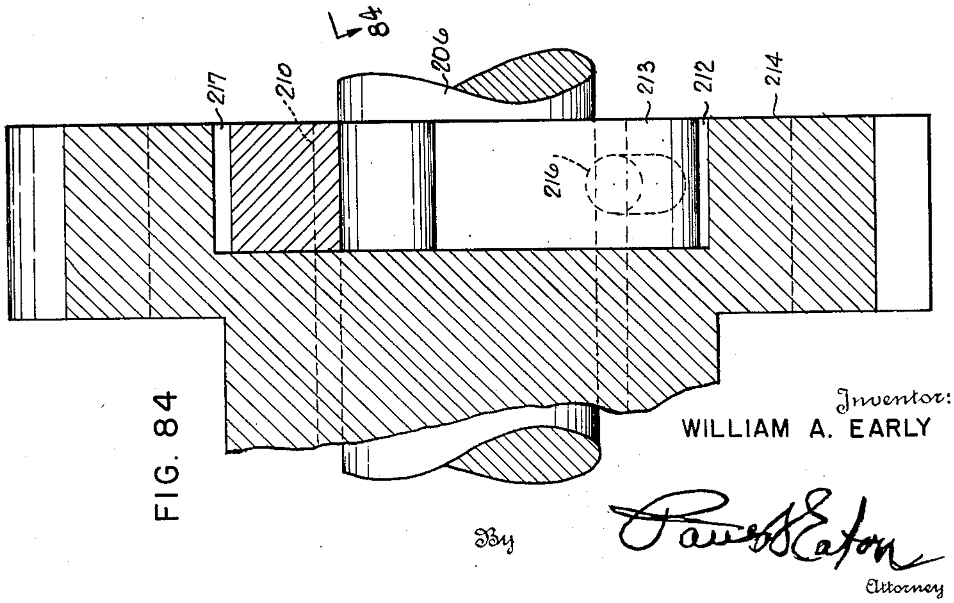
Figure 84 is a transverse sectional view taken along the line 84—84 in Figure 83.
Figure 85:
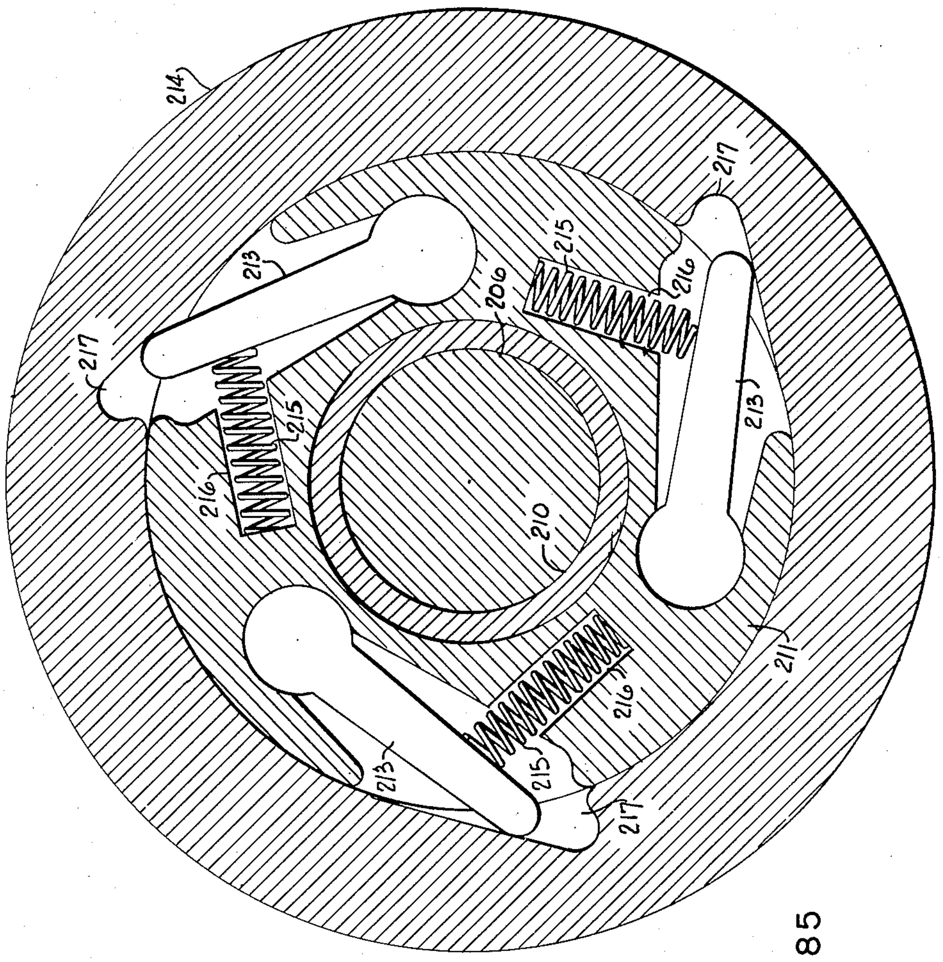
Figure 85 is a view similar to Figure 83, but showing the parts in a different position.
Figure 86:
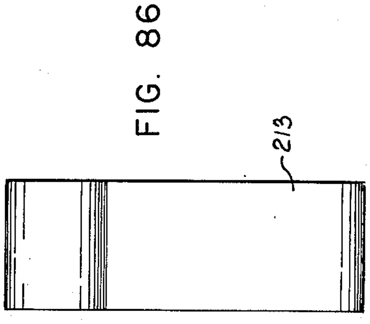
Figure 86 is an elevation of one of the dogs disposed in the assembly shown in Figures 83 and 84.

Mounted on the wheels 591 and 593 is an endless conveyor 600, the details of which will be presently described. It will be observed that brackets 586 are fixed in position, but in order to take up on the tautness in the link belt 600, it is preferable to have some adjustment in one of the sets of the brackets at one end of the plate 574 (see Figure 77). Therefore, the brackets 585 have elongated slots 593 therein penetrated by the bolts 588 and the brackets 585 have outwardly projecting lips 595 which are adapted to be engaged by bolts 596 which are slidably mounted in outwardly projecting members 597 welded to the two sides of plate 574. These bolts 596 can be adjusted and locked in position by means of adjusting nuts 598.

Figures 70, 71, 72, 73, 74, 75:
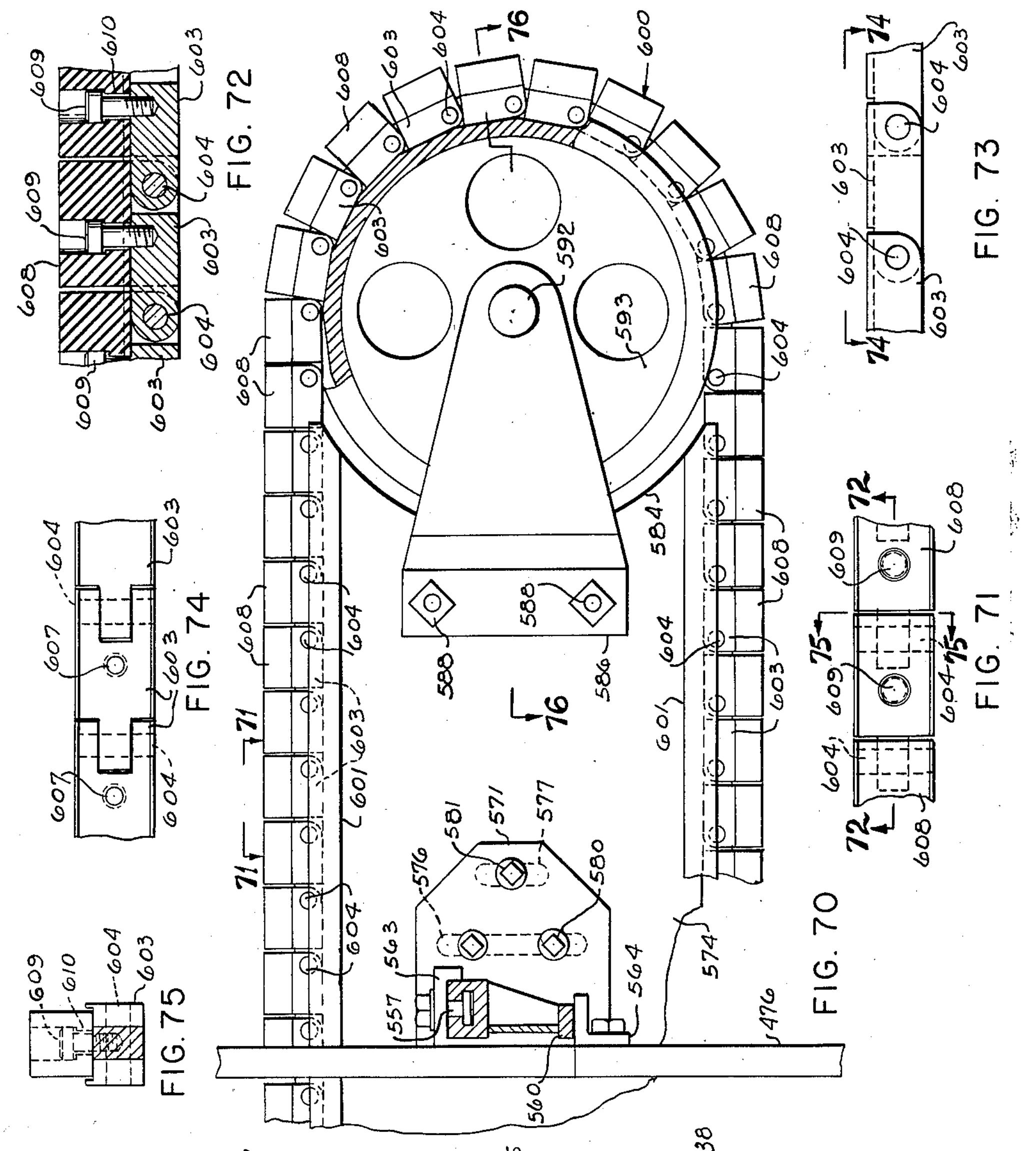
Figure 70 is an elevation of the discharge end of the upper or holddown chain which co-operates with the conveyor chain for conveying work pieces.
Figure 71 is a top plan view on an enlarged scale taken along the line 71—71 in Figure 70.
Figure 72 is a cross sectional view taken along the line 72—72 in Figure 71.
Figure 73 is an elevation of a portion of the hold-down chain shown in Figure 70 and omitting the rubber cleats.
Figure 74 is a top plan view of Figure 73 taken along the line 74—74 in Figure 73.
Figure 75 is a vertical sectional view taken along the line 75—75 in Figure 71.

On the two sides of the plate 574 at the upper and lower edges thereof are welded guide strips 601 (see Figure 70) which project outwardly beyond the confines of plate 574 and provide a channel in which the conveyor belt 600 has movement and thus holds the hold-down belt in position.

The hold-down belt is composed of a plurality of links 603, having a male portion at one end thereof and a female portion at the other end thereof, so that the male portion of one link fits into the female portion of the other link and is joined together by a pin 604 penetrating the male and female portions of each link to join them together in a pivotal manner.

In order to provide proper friction to the surface of the belt 600, each link has a threaded bore 607 therein, and on top of each link is mounted a pad of rubber 608 or other resilient material having a hole therethrough, which hole is restricted at its portion next to the link on which it rests, and has a shoulder screw 609 for confining the rubber member 608 in position. If desired, a small metal sleeve 610 may be placed in the bottom of each hole in the rubber members 608 to prevent the screws 609 from compressing the rubber surrounding the restricted portion of the hole in which the screw fits.

It is thus seen that the endless belt 600 supplies a resilient pressure on the work pieces W being conveyed in spaced relation by the main conveyor belt 350 through the machine and, in so doing, this belt 600 holds the workpieces W down against the angle guides while they are approaching and leaving the position at which the cutter bit assemblies engage them. This belt also holds them in position while they are being operated upon by the cutter bit assemblies.

Although it is not necessary because the guides 601 would hold the endless belt 600 in position at all times, it is preferable, however, to have the wheels 591 and 593 with a peripheral groove therein of a size to accommodate the size of the endless belt 600 to assist in holding the belt in proper position at all times.

It is, of course, to be understood that the belt 600 is an idler belt and no driving means for same is required as its frictional engagement with the workpieces which it holds against the main conveyor belt 350 will cause it to be moved at the same rate of speed and in step-by-step relation as the main conveyor belt 350.

Figure 113:
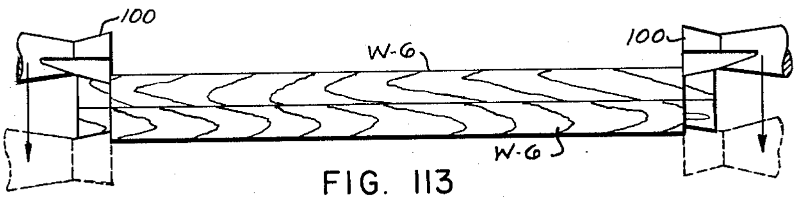
Figure 113 is a view showing the manner in which the upper cutting bits perform to cut the male tenon.
Figure 115:
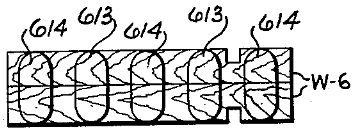
Figure 115 is an end view of two work pieces after they have had all male tenons cut therein; that is, after the second cutting operation.
Figures 114, 117:
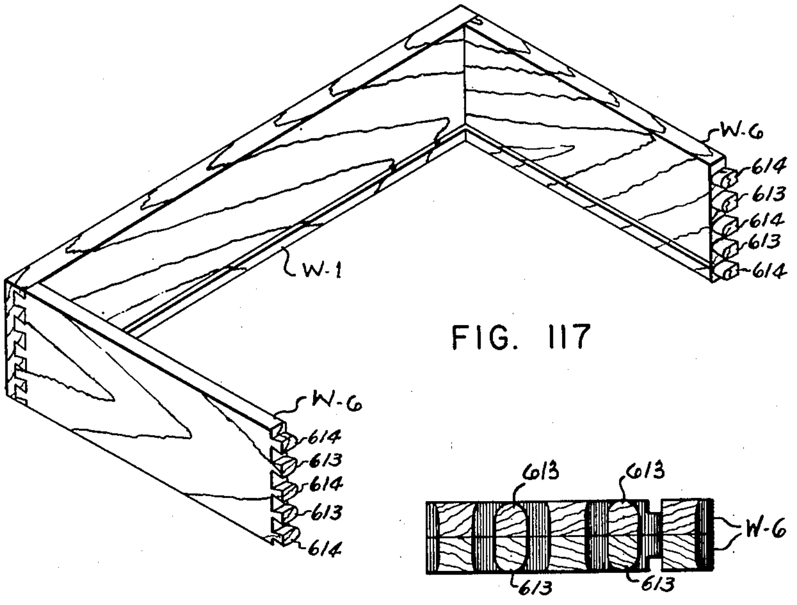
Figure 114 is an end view of two work pieces after the first half of the male tenons have been cut therein.
Figure 117 is an isometric view showing the front and side portions of a drawer showing assembled positions after the male and female tenons have been cut therein.
Figures 118, 119:
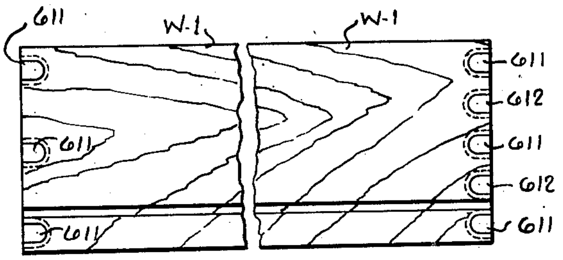
Figure 118 is a part elevation of the inside surface of a front or rear of a drawer after the first half of the female tenons have been cut therein.
Figure 119 is a part elevation of the inside surface of a front or rear of a drawer after all the female cavities or tenons have been cut therein; that is, after the second cutting operation has been completed.

It will be observed in Figures 113 and 116 as to how the cutters have orbital movement for cutting the male tenons, that is the upper cutting bits and cutter bit assemblies. The various positions progressively occupied by the cutting bits is shown in dotted lines in Figure 116 and the up-and-down movement is shown by bold and dotted lines in Figure 113. It is, of course, evident that the cutting bits for both the top and bottom operations are spaced twice as far apart as the final male and female tenons are formed on the end of the workpieces. By referring to Figure 114, it is there shown how the bits have made one complete operation to cut every other tenon, and then when the conveyor 350 is moved another step and the cutting bits are again brought into operation and moved in an orbital path with regard to the workpiece, that the other tenons would be formed as indicated in Figure 115 thus completing the operation of forming the male tenons in the end of the workpiece. In Figure 118 is shown how the lower cutter bits operate by cutting the female tenons in spaced relation to each other, such as cutting every other one of the tenons indicated at 611, while the additional female grooves cut in the next operation are indicated at 612 of Figure 119 where both grooves 611 and 610 are indicated. The male tenons shown in Figures 114 and 116 are indicated by reference characters 613 which are cut in the first cutting operation and at 614 in the second cutting operation to complete the male tenons on the end of the workpiece.

Figure 105:
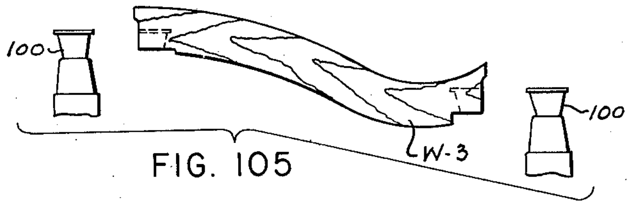
Figure 105 is an edge view of another type of work piece after it has been operated upon by the lower cutting bits.

The workpieces have heretofore been referred to broadly by the reference character W, but there are various types of workpieces which might be employed as is clearly shown in Figures 103 to 112, inclusive. The various types of workpieces, although they are operated upon in the same manner, for sake of identification, are given additional reference characters, such as the workpiece in Figure 103 which is usually the front of a drawer is indicated by reference character W-1. While in Figure 104, there is an outwardly bulging drawer front indicated as W-2, and in Figure 105 is another form of serpentine drawer front indicated by W-3.

In Figure 106 a swell drawer front is indicated at 74 and in Figure 107 a concave drawer front is indicated at W-5. The slide portions of a drawer are usually uniform and are indicated by reference character W-6. It is, of course, understood that the back portion usually has female grooves therein, the same as the front of the drawer, which are joined to the male tenons on the rear end of sides W-6 to the drawer. It might be stated that the lower cutters move inwardly and outwardly and do not have any orbital movement, while the upper cutters do not move inwardly and outwardly automatically, but do have an automatic orbital movement while the lower cutters are moving in and out in a cutting operation.

Figure 31:
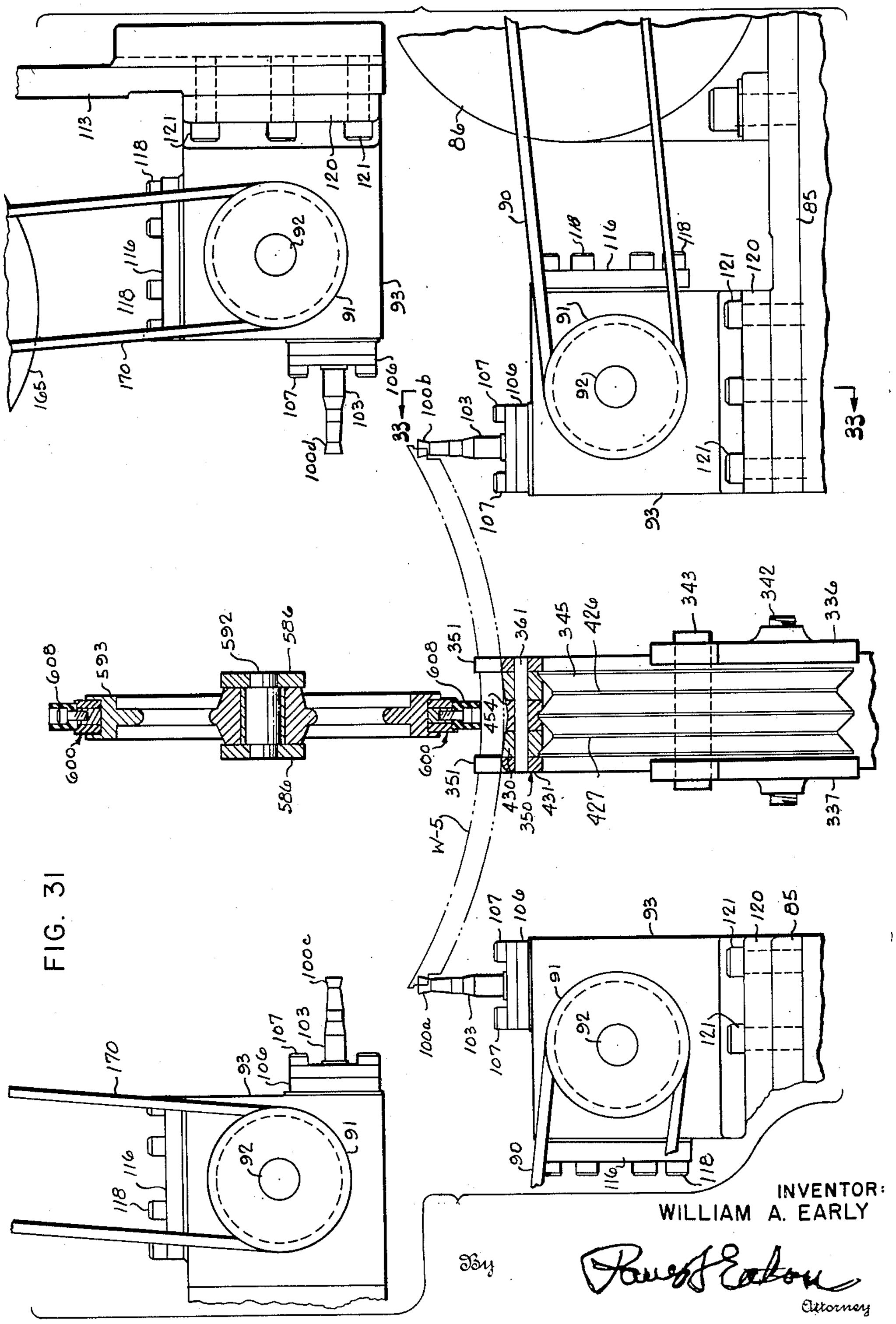
Figure 31 is a view, partly in vertical section and partly in elevation and taken transversely of the conveyor and showing a work piece in dotted lines being operated on by the lower cutting bits and showing the upper cutting bits in idle position.
Figure 32:
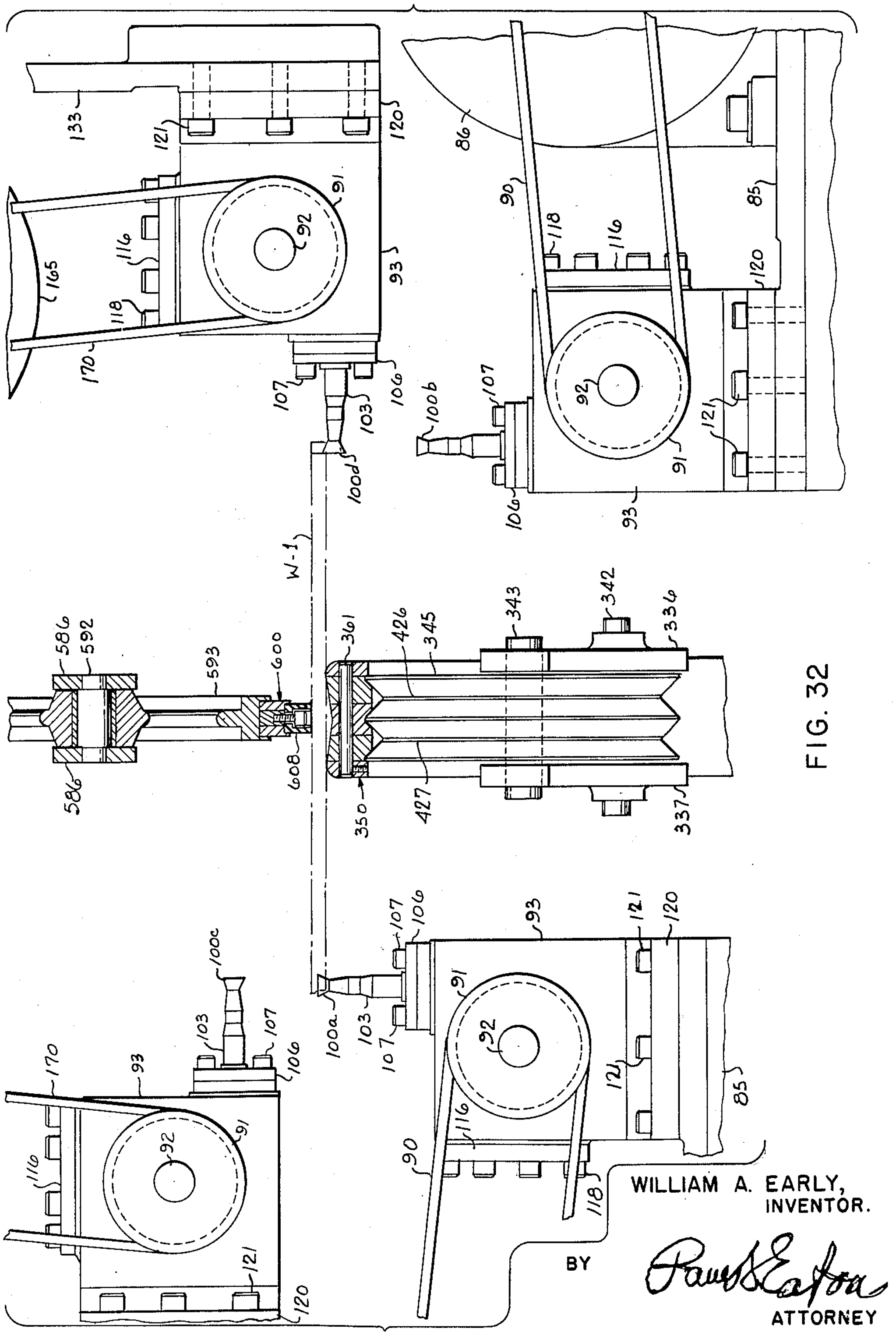
Figure 32 is a view partly in vertical section and partly in elevation and taken transversely of the conveyor and showing a work piece in dotted lines being operated on by the upper cutting bits on one end and the lower cutting bits on the other end simultaneously.

One important feature of this invention is that in certain cases it might be desired to cut female tenons or grooves in one end of the workpieces while simultaneously cutting male tenons in the other end of the workpieces. This can be accomplished by setting of the cutters as illustrated in Figure 32, which is similar to Figure 31, but in Figure 32 there is shown a setting of the cutter assemblies so that the upper cutter assembly is cutting male tenons in one end of the workpiece while the lower female groove cutting bits are cutting female grooves in the other end of the workpiece.

It is, of course, evident that where male tenons are cut at one end of a workpiece and female tenons cut in the other end of the workpiece, that there will be only one workpiece and while the other cutters were traveling in their orbital path they would only cut the male tongues on one end of a single workpiece and would not cut the male tongues on the ends of two workpieces simultaneously while they are placed in superposed relation such as would occur if the cutters were operating in the same horizontal plane.

A detailed description of the various figures of the drawings having been given, it is believed that an explanation of the operation of the machine can best be understood by referring to the diagrammatic showing Figures 120 and 120–A, and 121 where many of the parts illustrated in the drawing are shown schematically, and where the piping and wiring systems are shown schematically for the first time for the reason that the pipes and wires on the mechanical figures in the drawing would not tend for clearness for, as a matter of fact, the wiring and the controls for the hydraulic pistons and the spindle and conveyor cylinders, clamping cylinders and the like can be disposed at points remote from the machine.

By referring to Figures 120, 120–A and 121, it is seen that there has been provided a fluid tank 625 which has mounted thereon an electrically-driven pump 626 which has an intake pipe 627 extending into the tank and has an output pipe 628 extending from the pump. Output pipe 628 has branches 630, 631 and 632 leading therefrom. Pipe 630 has a flow-control valve 633 therein, and beyond the flow-control valve 633 are branch pipes 630*a* and 630*b*.

Branch pipe 631 has a flow-control valve 634 therein, and leading from the other side of flow-control valve 634 are two branch pipes 631*a* and 631*b*. Branch pipe 632 is forked and has branch leads as 632*a* and 632*b*. The main output pipe 628 has a manually-controlled volume control valve 635 disposed therein, and also has an electrically-controlled shut-off valve 636.

The valve 636 is controlled by a solenoid coil 638 which will be presently described. The two valves 635 and 636 are mounted in a housing 637 into which the pipe 628 leads at one side and emerges from the other side.

A return flow pipe 640 leads back into the fluid tank 625. Pipes 628 and 640 are connected by a pipe 639 which taps off pipe 628 before it reaches the housing 637. Return pipe 640 has branch pipes 641, 642 and 643 leading therefrom. Branch pipes 641, 642 and 643 have check valves 644, 645 and 646 therein, which allow fluid to flow through these valves only in the direction indicated by the arrows.

Branch pipes 630*a* and 630*b* as well as branch pipe 643 are connected to a solenoid valve housing 652. Branch pipes 631*a*, 631*b* and 642 are connected to a solenoid valve housing 653. Branch pipes 632*a*, 632*b* and 641 are connected to a solenoid valve housing 654.

Branch pipe 630 has therein a check valve 650 and a pressure reducing valve 651.

Valve housing 652 has connected thereto pipes 660 and 661 which are connected to pipes 662 and 663 respectively. The pipe 662 is connected to pipes 544 which lead to one end of the clamping cylinders 540 and 541, while the pipe 663 is connected to pipes 543, which lead to the other ends of the clamping cylinders 540 and 541. The pipes 394 and 395, which have previously been described as being connected to the two ends of conveyor cylinder 392, are connected to the other side of solenoid housing 653 in spaced relation to each other.

The solenoid housing 654 has connected to the other side thereof in spaced relation to each other the pipes 191 and 192 which lead to the opposed ends of the spindle cylinder 190, which has heretofore been described. The pipe 192 has disposed therein a volume-control valve 667, and by-passing control valve 667 is a branch pipe 668, which has a check valve 669 therein which prohibits flow therethrough from left to right in Figure 120 but which permits flow therethrough from the cylinder back to the fluid tank 625 at a faster rate than would be possible if this fluid has to return through the volume-control valve 667.

Valve housing 652 has slidably mounted therein a core 675 having ports 676, 677 and 678 passing therethrough and core 675 has operatively associated with each end thereof solenoids 680 and 681.

Solenoid valve housing 653 has slidably mounted therein a valve core 685 which has ports 686, 687 and 688 and has operatively associated with the end thereof solenoids 690 and 691.

Valve housing 654 has slidably mounted therein a core 695 which has penetrating the same ports 696, 697 and 698 and the slidable core 695 has associated with the two ends thereof solenoids 699 and 700, respectively.

Figure 87:
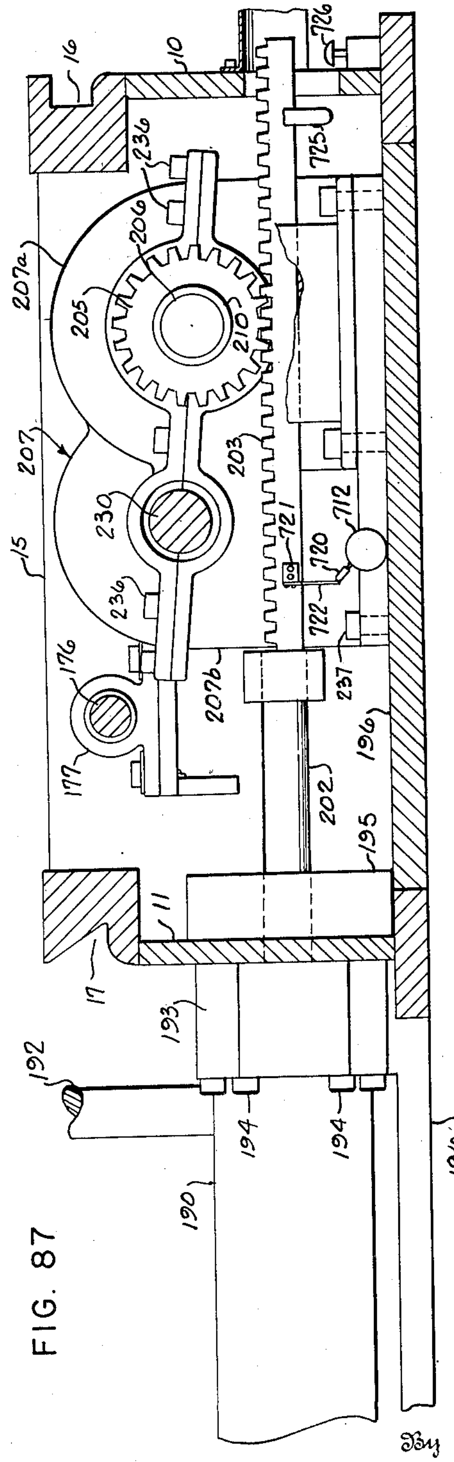
Figure 87 is a sectional view taken along the line 87—87 in Figure 82.
Figure 88:
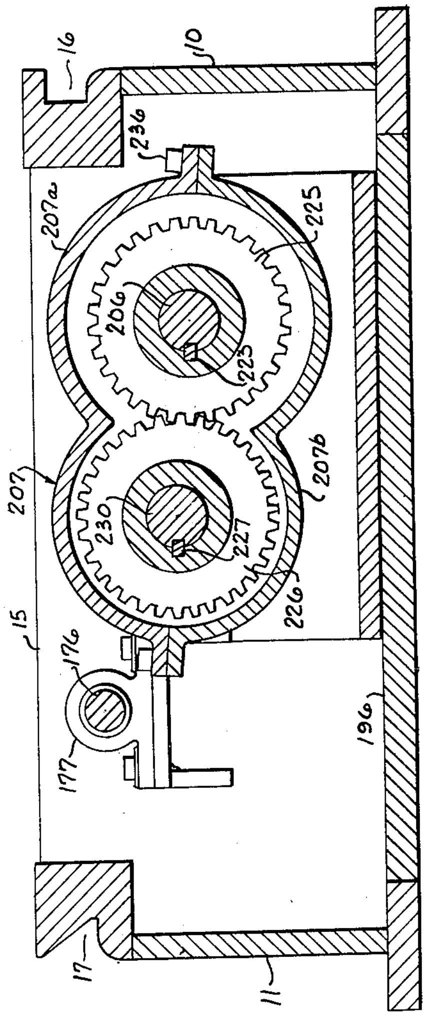
Figure 88 is a sectional view taken along the line 88 in Figure 82.
Figure 89:
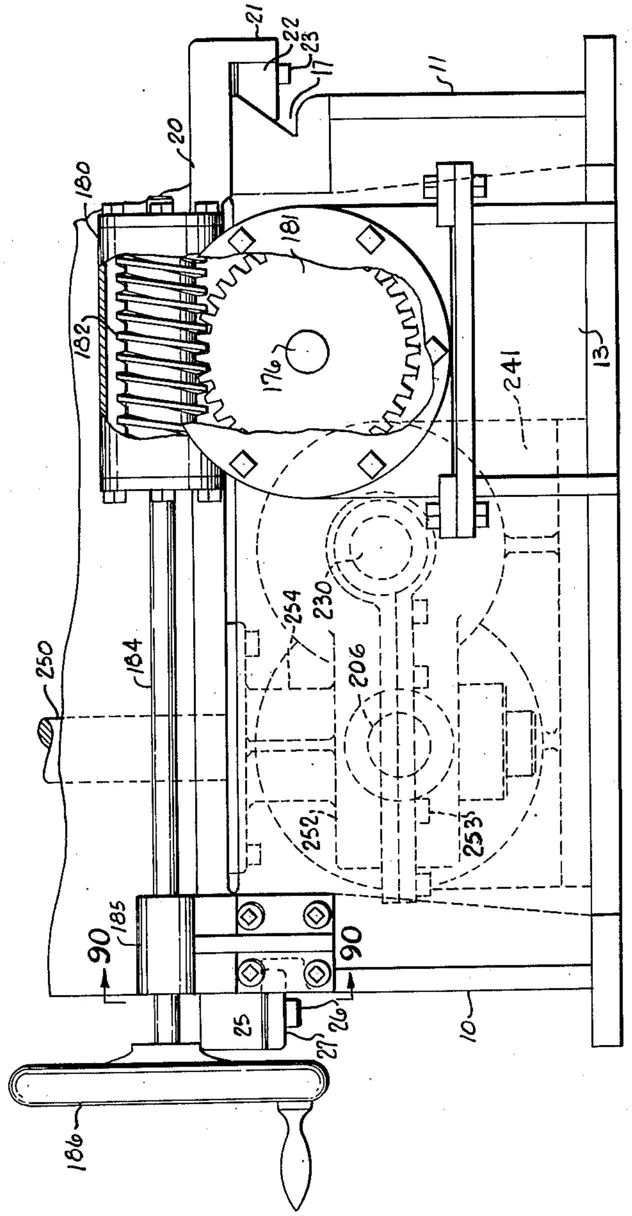
Figure 89 is an enlarged elevation, partly in section, taken along the line 89—89 in Figure 1.
Figure 90:
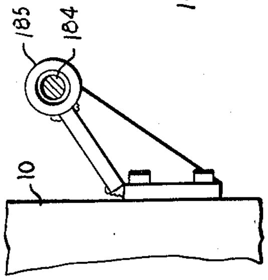
Figure 90 is an elevation, partly in section, taken along the line 90—90 in Figure 89.
Figures 91, 92, 93:
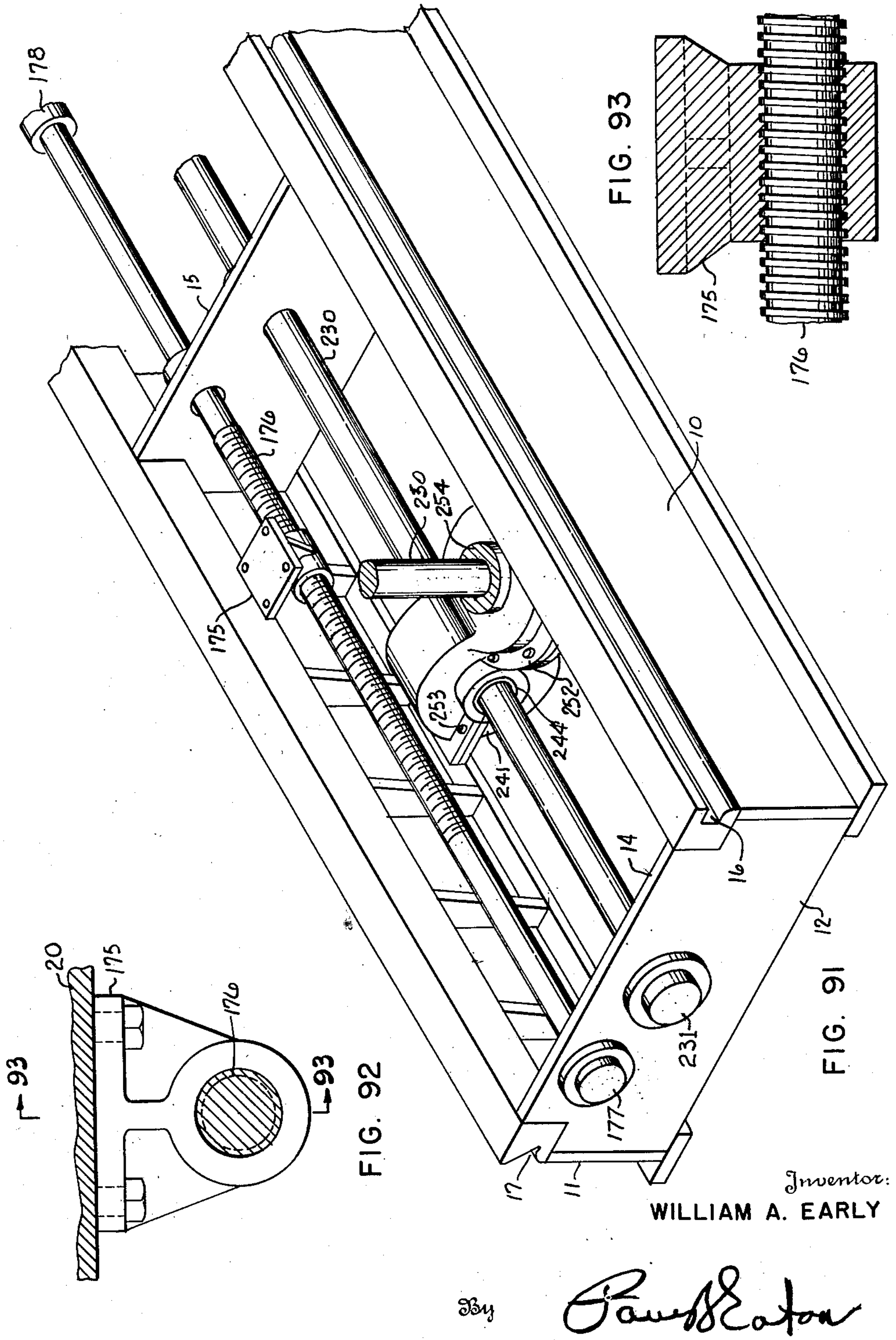
Figure 91 is an isometric of the left-hand portion of the mechanism for controlling the position of all the spindle assemblies.
Figure 92 is an elevation showing the screw-threaded rod in section and the bracket disposed on the screw-threaded rod in Figure 91.
Figure 93 is a vertical sectional view taken along the line 93—93 in Figure 92.
Figures 94, 95, 96:
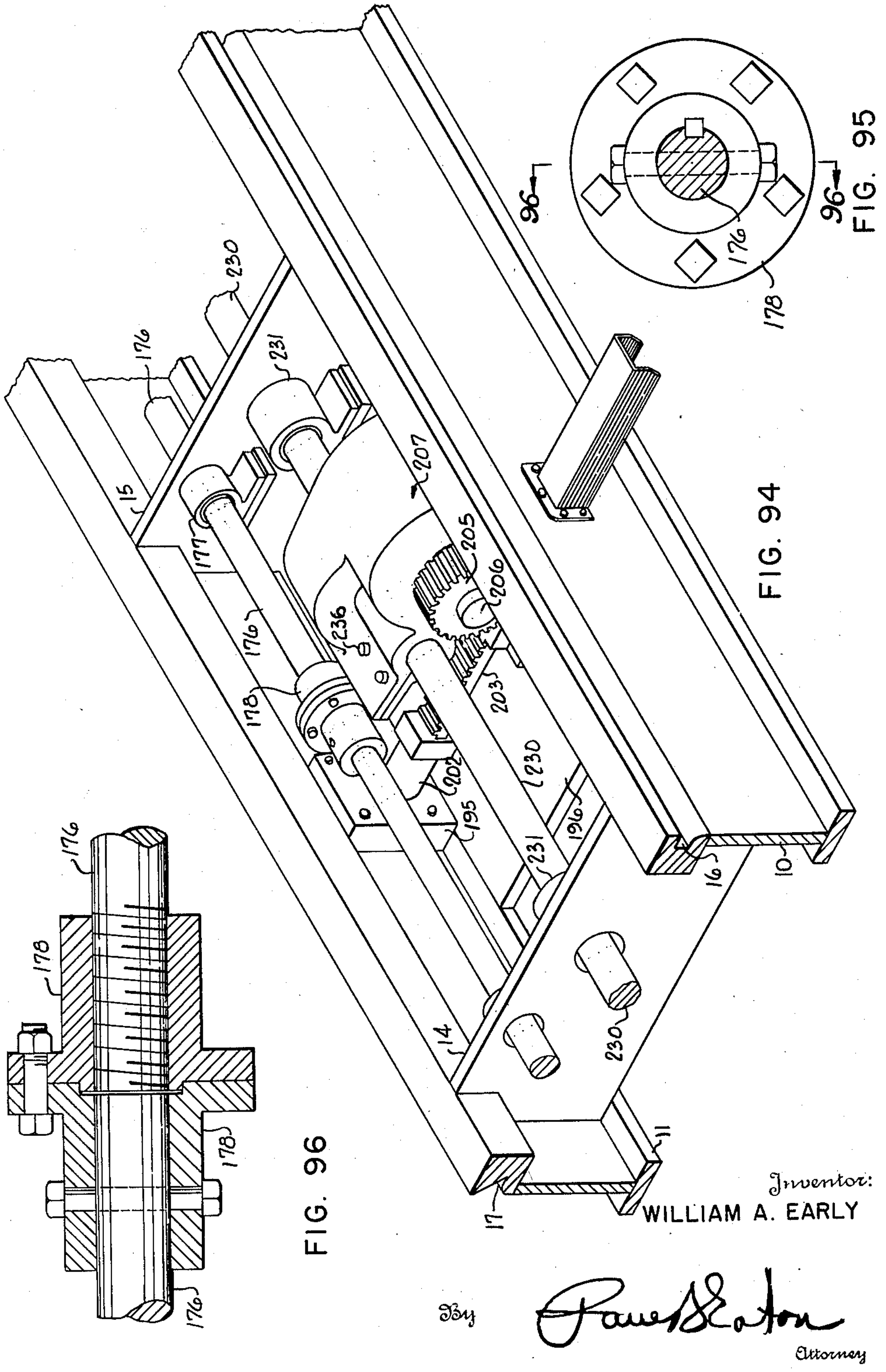
Figure 94 is an isometric view of the central portion of the spindle control means, an extension of Figure 91.
Figure 95 is an elevation, with the shaft down in section, of the coupling in the central left-hand portion of Figure 94.
Figure 96 is a vertical sectional view taken along the line 96—96 in Figure 95.
Figures 97, 98, 99:
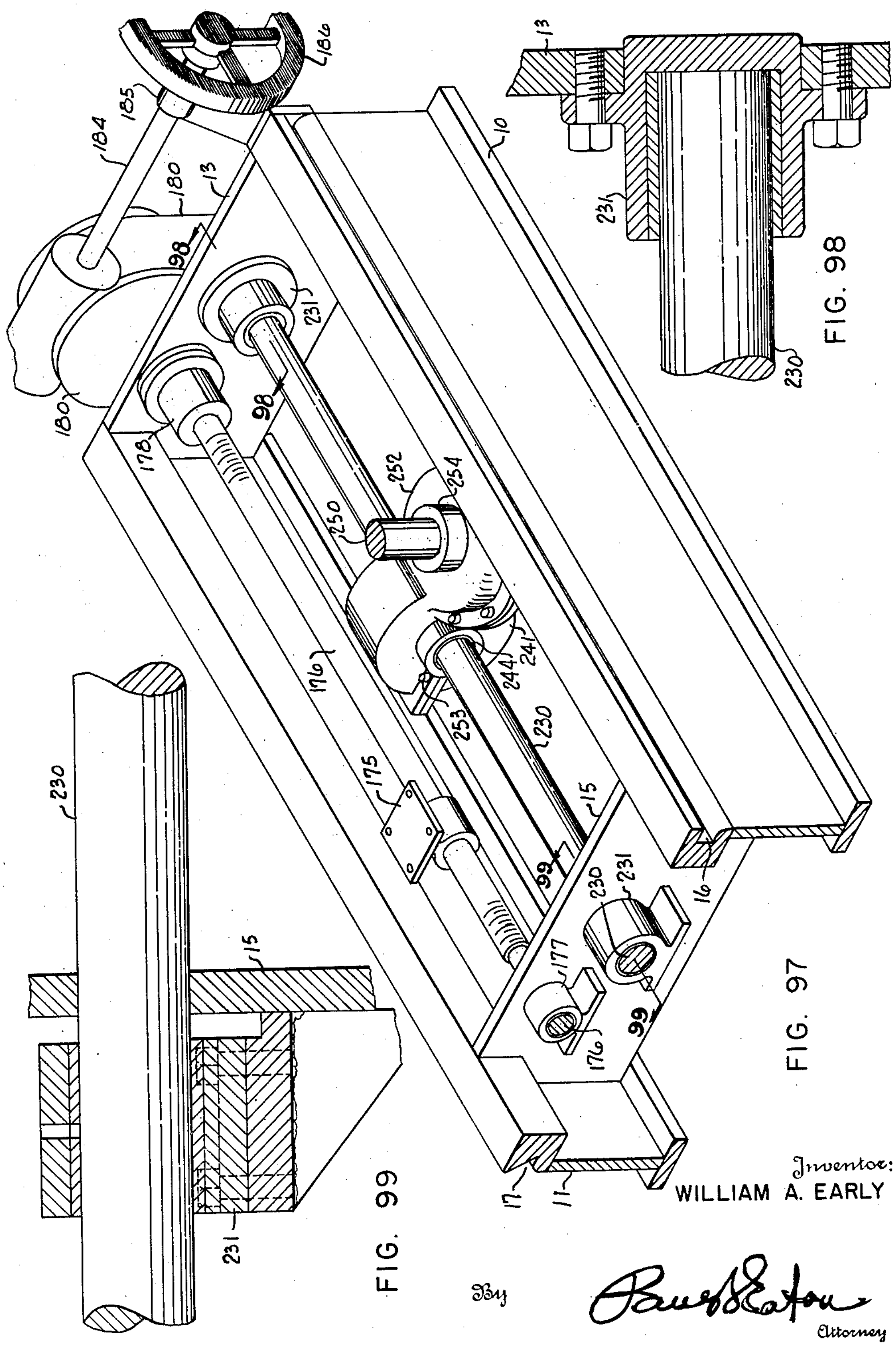
Figure 97 is an isometric view of the right-hand portion of the spindle assembly positioning means and being a continuation of Figure 94.
Figure 98 is a sectional view taken along the line 98—98 in Figure 97.
Figure 99 is a vertical sectional view taken along the line 99—99 in Figure 97.
Figures 100, 101, 102:
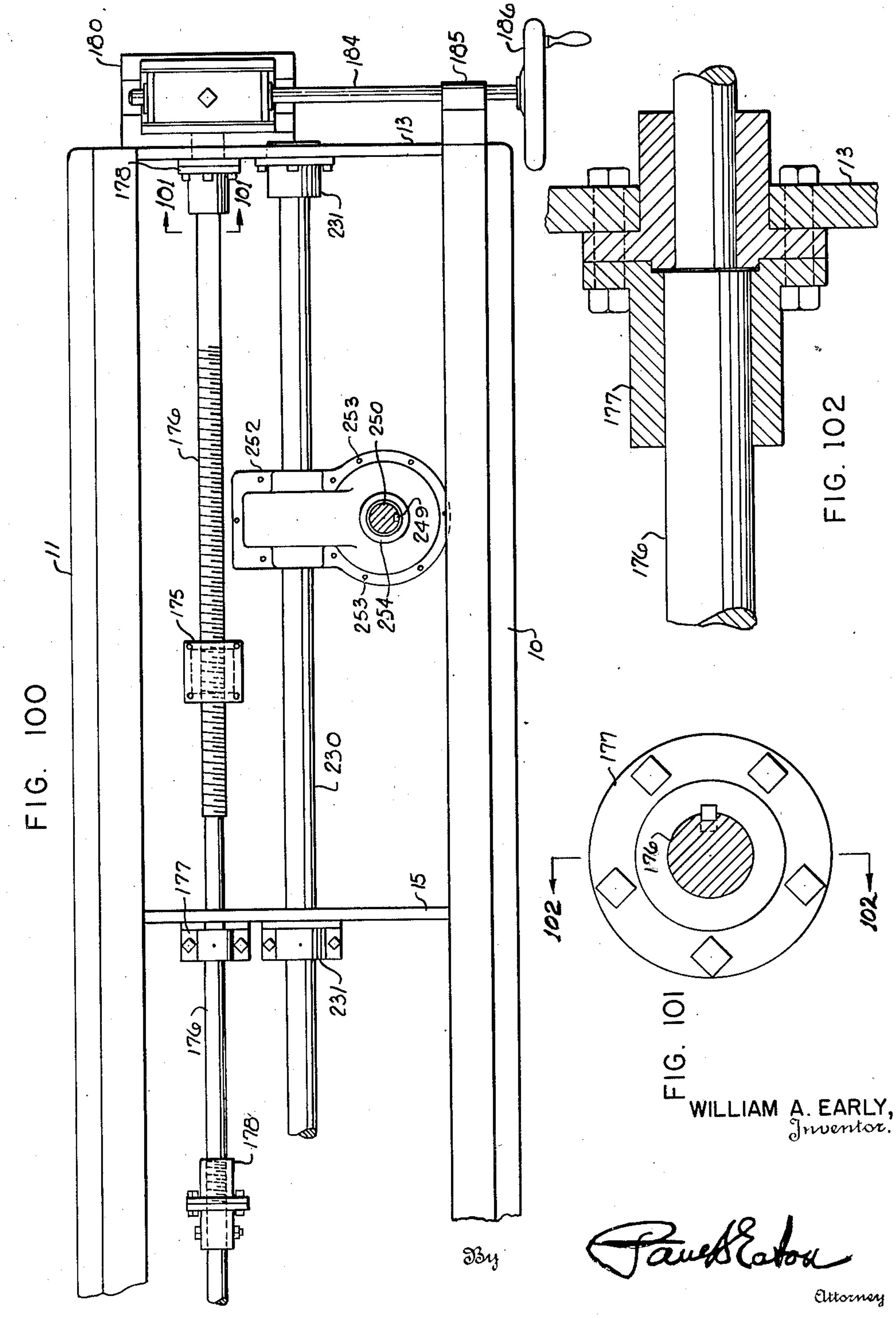
Figure 100 is a top plan view of structure shown in Figure 97 and showing a portion of the structure shown in Figure 94.
Figure 101 is a sectional view taken along the line 101—101 in Figure 100.
Figure 102 is a vertical sectional view taken along the line 102—102 in Figure 101.
Figure 103:
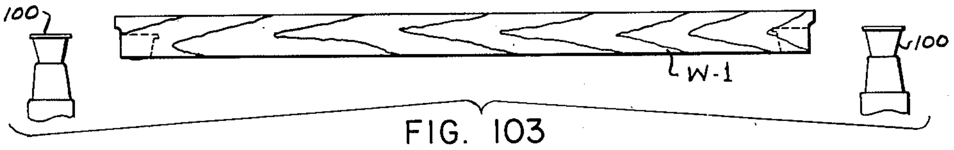
Figure 103 is a view showing one form of work piece after it has been operated upon by the lower cutting bits.
Figure 104:
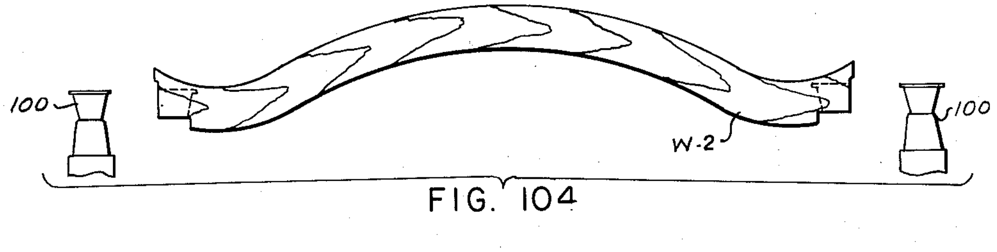
Figure 104 is a view of another type of work piece after it has been operated upon by the lower cutting bits.

In the schematic diagrams two sources of power in the form of male wall plugs 705 and 706 are shown, but this is purely for purpose of avoiding complications in the electrical diagram as it is quite evident that one source of power could be used instead of two. Leading from source of power 706 are two wires 707 and 708. Connected to wire 708 is a wire 710 which leads to contact 711 in a switch box 712 (Figure 87). This switch box 712 also has contacts 713, 714 and 715. Pivotally mounted as at 717, is a metallic switch 718 having a tip of insulating material 720 thereon. The rack 203 has mounted thereon a block 721 which has secured thereon a downwardly projecting leaf spring 722 (see Figure 87).

This leaf spring 722 is adapted to flip the switch 718 from engagement with contact points 713 and 714 to engagement with contact point 711 and 715 upon reciprocatory motion of the rack 203. The rack 203 also has mounted thereon a downwardly-projecting portion 725 which is adapted to ride on the upper convex face of a plunger 726 which has an insulating block 727 on its lower end and having two spaced contacts 730 and 731 thereon. Fixedly mounted in any desired manner is a pair of contacts 732 and 733 which are adapted to be engaged by contacts 730 and 731 when the parts are in position shown in Figure 120–A.

The parts shown in the position in the lower right-hand corner of Figure 120–A will be the position they will occupy when the rack 203 associated with the spindle cylinder 190 are in the position shown as the cutter bit assemblies are about to be operated in their orbital path, as to the upper cutter bits, and in the position which the parts will occupy when the lower cutter bit assemblies are about ready to be advanced inwardly and outwardly in a female groove cutting operation.

Figure 69:
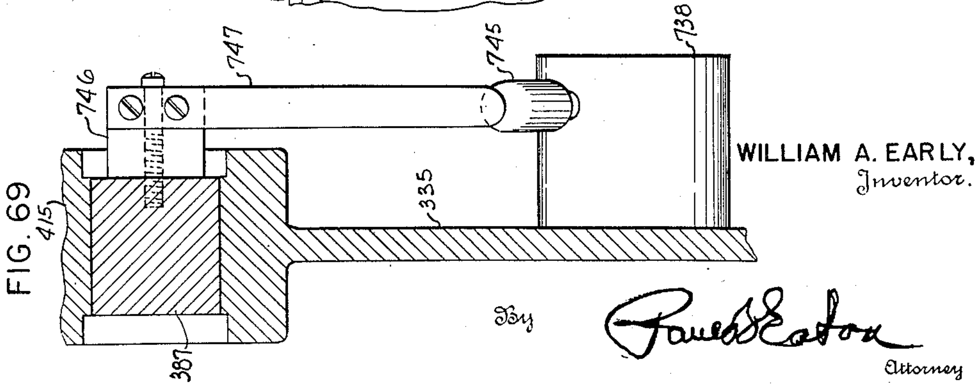
Figure 69 is a vertical sectional view taken along the line 69—69 in Figure 65.
Figure 76:
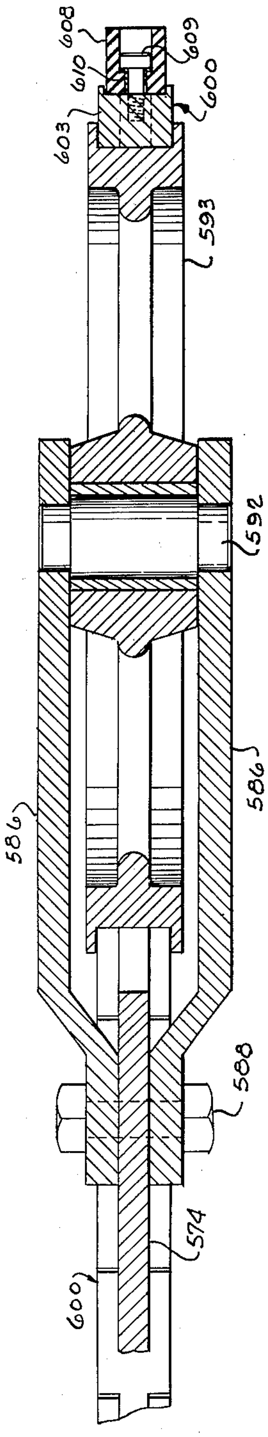
Figure 76 is a sectional view taken along the line 76—76 in Figure 70.

The wires 707 and 708 have connected thereto wires 735 and 736, respectively. Wire 736 leads to a contact point 737 in a switch box 738 (Figures 65 and 69). This switch box also has contacts 740, 741 and 742 therein. Pivotally mounted in the switch box as at 743 is a metallic switch 744 which has an insulated tip 745 on its outer end. Mounted on the rack 387 is a block 746 which has a leaf spring member 747 extending downwardly therefrom so that during the reciprocatory travel of the bar 387 the leaf spring finger 747 will engage the insulated tip 745 of switch 744 and flip it from first one position to the other, namely, from engagement with contact points 737 and 742 to engagement with contacts 740 and 741, respectively, in a back-and-forth manner during the operation of the machine.

The plunger 387 has a downwardly projecting finger 750 which is adapted to ride onto upper convex surface of a pin 751, which has an insulated block 752 on its lower end provided with contact points 753 and 754, respectively. These contact points 753 and 754 are adapted to engage contact points 755 and 756 when the pin 750 rides onto the convex surface of pin 751. This pin 751 is normally held in elevated position by means of a compression spring 757. The pin 726, previously described, likewise has a similar compression spring 757 to hold it in elevated position as the structure of the two switches is identical.

Wire 707 has leading therefrom a wire 760 which has connected thereto a wire 761 which leads to one side of the solenoid coil 699 and from the other side of solenoid coil 699 a wire 762 leads back to contact 715 in switch box 712. Also connected to wire 760 is a wire 763 which extends to one side of the solenoid coil 700 and a return wire 764 leads back to contact point 714 in switch 712. Wire 765 is connected to wire 763 and leads to contact point 731. A wire 766 is connected to wire 764 and leads to contact point 730. A wire 770 leads from contact point 733 to one side of solenoid core 690, and from the other side of solenoid core 690 and wire 771 leads back to contact 732. Wire 735 has leading therefrom a wire 772 which leads to one side of solenoid coil 680 and from the other side of this solenoid coil a wire 773 leads back to contact point 742 in switch box 738. Wire 735 also has connected thereto a wire 775 which leads to one side of solenoid coil 681 and from the other side of this coil a wire 776 leads to contact 741 in switch housing 738. Wire 775 has connected thereto a wire 777 which leads to contact 753, while contact 754 has connected thereto a wire 778 which is connected to wire 776. Contact point 755 has connected thereto a wire 780 which leads to one side of solenoid coil 691, and from the other side of solenoid coil 691 a wire 781 is led back to contact point 756.

By referring to Figure 121, it is observed that the male wall plug 705, which has already been described, has leading therefrom wires 785 and 786, which are the master input wires. These wires lead to a master switch 787. Leading from the other side of master switch 787 is a wire 788 which has connected thereto a plurality of branch wires 789, 790, 791 and 792, which wires 789 to 792, respectively, lead to manually operated switches 793, 794, 795 and 796, mounted on a control panel 797. These switches are for cutting the current on and off to the spindle operating motors 86 and 165.

The wire 788 leads to a switch 800 which controls all electric motor 802 for driving the pump 626. A wire 801 leads from switch 800 to electric motor 802, and a wire 803 returns from the electric motor 802 back to a wire 804 which leads to the master switch 787. From switch 793 a wire 806 leads to one side of one of the motors 86 for operating one of the lower cutter assemblies. A wire 807 leads from switch 794 to one side of the other lower cutter operating motor 86. A wire 808 leads from switch 795 to one side of one of the upper spindle operating motors 165. A wire 809 leads from switch 796 to one side of the other upper spindle operating motor 165. Wires 810 and 811 are connected to the motors 165 and 86 and in turn are connected to a wire 812 which is connected to a wire 813 which leads from one side of the upper spindle motors 165 to one of the spindle operating motors 86 and to this wire 813 is connected a wire 814 which leads to wire 804. A wire 816 is connected to wire 788 and leads to a manually-operated switch 817 from whence leads a wire 818 which leads to one side of the solenoid coil 638 and from the other side of solenoid coil 638 a wire 819 leads to the wire 804.

It will be observed in the drawings, especially Figures 19, 20, 21 and 34 that each of the upper and lower cutting bit assemblies have twelve rotary cutting bits spaced apart from each other twice the distance between the finished grooves and tenons shown in Figures 108 to 119, inclusive. It will also be observed in Figures 114 and 118 that only half of the tenons and grooves have been formed, whereas in Figures 115 and 119 all of the tenons and grooves have been formed. In explanation of this, attention is called to Figures 122 to 125, inclusive, in which a schematic showing is made to illustrate the action of the cutters on the ends of the workpieces. The left-hand end of Figures 122 to 125, inclusive, represent the feed end of the machine as the workpieces are traveling from left to right through the machine in Figures 122, 123 and 124, and although the rotary cutting bits are referred to in the main portions of the drawings by reference character 100, in Figure 125 the twelve cutting bits, whether they be in the vertical cutters or the horizontal cutters, are designated by reference characters *a* to *l*, inclusive, the cutting bit designated by *a* being the bit closest to the feed end of the machine, and although in Figures 122 to 125, inclusive, we have shown the operation of the lower cutting bits, this operation equally applies to the upper cutting bits.

The piston 393 in cylinder 392, when moved forwardly to advance the workpieces moves all of the workpieces one step or a distance equal to the width of two workpieces, including the space between two workpieces and half the space adjacent the rear edge of a pair of workpieces.

With the machine placed in operation, the upper cutting bits will move in their orbital paths and the lower cutting bits will move in and out regardless of whether there are any workpieces to be operated upon or not. When the first two workpieces W—*a* and W—*b* are advanced to cutting position, the first six cutting bits *a* to *f*, inclusive, will engage the two leading workpieces W—*a* and W—*b* and cut grooves *a'* to *f'*, inclusive, as shown in Figure 122, then while the cutter bits are out of contact with the workpieces the conveyor is given another forward movement which causes the cutter bits *h* to *l*, inclusive, excepting cutter *j*, to cut the grooves *h'*, *i'*, *k'*, *and l'*, while cutters *g* and *j* will pass between the proximate edges of adjacent workpieces to cut no grooves. At the same time, the cutter bits *b*, *c*, *e* and *f* will cut grooves *b'*, *c'*, *e'* and *f'* in the two trailing workpieces W—*c* and W—*d* in Figure 123. The two leading workpieces W—*a* and W—*b* having had their grooves or tenons completed at this second step, another forward or third step of movement is given to the conveyor to place the workpieces in the position illustrated in Figure 124, and while the workpieces W—*c*, W—*d*, W—*e* and W—*f* remain stationary, the cutter bits will engage the ends of four last-named workpieces causing the rotary bits *g*, *h*, *i*, *j*, *k* and *l* to cut the grooves *g'*, *h'*, *i'*, *j'*, *k'* and *l'* in the two workpieces W—*c* and W—*d* which previously had the grooves *b'*, *c'*, *e'* and *f'* cut therein, while the cutter bits *a*, *b*, *c*, *d*, *e* and *f* will cut the grooves *a'* to *f'*, inclusive, in the last two left-hand workpieces W—*e* and W—*f* in Figure 124. This will continue as long as workpieces are fed to the machine and it continues in operation, and in this way only half of the grooves or tenons are cut in the ends of the workpieces at one operation of the cutter bits and the remaining groove or tenons will be cut upon the second engagement of the ends of the workpieces by the cutter bits.

It is to be observed in Figure 123 that the reference characters *a''*, *d''*, *g''* and *j''* indicate, not grooves, but spaces where the cutting bits *a*, *d*, *g* and *j* move into and which are disposed between the workpieces, during a cutting operation, while in Figure 124 the reference characters *a''*, *d'' and g''* likewise indicate the spaces between the workpieces W—*e*, W—*d*, W—*c* and W—*b* where the cutters enter but of course perform no cutting operation.

*Method of operation*

To begin operation of the machine, the upper and lower spindles or cutting bits and their assemblies are adjusted as to elevation manually by the hand wheels 67 and, of course, it is evident that these upper and lower cutting bit assemblies can be adjusted to different heights where the workpiece is not a straight member. However, let us assume that we are operating on a workpiece which is a straight member and in which female grooves are to be cut by the lower cutter bit assemblies. The upper and lower cutter bit assemblies are adjusted as to distance apart from each other by hand wheel 186. The conveyor 350 is loaded with a plurality of spaced workpieces W ready to be conveyed through the machine and the motor switches 793 to 796 are moved to closed position before the master switch 787 and switch 800 have been moved to closed position.

Let us assume that the conveyor-operating piston 393 is in the position shown in Figure 120–A, ready to be retracted for again advancing to move the conveyor 350 one step. In this position the clamping cylinders 540 and 541 would be in clamping position during this receding movement of the conveyor-moving means.

Due to the fact that current would be passing through contacts 737 and 742 in Figure 120–A, this would energize solenoid 690 and move the core 675 all the way to the left in Figure 120, which would cause passageway or port 677 to coincide with pipes 630*a* and 631. This would cause the pistons 545 and 559 in the clamping cylinders 540 and 541 to move downwardly against a workpiece in operative position to clamp it while the piston 393 in the conveyor cylinder 392 is moving back ready to cause its dogs 375 to engage links of the chain 350 to move it another step.

Before this operation is carried out however, and while the clamping members 527 and 528 are down against the workpieces, the lower cutting bit assemblies would move inwardly and outwardly and the upper cutting bit assemblies would move vertically in an orbital path to cut any workpiece which might be in the way.

When the machine is first started in operation, the spindle cylinder 190 and associated parts will be in position shown in Figures 120 and 120–A. This will cause the switch 718 to be in the position shown in Figure 120–A, and current will be flowing through wires 710, 764 and through solenoid coil 700 and back through wire 763 to cause the core 695 to be pulled all the way to the right to the position shown in Figure 120. This will cause fluid, under pressure, to flow through port 697 and pipe 192 to the left-hand end of the cylinder 190 in Figure 120–A, to start right-hand movement of the rack 203.

Before this right-hand movement has taken place, the switch pin 725 will be depressed to cause current to flow through wire 770 to solenoid coil 690 and will move the core 685 all the way to the left in Figure 120 which will cause fluid under pressure to flow from pipe **631*a*** through port 687 and through pipe 394 to the right-hand end of the conveyor cylinder 392, to move the piston 393 to the left in Figure 120–A along with the conveyor advancing mechanism to move it in a receding position ready to give another step-by-step movement to the conveyor 350.

It is to be noted that the wiring for switch 726 is such that it cannot be energized except when switch 718 is in the position shown in Figure 120–A, thus preventing flow of any current through switch 726 except when the parts are in the position shown in Figure 120–A.

With the conveyor 350 advanced, and the piston 393 and conveyor cylinder associated parts being in the position shown in Figure 120–A, it is seen that the switch arm 744 is causing current to flow through solenoid coil 680 to move the core 675 are the wayy to the left in Figure 120, which will cause fluid under pressure to flow through pipe 630*a* and port 677 and pipe 661 to the top of clamping cylinders 540 and 541 to move the clamping members 527 and 528 down into engagement with the workpiece. This charging of the clamping cylinders 540 and 541 cannot take place until the piston 393 has moved all the way to the left-hand end of cylinder 392.

It will be observed that when the cylinder piston 393 has moved all the way to the left in Figure 120 in a receding position ready for advancing the conveyor 350 another step, the projection 759 will ride onto pin 751 and press it and establish a circuit through solenoid coil 691. This circuit, however, cannot be established until the leaf spring member 747 engages insulated tip 745 of switch arm 744 to cause it to make contact with contact points 740 and 741 which will cause current to flow through the switch 751 and through the wires 780 and 781 to energize the solenoid coil 691 to move the core 685 to the right in Figure 120 to cause fluid under pressure to flow through pipe **631*b*, port 687 and through pipe 395** to the left-hand end of the conveyor cylinder 392 in Figure 120-A to start advancement of conveyor chain 350.

Simultaneously with the energizing of coil 691, the coil 681 will be energized to move the core 675 to the right in Figure 120. With the core 675 moved all the way to the right in Figure 120, fluid under pressure will pass through pipe 630b, port 677 and pipes 669, 662 and 544 to the bottom of the clamping cylinders 540 and 541 to raise the clamping members 527 and 528 from engagement with the workpieces while the conveyor 350 is advanced another step. In all cases where fluid under pressure passes to one end of the cylinders 190, 392 and 540 and 541, the cores 675, 685 and 695 have ports which are in such position as to allow return flow of the fluid, such as oil, through the cores to the source 625.

In other words, the workpieces are placed upon the endless conveyor 350 and against the projections 351. The upper conveyor 600 is not driven, but presses down upon the workpieces and is moved intermittently by the power from the lower conveyor 350 transmitted through friction of the workpieces resting on the lower conveyor 350. When a workpiece reaches a point between either the upper or lower cutters, depending upon the adjustment as to height of the upper and lower cutters, the workpiece is stopped by the downwardly projecting pin 534, as shown in Figure 46. When the piston 393 has been moved to the extreme right position shown in Figure 120-A, it will cause the dog 375 on the member 387 (Figure 61) to engage shoulder 374 to move the conveyor 350 one step to place a workpiece in position to be operated upon by the cutters, or substantially in the position shown in Figure 38. There might also be another workpiece in the left-hand portion of Figure 38 below the clamping member 527. In its travel, the projection 747 in Figure 120-A will have flipped the switch arm 745 to the position shown in Figure 120-A to establish a circuit between wires 773 and lead wire 736 to the source of current. This causes current to flow through wire 773 to the lower contact of coil 680 at the extreme left-hand corner of Figure 120 and the return circuit is wire 772 which leads back and connects to lead wire 735 coming from the other side of the source of current. This causes the core 675 to move from right to left to the position shown in Figure 120 which will cause fluid under pressure to flow through the pipe 661 to the cross pipe 663 which will cause the fluid under pressure to traverse pipes 543 into the upper end of the cylinders 540 and 541 which will force their pistons downwardly to cause the clamping means 527 and 528 to engage one or more workpieces disposed on the conveyor, and this will fixedly clamp the workpieces in position for a cutting operation.

As pointed out previously, the parts shown in the lower right-hand corner of Figure 120-A are in a position ready for the rack 203 associated with the spindle cylinder 190 to operate the cutter bit assemblies to move the upper cutter bit assemblies in an orbital path and to move the lower cutter bit assemblies inwardly and outwardly in a female groove cutting operation. With the movement of the clamps 527 and 528 downwardly, to clamp the workpieces, the piston rod 202 will have been moved to the position shown in Figure 120-A and the projection 722 will have flipped the switch arm 718 to the position shown in Figure 120-A and this will set up a circuit from one side of the source of power through wire 710 and through the switch arm 718 and then through wire 764 to the solenoid coil 700 through wire 763 to the other lead wire 760 coming from the source of current. This will allow fluid under pressure to come from its source 625 and through the solenoid valve 695 and through pipe 192 to the left-hand end of cylinder 190 in Figure 120-A which will move the rack 203 to the right in Figure 120-A to impart rotation to the shaft 206, which, through the medium of the gears in gear box 207, will impart rotation to the shaft 230 (see Figure 94), and will impart rotation to the two vertically disposed shafts 250 shown in Figures 91 and 97, which, through the medium of the cam 260 on the shaft 250 (Figure 24) will impart in and out motion to the plate 85 which supports the lower cutter bit assemblies 93, to move them inwardly and outwardly for a cutting operation as shown in Figure 31. These two shafts 250 are clearly seen in the right and left-hand portions of Figure 5. The shaft 250 also imparts orbital movement to the upper cutter bit assemblies 93, having the cutter bits 100c projecting therefrom.

Figure 19:
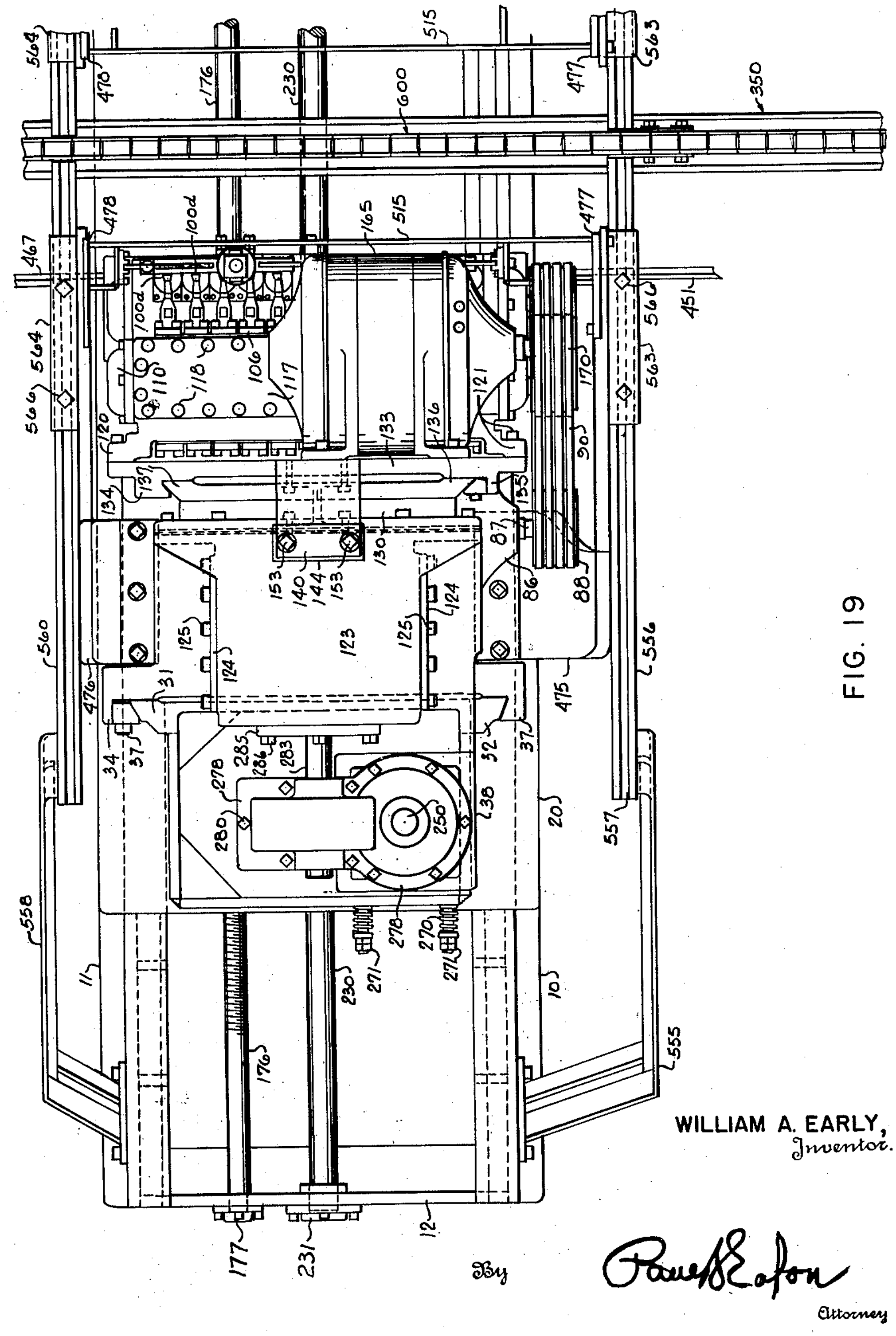
Figure 19 is a top plan view on an enlarged scale of the left-hand portion of Figure 5.
Figure 20:
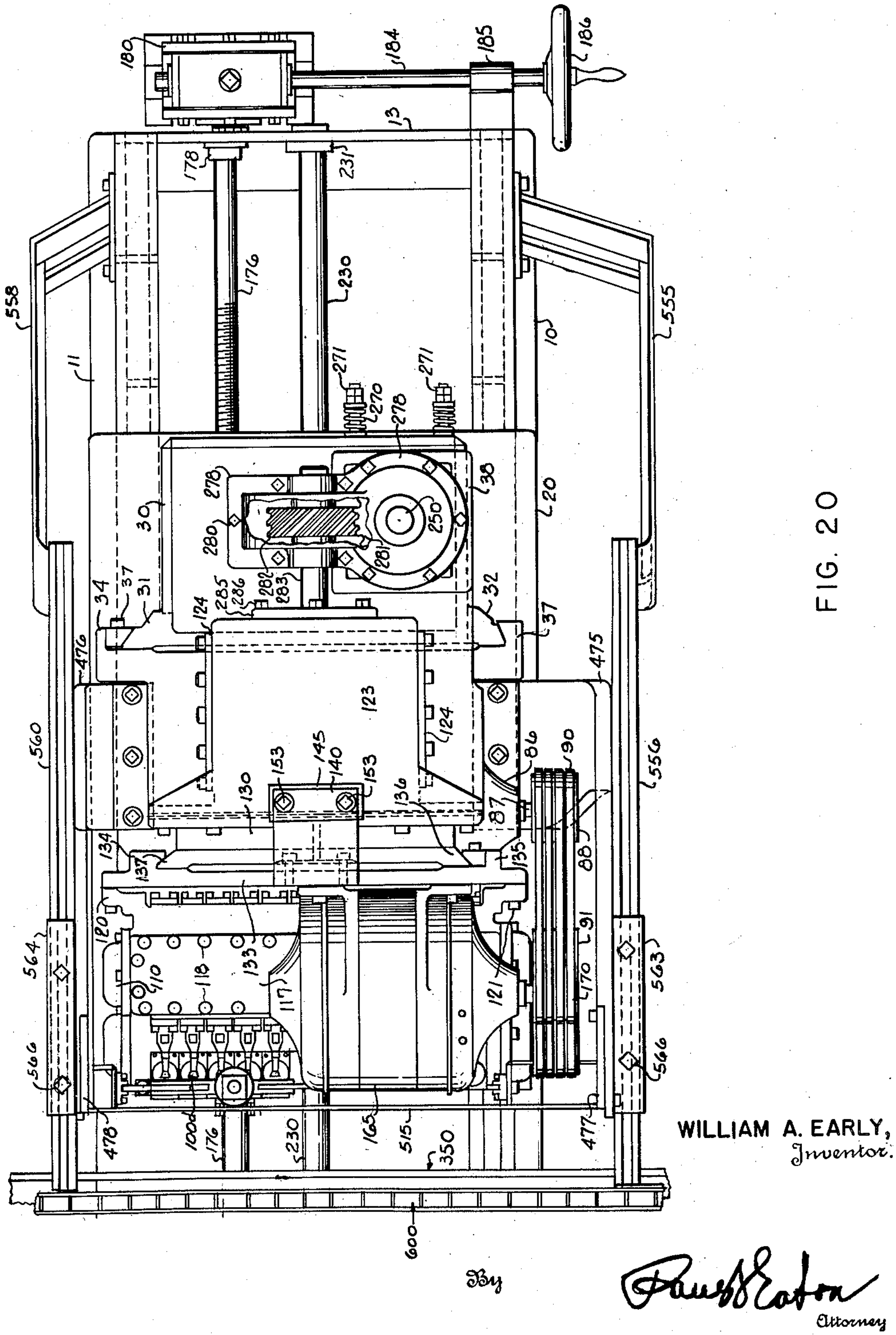
Figure 20 is a top plan view on an enlarged scale of the right-hand portion of Figure 5.

Now, referring to Figures 19 and 20, it is shown that each of the vertical shafts 250 comes up through a housing 278 on each side of the machine. By referring to Figure 20 it will be seen that there is a helical gear 281 in this housing 278 which meshes with the helical gear 282 on the shaft 283, and by referring to Figure 50, it will be noted that this shaft 283 transmits rotation through the medium of the U-shaped yoke 295 to the shafts 302 and 301 having the rollers 304 and 305 thereon, which rotate around and in engagement with the cam wheels 287 and 288. This causes orbital movement to be transmitted to the shaft 306 in Figure 60 which supports the upper cutter bit assembly housing. When the rack 203 shall have moved all the way to the right in Figure 120-A, projection 725 on the rack 203 will release push button 726 and will engage the switch arm 720 and move it all the way to the right in Figure 120-A which will establish a circuit between contact points 711 and 715. This will cause current to flow from a source wire 710 through wire 762 to one side of coil 699 in Figure 120 and return wire 761 will lead back to the other source wire 760. This will pull the core 695 in solenoid valve housing 654 to the left to another position from that shown in Figure 120, which will reverse the flow of fluid and cause it to flow through pipe 191 to return the parts to the position shown in Figure 120-A. At the same time the piston rod 391 which moves the conveyor belts will be reversed ready for another operation, and the fluid will be directed into the bottom of cylinders 540 and 541, to release the clamping members 527 and 528.

It is thus seen that there has been provided a wood-working machine having two upper assemblies having a plurality of cutting bits and two lower assemblies, each having a plurality of cutting bits, with means for manually adjusting the elevation and distance apart from each other of the cutting bit assemblies on each side of the machine to operate upon any type of workpiece, with automatic means for moving the lower cutting bit assemblies inwardly and outwardly, with means for imparting an automatic up-and-down or orbital movement to the upper cutting bits, with means for intermittently moving the workpieces into position to be engaged by the cutting bits, with means for clamping the workpieces while they are being operated upon by cutting bits, with means for unclamping the workpieces while the conveyor is being intermittently advanced to advance the workpieces, thus providing a machine which, when once adjusted to a particular type of workpiece, operates automatically to successively and speedily operate upon the two ends of workpieces simultaneously to cut the desired type of grooves in each end of workpieces, and whereby the grooves in one end of the workpieces can be different from the grooves in the other end of the workpieces, if desired.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a dovetailing machine having a conveyor for conveying workpieces through the machine in step-by-step relation and having means for automatically clamping the workpieces in position while in a position of rest and having an upper cutting bit assembly and a lower cutting bit assembly mounted adjacent each side of the conveyor and each of the cutting bit assemblies having a plurality of cutting bits therein, and having means automatically moving the cutting bits of at least one of the lower cutting bit assemblies into engagement with one of the ends of the work pieces while the work pieces are in a position of rest comprising; a plate mounted adjacent each side of the conveyor for to and fro movement on the machine and on which the lower cutting bit assemblies are fixedly mounted, each of said plates having an opening therein, a rotatable shaft loosely penetrating said opening, cam means on the shaft for engaging the walls of said opening and means for transmitting intermittent rotation to the shaft in timed relation to movement of the conveyor whereby upon rotation of the shaft, the cam means will cause the plate and the corresponding cutting bit assemblies to move inwardly and outwardly with respect to the conveyor for cutting grooves in the ends of the workpieces.

2. In a structure according to claim 1, means for automatically moving the upper cutting bits of the upper cutting bit assemblies in an orbital path and in and out of engagement with at least one of the ends of the workpieces while the workpieces are in a position of rest comprising; a vertically movable and longitudinally movable frame disposed adjacent each side of the conveyor and on which the upper cutting bit assemblies are fixedly mounted, a second rotatable shaft disposed adjacent each of the vertically and laterally movable frames, the axis of said second shaft being disposed in a plane perpendicular to the longitudinal and vertical movement of the vertically and longitudinally movable frames, means for transmitting intermittent rotation to both rotatable shafts, a fixed housing surrounding said shaft, one end of said housing being disposed in spaced relation to the movable frame, cam means fixed on the proximate ends of the fixed housings, a transversely movable bar disposed between each of said shafts and their corresponding movable frames, a connection between the intermittently driven shafts and the corresponding transversely movable bars, a rotatable connection between each of the transversely movable bars and their corresponding movable frames, other bars integral with each of said transversely movable bars, and each of the other bars on the transversely movable bars having cam follower means thereon engageable by the said cam means on the fixed housing whereby upon rotation being imparted to the said second rotatable shafts, the transversely movable bars will be caused to rotate on the same axis as the shaft, said cam means on the fixed housings causing the transversely movable bars to move in such a manner as to transmit orbital motion to the upper cutting bit assemblies due to the rotatable connections between the transversely movable bars and the movable frames.

3. In a structure according to claim 2, said means for transmitting intermittent rotation to the two rotatable shafts comprising a hydraulic cylinder, a source of fluid under pressure, connections from opposite ends of the hydraulic cylinder to the source of fluid under pressure, a piston in the hydraulic cylinder, a rack connected to the piston, a pinion engaging the rack, a third shaft, a train of gears connecting the pinion with the third shaft, clutch means disposed between the pinion and the third shaft, a mechanical connection between the third shaft and the two rotatable shafts, whereby upon fluid under pressure being admitted to one end of the cylinder, the rack will be caused to move in one direction to transmit rotation through the pinion and the clutch member and the train of gears and the third shaft to the two rotatable shafts in one direction, and whereby upon fluid under pressure being admitted to the opposite end of the cylinder, the rack will be caused to move in the opposite direction, thus transmitting rotation to the pinion, the clutch means permitting rotation of the pinion independently of the train of gears and the third shaft and the two rotatable shafts.

4. In a dovetailing machine having a conveyor for conveying workpieces through the machine, automatically operable means for intermittently moving the conveyor, clamping means for clamping a workpiece against movement on the conveyor while the conveyor is at rest, means for rendering the clamping means operable to clamp a workpiece while the conveyor is at rest, an upper cutting bit assembly and a lower cutting but assembly disposed on each side of the conveyor and each of the cutting bit assemblies having rotary cutting bits mounted therein, the upper cutting bit assembly having the axes of the cutting bits mounted therein on a horizontal plane and each lower cutting bit assembly having the axes of the cutting bits mounted therein on a vertical plane, means for automatically moving the lower cutting bit assemblies inwardly and outwardly relative to the conveyor for cutting female dovetails in one end of the clamped workpiece and means for automatically moving the horizontally disposed cutting bits of an upper cutting bit assembly in an orbital path simultaneously while the lower vertical cutting bits are moved inwardly and outwardly relative to the conveyor for cutting male dovetails or tenons in the other end of the workpiece.

5. Apparatus for cutting tenons and grooves in the ends of workpieces comprising a conveyor for conveying a plurality of workpieces in spaced relation to each other through the apparatus, automatically operable means for advancing the conveyor, upper and lower cutting bit assemblies disposed on each side of the conveyor and each cutting bit assembly comprising a plurality of spaced rotary cutting bits, means for simultaneously moving one of the cutting bit assemblies on one side of the conveyor and also one of the cutting bit assemblies on the other side of the conveyor into and out of engagement with the ends of a workpiece disposed between the cutting bit assemblies for cutting away portions of the ends of the workpiece, means automatically operable while the conveyor is at rest for clamping the workpiece in position and while the cutting bit assemblies are operating on the ends thereof, means automatically operable for releasing the clamping means and for activating the means for moving the conveyor while the clamping means are released to present another workpiece to operative position between the cutting bit assemblies while the clamping means are released.

6. In a dovetailing machine having a conveyor provided with means for receiving workpieces disposed transversely thereof and in spaced relation to each other, automatically operable means for intermittently advancing the conveyor, a plurality of rotary cutting bit assemblies mounted on each side of the conveyor and each having a plurality of rotary cutting bits therein, means for vertically adjusting the position of the cutting bit assemblies relative to the conveyor to cause the cutting bits to engage the ends of workpieces of different shapes, automatically operable means for clamping the workpieces in position when the conveyor has moved them to a position between the cutting bit assemblies disposed on each side of the conveyor and while the conveyor is at rest, means automatically operable for moving the cutting bit assemblies relative to the workpieces to cause the rotary cutting bits to cut away portions of the ends of the workpieces simultaneously, a vertically adjustable guide bar disposed adjacent each side of the conveyor for supporting the workpieces while the cutting bits cut away portions thereof, said guide bars being positioned below the clamping means so that the clamping means may press the ends of the workpieces into engagement with the guide bars for holding the workpieces while the cutters of the cutting bit assemblies are cutting away portions of the ends of the workpieces.

7. In a dovetailing machine, a conveyor for conveying workpieces through the machine, means for intermittently moving the conveyor in a horizontal plane, said workpieces being disposed in transverse relation on the conveyor, means for automatically clamping the workpieces in position on the conveyor while the conveyor is in a position of rest, two cutting bit assemblies disposed adjacent each side of the conveyor, namely, an upper cutting bit assembly and a lower cutting bit assembly, each lower cutting bit assembly having vertically disposed rotatable cutting bits and each upper cutting bit assembly having horizontally disposed rotatable cutting bits, said vertically disposed cuttings bits having their upper ends disposed in the same horizontal plane as the workpieces and the free ends of said horizontally disposed cutting bits being disposed for movement in a vertical plane bisecting the ends of the workpieces, means for moving the lower cutting bit assemblies inwardly and outwardly relative to the ends of the workpieces to cause either of the lower cutting bit assemblies to cut grooves in the lower surfaces of one of the two ends of the workpieces simultaneously, means for imparting orbital movement in a vertical plane to the upper cutting bit assemblies to form a plurality of tenons on the other end of the workpieces engaged by the upper cutting bit assemblies, means for adjusting the cutting bit assemblies vertically so that one upper cutting bit assembly on one side of the conveyor may operate on one end of the workpieces while a lower cutting bit assembly operates on the other end of the workpieces simultaneously.

8. In a dovetailing machine having conveying means for conveying workpieces through the machine, an upper cutting bit assembly and a lower cutting bit assembly disposed on each side of the conveying means each having rotary cutting bits therein, the cutting bits of the upper cutting bit assemblies having horizontal axes and the cutting bits of the lower cutting bit assemblies having vertical axes, means for adjusting the cutting bit assemblies vertically with relation to the workpieces on each side of the machine so that the cutting portions of the cuttings bits on the lower cutting bit assembly on one side of the conveying means will be at the same level as on end of the workpieces and the cutting portions of the cutting bits of the upper cutting bit assembly on the other side of the conveying means will be at the same level as the other end of the workpieces, means for simultaneously moving the lower cutting bit assemblies inwardly and outwardly relative to the ends of the workpieces to cause the lower cutting bit assembly on one side of the conveyor to form grooves in the lower side of one end of the workpieces, and means for moving the upper cutting bit assembly on the other side of the conveyor in a vertical orbital path relative to the end of the workpieces to form tenons simultaneously with the forming of grooves in the first-named end of the workpieces, means for automatically moving the conveyor while the cutting bit assemblies are in a position of rest to present another workpiece between the cutting bit assemblies, means for automatically clamping the workpiece while the conveyor is at rest and unclamping the workpiece after the cutting bit assemblies have moved out of contact therewith, means automatically operable to energize the conveyor moving means when the clamping means are moved to unclamping position.

9. In a dovetailing machine, a base member, a pair of frames mounted for sliding movement towards and away from each other on the base member, means for adjusting the frames towards and away from each other simultaneously, each frame having a lower cutting bit assembly slidably mounted thereon for movement towards and away from each other independently of the frame, each frame also having an upper cutting bit assembly mounted thereon and having a plurality of rotary cutting bits and cam means for imparting vertical movement to the upper cutting bit assembly in an orbital path, common means for moving the lower cutting bit assemblies inwardly and outwardly relative to each other and for moving the cam means simultaneously to impart vertical movement to the upper cutting bit assemblies in an orbital path simultaneously with the moving inwardly and outwardly of the lower cutting bit assemblies, a conveyor frame disposed between the two frames, a conveyor mounted on the conveyor frame and having means for receiving a plurality of workpieces, means for clamping the workpieces, means automatically operable for moving the clamping means for clamping the workpieces on the conveyor while the conveyor is in a position of rest and while the cutter bit assemblies are being moved relative to the ends of the workpieces, automatically operable means for activating the clamping means for moving the clamping means away from the workpieces, automatically operable means for advancing the conveyor with its workpieces to present a new workpiece between the cutting bit assemblies while the cutting bit assemblies are moved away from the conveyor.

10. In a dovetailing machine having a base member, a pair of frames mounted on the base member and extending upwardly, means for adjusting the position of said frames inwardly and outwardly on said base member relative to each other, a conveyor mounted between the frames for conveying spaced workpieces between the frames, each of the frames having mounted therein a lower cutter bit assembly each provided with a plurality of spaced rotary cutting bits mounted on vertical axes, each frame also having an upper cutter bit assembly each comprising a plurality of spaced rotary cutting bits mounted on horizontal axes, means for clamping the workpieces, automatically operable means for energizing the clamping means for clamping the workpieces in position between the cutter bit assemblies while the workpieces are in a position of rest, automatically operable means for moving the lower cutter bit assemblies inwardly towards each other and outwardly away from each other for engagement with the ends of the workpieces while the workpieces are in clamped position, other automatically operable means for moving the upper cutter bit assemblies vertically in an orbital path while the lower cutter bit assemblies are moving inwardly and outwardly relative to the ends of the workpieces, automatically operable means for energizing the clamping means for moving the same out of engagement with the workpieces, other automatically operable means for energizing the means for moving the conveyor another step to move the workpieces to a new position while the clamping means are out of engagement with the same.

11. In a dovetailing machine, a base member, a conveyor frame secured to and rising vertically from the base member, an endless conveyor mounted on the conveyor frame and having means for supporting workpieces whose longitudinal axes are disposed transversely to the longitudinal axis of the conveyor frame, a hold-down frame disposed above the conveyor frame and having an endless belt thereon adapted to exert pressure on the workpieces to hold them in engagement with the endless conveyor, a frame mounted on the base member at each side of the conveyor frame and each of the frames being movable along the base member to regulate the distance from the sides of the conveyor frame, each of the frames mounted for movement on the base member having an upper cutter bit assembly and a lower cutter bit assembly, each upper cutter bit assembly comprising a plurality of rotary cutting bits having horizontal axes and the lower cutter bit assemblies each comprising a plurality of rotary cutting bits disposed on vertical axes, automatically operable means for imparting vertical movement in an orbital path to the upper cutter bit assemblies relative to the conveyor frame and for simultaneously imparting inward and outward movement to the lower cutter bit assemblies towards and away from each other relative to the conveyor frame so as to cause the cutter bits to engage and cut away portions of the ends of the workpieces simultaneously, means for clamping the workpieces on the conveyor, automatically operable means for energizing the clamping means to clamp a workpiece while the conveyor is in a position of rest and while the cutter bit assemblies are engaging the ends of the workpieces and other automatically operable means for energizing the clamping means and moving the clamping means out of engagement with the workpieces and still other automatically operable means for rendering active the means for moving the conveyor belt along with its workpieces another step to present a new set of workpieces between the rotary cutting bits.

12. In a dovetailing machine, a base member, a pair of frames mounted for sliding movement on the base member, means for simultaneously adjusting the position of the frames towards and away from each other, a rotary shaft disposed in the base member, a pair of vertically disposed shafts driven by the rotary shaft in the base member, the two frames each having a lower cutter bit assembly and an upper cutter bit assembly thereon, and each cutter bit assembly comprising a plurality of spaced rotary cutting bits, a conveyor disposed between the frames and having means for supporting a plurality of workpieces thereon with the ends of the workpieces projecting towards the cutter bits on the two frames, means for driving the cutter bits in each of the cutter bit assemblies, means driven by the two vertically disposed shafts for moving the lower cutter bit assemblies inwardly and outwardly relative to the ends of the workpieces for simultaneously cutting away portions of the ends of the workpieces, means driven by the vertically disposed shafts for imparting a vertical movement to the upper cutter bit assemblies in an orbital path to cause their cutter bits to pass through the ends of the workpieces simultaneously in an up-and-down direction to form tenons on the ends of the workpieces engaged by the upper cutter bits, means for adjusting the cutter bit assemblies in each frame vertically and simultaneously so that the cutter bit assemblies of one frame can be adjusted to cause a lower set of cutter bits in one frame and an upper set of cutter bits in another frame to operate simultaneously upon the ends of the two opposite workpieces.

13. In a woodworking machine having an endless conveyor chain provided with dogs for engaging the rear edges of workpieces and moving them through the machine, a rotary cutting bit assembly mounted on each side of the conveyor for performing a cutting operation on the ends of the workpieces disposed between the rotary cutting bit assemblies, each of the dogs on the conveyor chain being resiliently mounted to accommodate variations in widths of the workpieces, vertically movable clamping means for clamping a workpiece in position to receive action from the cutting bits, and stop means mounted on the clamping means for stopping the movement of the workpieces being moved by the dogs on the conveyor chain when their width is beyond a predetermined width so as to arrest them in proper position between the cutting bit assemblies, means for moving the conveyor intermittently, means controlled by the means for moving the conveyor for activating the clamping means to move the same to unclamping position immediately preceeding and during movement of the conveyor to move a workpiece out of cutting position and to move a new workpiece into cutting position and other means controlled by the means for moving the conveyor for activating the clamping means to engage and clamp the workpieces after the conveyor on which it is supported has stopped movement.

14. A dovetailing machine for cutting grooves and tenons in the two opposed ends of workpieces such as drawer parts for furniture, having a conveyor for conveying a plurality of straight workpieces through the machine, said machine also having cutter bit assemblies mounted on both sides of the conveyor and also having means for moving the cutter bit assemblies on each side of the conveyor simultaneously into engagement with the two opposed ends of the workpieces, there being two cutter bit assemblies disposed on each side of the conveyor, the cutter bit assemblies on each side of the conveyor being disposed in superimposed relation, the lower cutter bit assemblies having vertically disposed cutter bits therein and the upper cutter bit assemblies having horizontally disposed cutter bits therein, manually operable means for adjusting the height of the cutter bits on each side of the frame with respect to the level of the conveyor so that the upper cutter bit assemblies can simultaneously operate on the two opposed ends of the workpiece and so that the lower cutter bit assemblies can operate simultaneously on the two opposed ends of the workpiece, and whereby one set of cutter bit assemblies on one side of the frame can be raised to a higher elevation than on the other side of the frame to cause one of the lower cutter bit assemblies to operate on one end of the workpieces while the other cutter bit assembly on the other side of the conveyor simultaneously operates on the other end of the workpieces.

15. In a dovetailing machine having a plurality of cutting bits disposed in spaced relation to each other and having a conveyor for conveying workpieces through the machine and between the cutting bits, and also having means for clamping the workpieces on the conveyor, reciprocating means for moving the conveyor, means for clamping the workpieces while the reciprocating means are moving in a receding position ready for the advancement of the conveyor, means operable by the reciprocating means for moving the clamping means to clamping position while the reciprocating means are receding ready for the imparting of another step of movement of the conveyor, said machine also having means for moving the cutting bits relative to the ends of the workpiece and into engagement with two ends of the workpiece simultaneously, said cutter bit moving means being controlled by the reciprocating means to activate the same immediately after the conveyor has been advanced, and to also activate the clamping means to move them to unclamping position.

16. In a dovetailing machine having a conveyor for conveying a plurality of workpieces in step-by-step relation through the machine, a plurality of rotary cutting bits disposed on each side of the conveyor, said machine also having means for clamping the workpieces in position on the conveyor while the conveyor is in a position of rest, reciprocating means for moving the conveyor, means controlled by the reciprocating means for moving the cutter bits towards and away from the ends of the workpieces, other means controlled by the reciprocating means for moving the clamping means to unclamping position immediately before the reciprocating means becomes active to move the conveyor another step, and other means controlled by the reciprocating means for moving the clamping means to clamping position while the reciprocating means are on a return travel ready for moving the conveyor another step.

17. In a woodworking machine having means for supporting a workpiece, upper and lower cutter bit assemblies having driven cutter bits therein disposed adjacent each end of the workpiece, the upper cutter bit assemblies having means for moving the cutter bits in an orbital path in a vertical plane to engage the end of the workpiece, a vertically disposed shaft associated with each of the cutter bit assemblies and having means driven thereby for moving the lower cutter bit assemblies in a horizontal plane towards and away from the ends of the workpiece and for moving the upper cutter bit assemblies in an orbital path in a vertical plane, a source of electrical energy, a rack and pinion for imparting intermittent rotation to said shafts, a hydraulic cylinder having a piston and a piston rod connected to said rack, a source of fluid under pressure, a pair of pipes leading from the source of fluid under pressure to the two ends of said cylinder, an electrically operable valve through which said two pipes pass after leaving the source of fluid under pressure, a pair of circuits leading from the source of electrical energy to said valve, first and second switches in said circuits, said rack having means for closing one of the switches when the piston has reached one end of the cylinder for energizing said valve to admit fluid under pressure to that end of the cylinder to move the piston to the other end of the cylinder and to thus impart rotation to said shafts, the rack upon reaching its limit in a shaft moving operation being adapted to engage and close the second switch to close the second circuit to said valve means to move the valve means and disconnect the source of fluid under pressure to the first-named end of the cylinder and to direct fluid under pressure to the other end of the cylinder to return the piston to original position and an overriding clutch disposed between the rack and pinion and said shafts for preventing rotation from being imparted to said shafts upon the piston returning to original position.

18. In a structure according to claim 17, a second cylinder having a piston thereon and means driven by the shafts for moving the work supporting means, a pair of pipes leading from the source of fluid under pressure to the two ends of the second cylinder, electrical valve means in the second pair of pipes, first and second circuits leading from the source of electrical energy to the second valve means, third and fourth switches disposed in the two second circuits leading to the second valve means and means engageable by the rack when it is moved to original position for closing said third switch to move the second valve means to admit fluid under pressure to one end of the second cylinder for causing movement to be transmitted to the work supporting means to cause movement to be transmitted to the second piston to move it to original position ready to advance the work supporting means, clamping cylinders associated with each end of the workpieces, each having a piston therein provided with a piston rod having clamping means for engaging the workpieces, piped connections between the two ends of the clamping cylinders and the source of fluid under pressure, third electrical valve means disposed in the piped connections to the clamping cylinders, fourth, fifth and sixth switches associated with the piston rod associated with the second cylinder and means carried by the piston rod for the second sylinder upon moving to original position for closing the fourth, fifth and sixth switches, electrical circuits passing from the source of electrical energy through said switches and a third electrically operable valve controlled by the last two named circuits, movement of the piston in the second cylinder to initial position serving to open the fourth switch and to close the fifth switch and to also close the sixth switch to thereby energize the third valve means and the second valve means to reverse the direction of flow to the second cylinder and to direct fluid into the clamping cylinders to move the clamping means out of engagement with the workpieces.

WILLIAM A. EARLY.

REFERENCES CITED

The following references are of record in the file of this patent:

UNITED STATES PATENTS

| Number | Name | Date |
|---|---|---|
| 102,069 | Van Epps | Apr. 19, 1870 |
| 388,760 | Clement | Aug. 28, 1888 |
| 517,705 | Morgan | Apr. 3, 1894 |
| 650,820 | Bugbee et al. | June 5, 1900 |
| 946,811 | Thomas et al. | Jan. 18, 1910 |
| 1,083,366 | Kelly | Jan. 6, 1914 |
| 1,121,706 | Wysong | Dec. 22, 1914 |
| 1,153,938 | Martell | Sept. 21, 1915 |
| 1,195,731 | Rhodes | Aug. 22, 1916 |
| 1,496,480 | Marshall | June 3, 1924 |
| 1,711,275 | Mansfield et al. | Apr. 30, 1929 |
| 1,813,293 | Hrncsjar | July 7, 1931 |
| 1,946,452 | Bridges | Feb. 6, 1934 |
| 1,968,091 | Nash | July 31, 1934 |
| 2,005,647 | Crouch | July 18, 1935 |
| 2,160,476 | Kampmeier | May 30, 1939 |
| 2,170,687 | Johnson | Aug. 22, 1939 |
| 2,215,273 | Paradis | Sept. 17, 1940 |
| 2,225,263 | Farrell | Dec. 17, 1940 |
| 2,225,429 | Dostal | Dec. 17, 1940 |
| 2,299,602 | Teague | Oct. 20, 1942 |
| 2,333,542 | Mansfield | Nov. 2, 1943 |
| 2,393,617 | De Spain | Jan. 29, 1946 |
| 2,394,769 | Heckethorn | Feb. 12, 1946 |